United States Patent
Nobayashi et al.

(10) Patent No.: US 11,908,148 B2
(45) Date of Patent: Feb. 20, 2024

(54) INFORMATION PROCESSING DEVICE TO DETERMINE OBJECT DISTANCE

(71) Applicant: CANON KABUSHIKI KAISHA, Tokyo (JP)

(72) Inventors: Kazuya Nobayashi, Tokyo (JP); Shin Tanaka, Kanagawa (JP); Makoto Oigawa, Kanagawa (JP); Shigeo Kodama, Tokyo (JP); Tomoyuki Kawamoto, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/700,268

(22) Filed: Mar. 21, 2022

(65) Prior Publication Data
US 2022/0309694 A1 Sep. 29, 2022

(30) Foreign Application Priority Data
Mar. 29, 2021 (JP) .................................. 2021-055880

(51) Int. Cl.
*G06T 7/55* (2017.01)
*H04N 7/18* (2006.01)

(52) U.S. Cl.
CPC .................. *G06T 7/55* (2017.01); *H04N 7/18* (2013.01)

(58) Field of Classification Search
CPC ... G06T 7/55; G06T 7/60; G06T 2207/30256; G06T 2207/30261; H04N 7/18;
(Continued)

(56) References Cited

U.S. PATENT DOCUMENTS

2011/0043603 A1* 2/2011 Schechner .............. G06T 5/003
348/E5.062
2014/0267622 A1* 9/2014 Kasahara ............... G01C 3/085
348/46
(Continued)

FOREIGN PATENT DOCUMENTS

EP 2 779 654 A2 9/2014
JP 2007281296 A 10/2007
(Continued)

OTHER PUBLICATIONS

Hofmann Christian et al; "Object Detection, Classification and Localization by Infrastructural Stereo Cameras;" In Proceedings of the 14th International Joint Conference on Computer Vision, Imaging and Computer Graphics Theory and Applications (VISIGRAPP 2019 ); pp. 808-815.

*Primary Examiner* — Marnie A Matt
(74) *Attorney, Agent, or Firm* — CANON U.S.A., INC. IP Division

(57) ABSTRACT

An electronic device includes at least one processor or circuit configured to function as a setting unit, an acquisition unit and a processing unit. The setting unit sets an object region in an image acquired from an imaging unit. The acquisition unit acquires a distance map including distance information corresponding to a pixel included in the object region. The processing unit determines object distance information indicating a distance to an object included in the object region, based on the distance information corresponding to the pixel included in the object region.

17 Claims, 29 Drawing Sheets

(58) Field of Classification Search
CPC .... H04N 13/271; H04N 13/239; G06V 20/58;
G06V 20/588; G01C 3/14; G01S 13/931;
G01S 7/4004; G01S 7/497; G01S 17/08;
G01S 17/931; G01S 17/89; G08G 1/01;
G08G 1/04; G08G 1/16
USPC ........................................................ 348/135
See application file for complete search history.

(56) References Cited

U.S. PATENT DOCUMENTS

| | | |
|---|---|---|
| 2017/0309028 A1* | 10/2017 | Nishiyama ............... G01C 3/14 |
| 2018/0136332 A1* | 5/2018 | Barfield, Jr. ........ G06V 10/7784 |
| 2019/0120950 A1* | 4/2019 | Tanaka .................... G06T 7/593 |
| 2020/0218979 A1* | 7/2020 | Kwon ................... B60W 30/14 |
| 2021/0272304 A1* | 9/2021 | Yang ....................... G06F 18/00 |
| 2022/0019812 A1* | 1/2022 | Kim ..................... G06V 20/588 |
| 2022/0108465 A1* | 4/2022 | Yang ...................... G06V 10/25 |

FOREIGN PATENT DOCUMENTS

| | | |
|---|---|---|
| JP | 2020-67534 A | 4/2020 |
| WO | 2009/096428 A1 | 8/2009 |
| WO | 2020/140049 A1 | 7/2020 |

\* cited by examiner

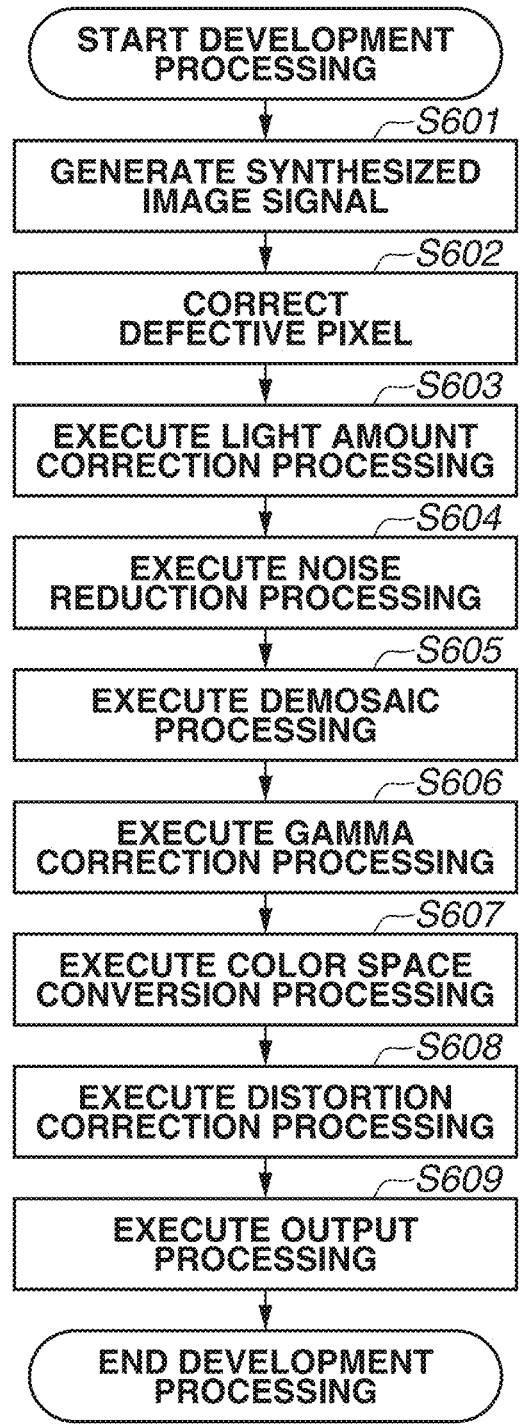
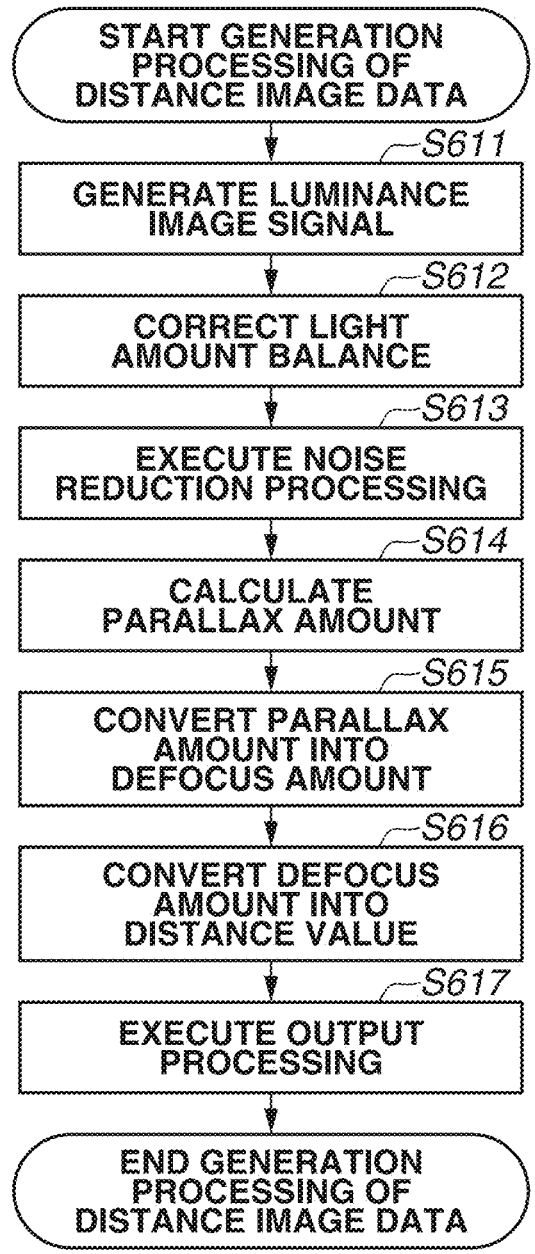

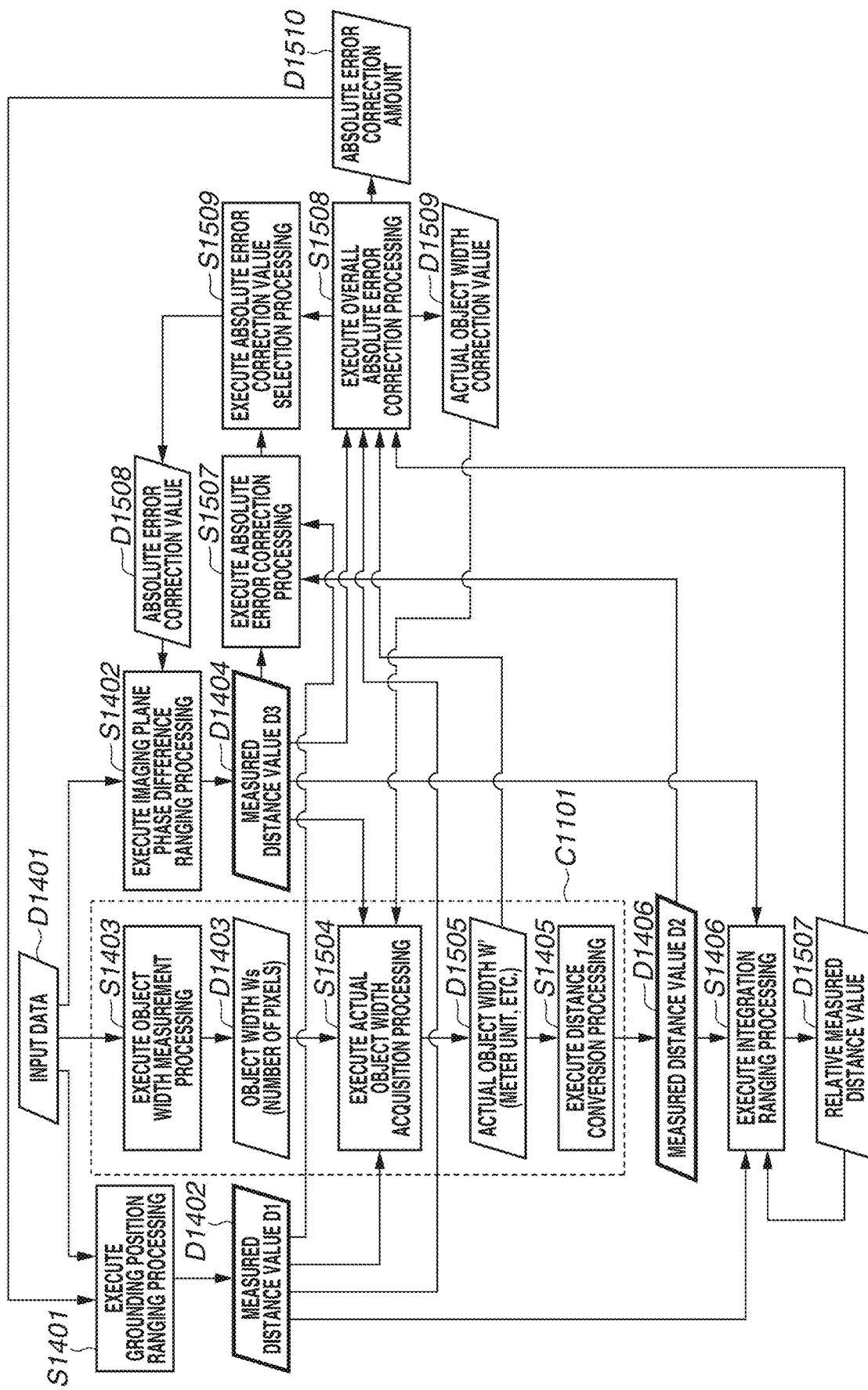

FIG.29

| | NUMBER | LANE WIDTH | DISTANCE |
|---|---|---|---|
| T0 | [0] | 1000 pix | 10 m |
| | [1] | 980 pix | 10.1 m |
| | ⋮ | | |
| | [30] | 520 pix | 20 m |
| | [31] | 500 pix | 20.1 m |
| T1 | [32] | 1000 pix | 10.2 m |
| | [33] | 950 pix | 10.5 m |
| | ⋮ | | |
| | [62] | 420 pix | 25 m |
| | [63] | 400 pix | 25.2 m |
| T2 | [64] | 1010 pix | 9.9 m |
| | [65] | 960 pix | 10.5 m |
| | ⋮ | | |
| | [k-1] | 510 pix | 20 m |
| | [k-2] | 400 pix | 25.1 m |

INFORMATION PROCESSING DEVICE TO DETERMINE OBJECT DISTANCE

BACKGROUND

Field of the Disclosure

Aspects of the disclosure generally relate to an electronic device that acquires a distance to an object, a method of controlling the electronic device, and a movable body including the electronic device.

Description of the Related Art

There is known an imaging apparatus that includes a sensor including a pixel region in which pixels having a photoelectric conversion function are two-dimensionally arranged, and can acquire an image signal and distance information in each pixel region. A solid-state image sensor discussed in Japanese Patent Application Laid-Open No. 2007-281296 includes pixels having a ranging function that are arranged as a part or all of pixels of the image sensor, and detects a distance to a subject based on a phase difference detected on an imaging plane (imaging plane phase difference system). A positional shift is calculated based on a correlation between two image signals that are based on images generated by light fluxes having passed through different pupil regions of an imaging optical system included in an imaging apparatus, and a distance to a subject is acquired based on the positional shift.

The correlation between the two image signals is evaluated using a method such as a region-based matching method of extracting an image signal included in a predetermined check region from each of the image signals to evaluate the correlation between the image signals.

In a case where image signals include a small change in subject contrast, or in a case where an amount of noise included in the image signals is large, erroneous evaluation of a correlation between image signals sometimes occurs due to a subject or an imaging condition. In a case where erroneous evaluation of the correlation occurs at a predetermined frequency or more, a calculated positional shift amount between two image signals may include an error, and the accuracy of a subject distance to be acquired might decline.

SUMMARY

According to various embodiments, there are provided an apparatus and a method that can acquire a distance to an object highly accurately.

According to an aspect of the present invention, an electronic device includes at least one processor or circuit configured to function as a setting unit configured to set an object region in an image acquired from an imaging unit, an acquisition unit configured to acquire a distance map including distance information corresponding to a pixel included in the object region, and a processing unit configured to determine object distance information indicating a distance to an object included in the object region, based on the distance information corresponding to the pixel included in the object region.

According to another aspect of the present invention, a method includes setting an object region in an image acquired from an imaging unit, acquiring a distance map including distance information corresponding to a pixel included in the object region, and determining object distance information indicating a distance to an object included in the object region, based on the distance information corresponding to the pixel included in the object region.

Further aspects of the disclosure will become apparent from the following description of example embodiments.

BRIEF DESCRIPTION OF THE DRAWINGS

FIGS. 6A and 6B are flowcharts illustrating processing to be executed by an image processing unit.

FIG. 15 is a flowchart illustrating processing to be performed in a case where a plurality of pieces of consecutive input data is chronologically input.

FIG. 29 is a schematic diagram illustrating each piece of lane width data.

DESCRIPTION OF THE EMBODIMENTS

Figure 1:
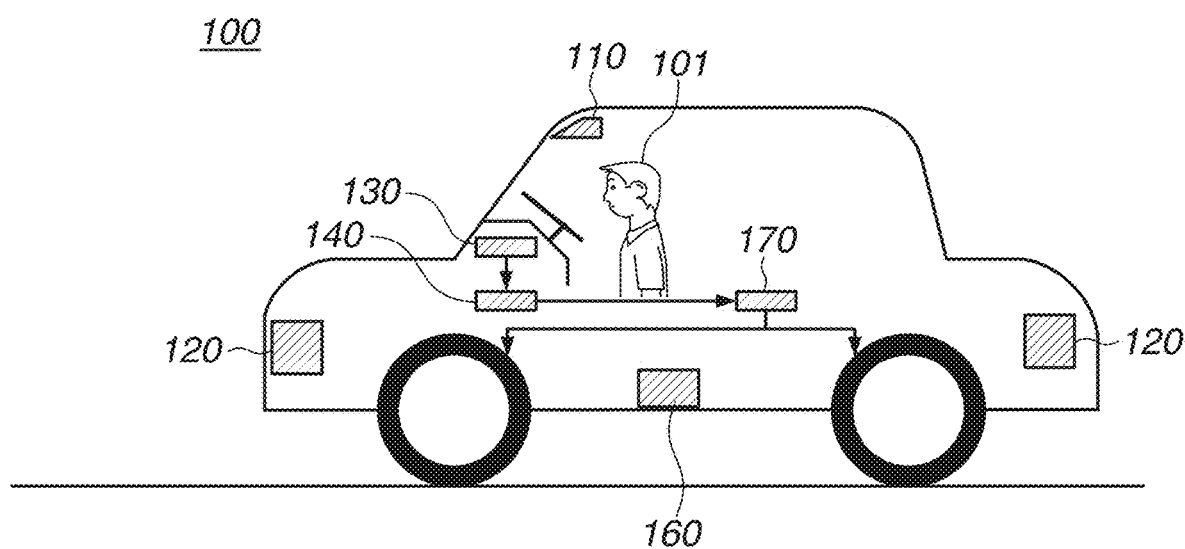
FIG. 1 is a schematic diagram illustrating a configuration of a vehicle.

Example embodiments, features, and aspects of the disclosure will be described below with reference to the drawings. However, embodiments of the invention are not limited to the following example embodiments.

A first exemplary embodiment will be described in detail with reference to the drawings.

The following description will be given using a route generation apparatus (electronic device) including an imaging apparatus, as an example of a route generation apparatus, but the route generation apparatus is not limited to this.

In the description to be given with reference to the drawings, the same components illustrated in different drawings are assigned the same reference numerals in principle, and the redundant description will be avoided as much as possible.

FIG. 1 is a schematic diagram illustrating a configuration of a vehicle 100. The vehicle 100 is a movable body including an imaging apparatus 110, a radar apparatus 120, a route generation electronic control unit (ECU) 130, a vehicle control ECU 140, and a measuring device unit 160. The vehicle 100 includes a drive unit 170 and memories 180 and 190. The drive unit 170 and the memories 180 and 190 will be described with reference to FIG. 2. The imaging apparatus 110 and the route generation ECU 130 constitute a route generation apparatus 150. A driver 101 can ride in the vehicle 100. When the vehicle 100 is traveling, the driver 101 rides in the vehicle 100 with facing the front side (traveling direction) of the vehicle 100. The driver 101 can control operations of the vehicle 100 by operating operation members of the vehicle 100 such as a steering wheel, an accelerator pedal, and a brake pedal.

The imaging apparatus 110 is arranged in such a manner as to capture an image of the front side (normal traveling direction) of the vehicle 100. As illustrated in FIG. 1, the imaging apparatus 110 is arranged near an upper end of a windshield of the vehicle 100 to capture an image of a region within a predetermined angular range (hereinafter, imaging field angle) toward the front side of the vehicle 100. The imaging apparatus 110 may be arranged in such a manner as to capture an image of the rear side (reverse direction that is opposite to the normal traveling direction) of the vehicle 100, or may be arranged in such a manner as to capture an image of a lateral side of the vehicle 100. A plurality of imaging apparatuses 110 may be installed in the vehicle 100.

Figure 2:
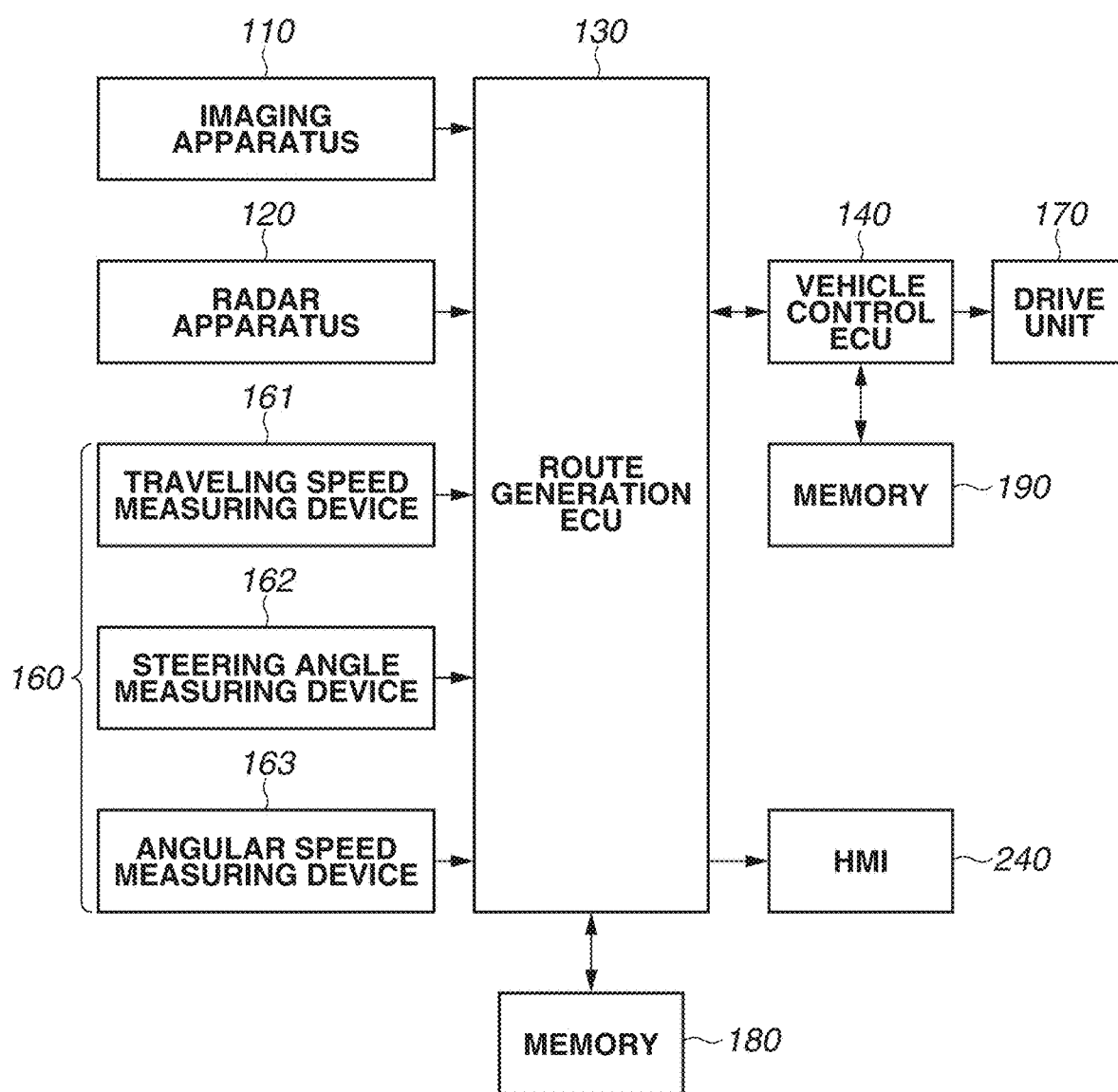
FIG. 2 is a configuration diagram illustrating a configuration of the vehicle.

FIG. 2 is a configuration diagram illustrating a configuration of the vehicle 100.

The imaging apparatus 110 captures an image of an environment (surrounding environment) around the vehicle 100 including a road (driving road) on which the vehicle 100 travels. The imaging apparatus 110 detects an object included in the range of the imaging field angle of the imaging apparatus 110. The imaging apparatus 110 acquires information regarding the detected object (external information) and information regarding a distance to the detected object (object distance information), and outputs the acquired information to the route generation ECU 130. The object distance information may be any information that can be converted into a distance to an object from a predetermined position of the vehicle 100 using a predetermined reference table or a predetermined conversion coefficient and a conversion equation. For example, a distance may be allocated to a predetermined integer value, and the predetermined integer value may be sequentially output to the route generation ECU 130.

The imaging apparatus 110 includes a sensor including a pixel region in which pixels having a photoelectric conversion function are two-dimensionally arranged, and can acquire a distance to an object using an imaging plane phase difference system. The acquisition of distance information about a distance to an object using the imaging plane phase difference system will be described below.

The radar apparatus 120 is a detection apparatus that detects an object by transmitting electromagnetic waves as transmission waves and receiving reflective waves of the electromagnetic waves. The radar apparatus 120 acquires distance information indicating a distance to an object in a transmission direction of electromagnetic waves, based on a time from when electromagnetic waves are transmitted until when reflective waves are received, and the reception intensity of reflective waves. The radar apparatus 120 outputs the distance information to the route generation ECU 130. The radar apparatus 120 is a millimeter-wave radar apparatus that uses electromagnetic waves in wavelengths from a millimeter waveband to a submillimeter waveband.

In the first exemplary embodiment, a plurality of radar apparatuses 120 is mounted on the vehicle 100. For example, the radar apparatuses 120 are attached to the front left and right sides and the rear left and right sides of the vehicle 100. Each of the radar apparatuses 120 scans a predetermined angular range with electromagnetic waves, measures a distance from the radar apparatus 120 based on a time from when electromagnetic waves are transmitted until when reflective waves are received, and the reception intensity of the reflective waves, and generates distance information at a scanning position. The distance information can include information about the reception intensity of reflective waves and a relative speed of an object aside from the distance from the radar apparatus 120.

The measuring device unit 160 includes a traveling speed measuring device 161, a steering angle measuring device 162, and an angular speed measuring device 163, and acquires vehicle information regarding a state of a vehicle such as a traveling speed, a steering angle, and an angular speed. The traveling speed measuring device 161 is a measuring device that detects a traveling speed of the vehicle 100. The steering angle measuring device 162 is a measuring device that detects a steering angle of the vehicle 100. The angular speed measuring device 163 is a measuring device that detects an angular speed of the vehicle 100 in a turning direction. Each measuring device outputs a measurement signal corresponding to a measured parameter to the route generation ECU 130 as vehicle information.

The route generation ECU 130 includes a logic circuit, and generates a traveling locus of the vehicle 100 and route information regarding the traveling locus based on the measurement signal, external information, object distance information, and distance information. The route generation ECU 130 outputs the traveling locus and the route information to the vehicle control ECU 140. Data to be processed by the route generation ECU 130 and programs to be executed by the route generation ECU 130 are stored in the memory 180.

The traveling locus is information indicating a locus (route) on which the vehicle 100 passes. The route information is information based on which the vehicle 100 passes through a route indicated by the traveling locus.

The vehicle control ECU 140 includes a logic circuit, and controls the drive unit 170 in such a manner that the vehicle 100 drives along a route defined by the route information, based on the route information and the vehicle information acquired from the measuring device unit 160. Data to be processed by the vehicle control ECU 140 and programs to be executed by the vehicle control ECU 140 are stored in the memory 190.

The drive unit 170 is a drive member for driving the vehicle 100, and includes a power unit such as an engine or a motor that generates energy for rotating tires, and a steering unit that controls a traveling direction of the vehicle 100, for example. The drive unit 170 further includes a gear box for rotating tires using energy generated by the power unit, a gear control unit that controls components in the gear box, and a brake unit that performs a brake operation. The vehicle control ECU 140 controls the drive unit 170 to adjust a drive amount, a braking amount, and a steering amount of the vehicle 100 in such a manner that the vehicle 100 drives along a route corresponding to the route information. Specifically, the vehicle control ECU 140 operates the vehicle 100 by controlling a brake, a steering, and gear components.

The route generation ECU 130 and the vehicle control ECU 140 may share a common central processing unit (CPU) and a memory storing arithmetic processing programs.

A human machine interface (HMI) 240 conveys information to the driver 101. The HMI 240 includes a display viewable by the driver 101 when the driver 101 is positioned at a driving position, and a display control apparatus that generates information to be displayed on the display. The HMI 240 further includes an apparatus (speaker system) that outputs voice, and a voice control apparatus that generates voice data. The display control apparatus displays navigation information on the display based on the route information generated by the route generation ECU 130. The voice control apparatus generates voice data for notifying the driver 101 of information based on the route information, and outputs the voice data from the speaker system. The voice data is data for notifying that the vehicle 100 is getting closer to an intersection at which the vehicle 100 is to make a turn, for example.

Figure 3:
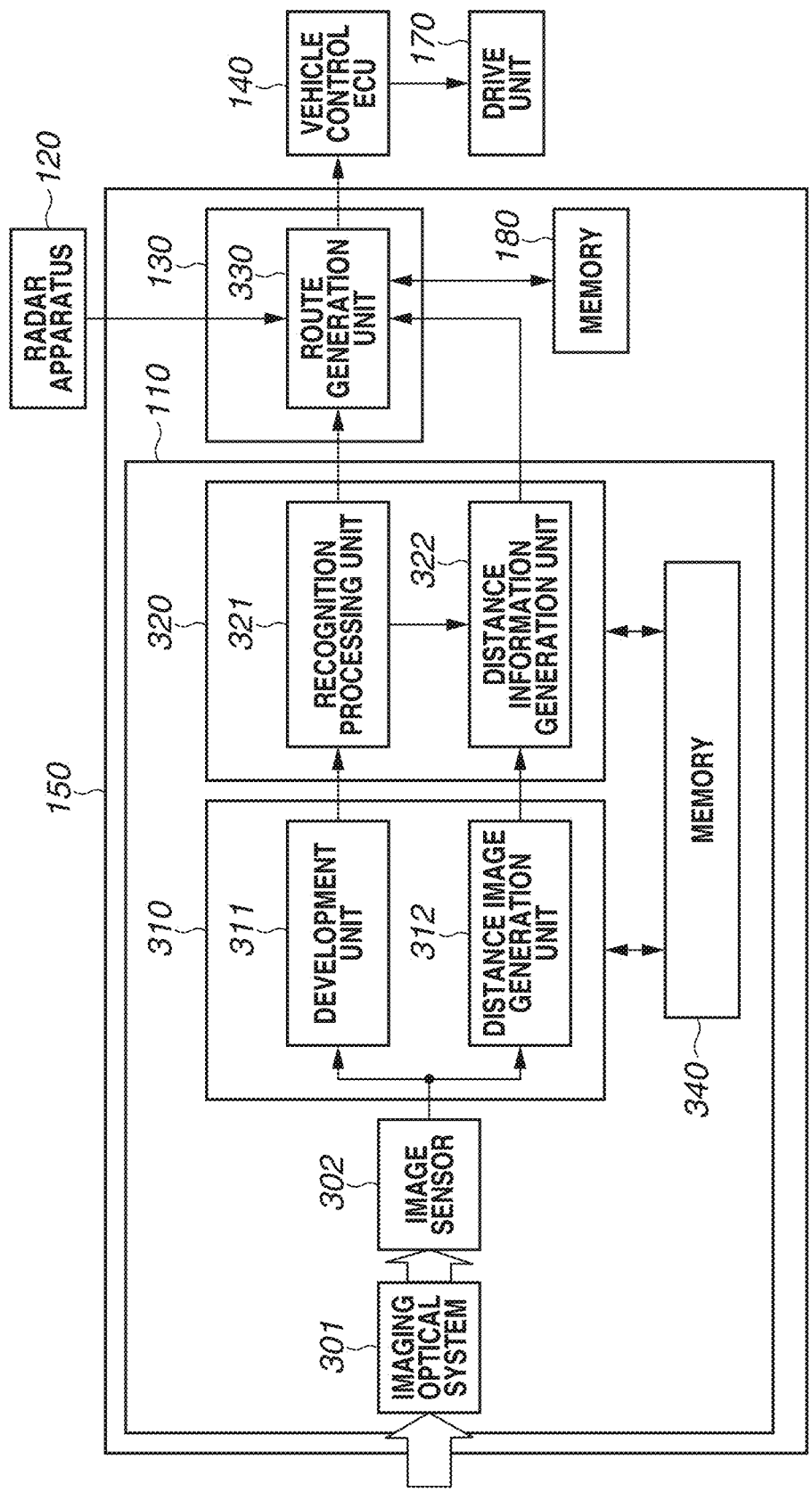
FIG. 3 is a block diagram illustrating a configuration of a route generation apparatus.

FIG. 3 is a block diagram illustrating a configuration of the route generation apparatus 150. The route generation apparatus 150 includes the imaging apparatus 110 and the route generation ECU 130.

The imaging apparatus 110 includes an imaging optical system 301, an image sensor 302, an image processing unit 310, and an object information generation unit 320. The imaging optical system 301, the image sensor 302, the image processing unit 310, and the object information generation unit 320 are arranged inside a housing of the imaging apparatus 110.

The imaging optical system 301 is an imaging lens of the imaging apparatus 110, and has a function of forming an image (optical image) of a subject on the image sensor 302. The imaging optical system 301 includes a plurality of lens units. The imaging optical system 301 includes an exit pupil at a position distant from the image sensor 302 by a predetermined distance.

The image sensor 302 includes a complementary metal-oxide semiconductor (CMOS) image sensor or a charge-coupled device (CCD) sensor, and is an image sensor having a ranging function that is based on an imaging plane phase difference ranging system. The image sensor 302 sequentially outputs image signals that are based on images formed by the imaging optical system 301, to the image processing unit 310. The image sensor 302 includes a pixel region in which pixels having a photoelectric conversion function are two-dimensionally arranged. Each pixel region includes two photoelectric conversion units (first photoelectric conversion unit and second photoelectric conversion unit). The image sensor 302 photoelectrically converts a subject image formed on the image sensor 302 via the imaging optical system 301 to generate an image signal corresponding to the subject image. The image sensor 302 outputs the image signal to the image processing unit 310. The image signal is a signal including an output value of each photoelectric conversion unit in each pixel region. The image sensor 302 outputs a first image signal that is based on a signal output from the first photoelectric conversion unit and a second image signal that is based on a signal output from the second photoelectric conversion unit to the image processing unit 310.

Based on the image signals, the image processing unit 310 generates image data including luminance information about each color of red, green, and blue of each pixel, and distance image data indicating distance information about each pixel. The image processing unit 310 includes a development unit 311 that generates image data based on an image signal, and a distance image generation unit 312 that generates distance image data based on an image signal. Processing to be executed by these units will be described below. The image processing unit 310 outputs the image data and the distance image data to the object information generation unit 320.

The object information generation unit 320 includes a recognition processing unit 321 that detects an object included in an acquired image and generates external information indicating information regarding the object based on the image data. The external information is information indicating a position, a size such as a width and a height and a region of the detected object in the image. The external information also includes information regarding an attribute and an identification number of the detected object.

The object information generation unit 320 includes a distance information generation unit 322 that generates object distance information indicating a distance to the object included in the acquired image, based on the external information and the distance image data. The object distance information includes information regarding an identification number of the detected object that is included in the external information.

The object information generation unit 320 outputs the external information and the object distance information to the route generation ECU 130.

The image processing unit 310 and the object information generation unit 320 may be implemented by one or more processors included in the imaging apparatus 110. The functions of the image processing unit 310 and the object information generation unit 320 may be implemented by the one or more processors executing programs read out from a memory 340.

The route generation ECU 130 includes a route generation unit 330. The route generation unit 330 generates route information based on the external information and the object distance information, and the distance information acquired from the radar apparatus 120.

Next, the structure and control of each block of the route generation apparatus 150 will be described in detail.

Figure 4A:
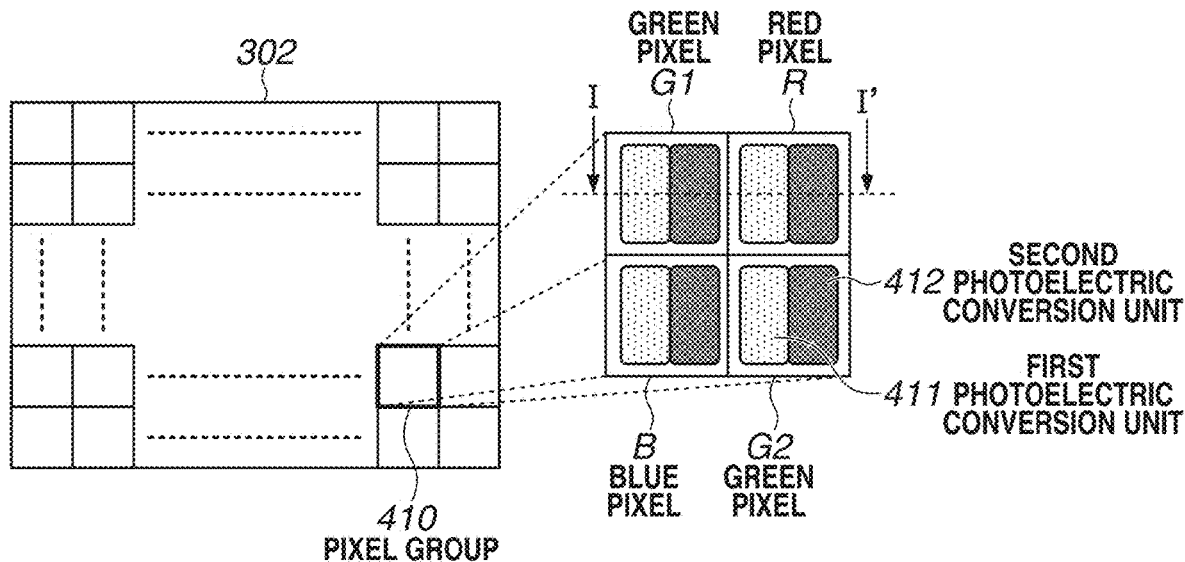
FIGS. 4A and 4B are schematic diagrams illustrating a configuration of an image sensor.
Figure 4B:
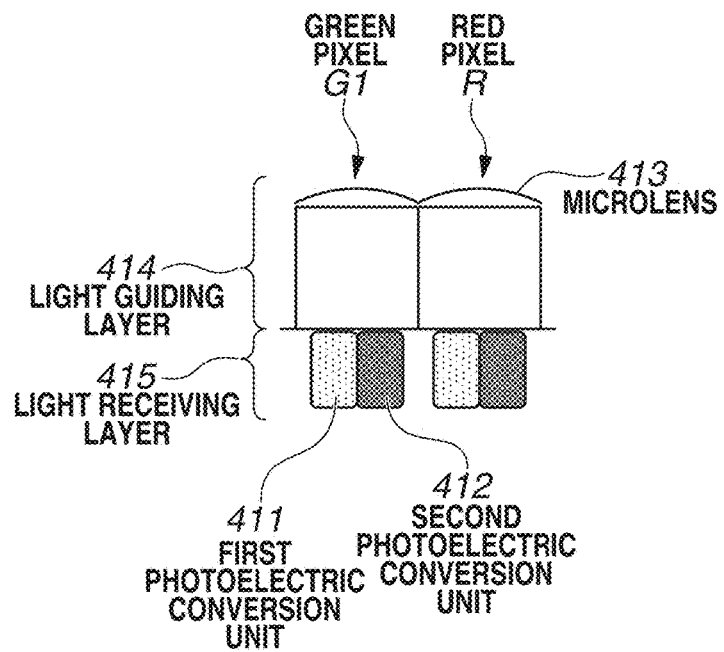

FIGS. 4A and 4B are schematic diagrams illustrating a configuration of the image sensor 302. FIG. 4A is a top view of the image sensor 302 viewed from a light incident direction. The image sensor 302 includes a plurality of pixel groups 410 arrayed in a matrix, and each of the pixel groups 410 includes pixels in 2 rows×2 columns. The pixel group 410 includes green pixels G1 and G2 that detect green light, a red pixel R that detects red light, and a blue pixel B that detects blue light. In the pixel group 410, the green pixels G1 and G2 are diagonally arranged. Each pixel includes a first photoelectric conversion unit 411 and a second photoelectric conversion unit 412.

FIG. 4B is a cross-sectional view of the pixel group 410 in a cross section I-I' illustrated in FIG. 4A. Each pixel includes a microlens 413, a light guiding layer 414, and a light receiving layer 415.

The light guiding layer 414 is a light guiding member including the microlens 413 for efficiently guiding a light flux that has entered a pixel to the light receiving layer 415, a color filter that transmits light in a waveband corresponding to the color of light detected by each pixel, and wiring lines for image reading and pixel driving.

The light receiving layer 415 is a photoelectric conversion unit that photoelectrically converts light that has entered the pixel via the light guiding layer 414 into an electrical signal, and outputs the electrical signal. The light receiving layer 415 includes the first photoelectric conversion unit 411 and the second photoelectric conversion unit 412.

Figure 5A:
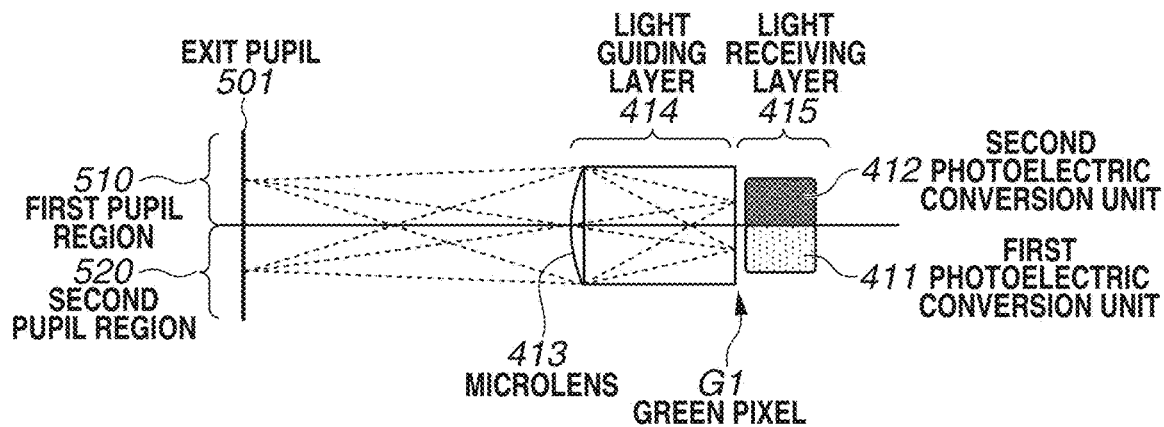
FIGS. 5A to 5D are schematic diagrams illustrating a relationship between a subject distance and incident light in an imaging plane phase difference system.

FIGS. 5A to 5D are schematic diagrams illustrating a relationship between a subject distance and incident light in the imaging plane phase difference system. FIG. 5A is a schematic diagram illustrating an exit pupil 501 of the imaging optical system 301, the green pixel G1 of the image sensor 302 and light that enters each photoelectric conversion unit of the green pixel G1. Although the image sensor 302 includes a plurality of pixels, the description will be given of one green pixel G1 for the sake of simplicity.

The microlens 413 of the green pixel G1 is arranged in such a manner that the exit pupil 501 and the light receiving layer 415 are in an optically-conjugate relation. As a result, a light flux that has passed through a first pupil region 510, a partial pupil region included in the exit pupil 501, enters the first photoelectric conversion unit 411. Similarly, a light flux that has passed through a second pupil region 520, another partial pupil region included in the exit pupil 501, enters the second photoelectric conversion unit 412.

The first photoelectric conversion unit 411 of each pixel photoelectrically converts the received light flux into a signal and outputs the signal. A first image signal is generated from signals output from a plurality of first photoelectric conversion units 411 included in the image sensor 302. The first image signal indicates an intensity distribution of the image formed on the image sensor 302 mainly by light fluxes that have passed through the first pupil region 510.

The second photoelectric conversion unit 412 of each pixel photoelectrically converts the received light flux into a signal and outputs the signal. A second image signal is generated from signals output from a plurality of second photoelectric conversion units 412 included in the image sensor 302. The second image signal indicates an intensity distribution of the image formed on the image sensor 302 mainly by light fluxes that have passed through the second pupil region 520.

A relative positional shift amount (hereinafter, parallax amount) between the first image signal and the second image signal corresponds to a defocus amount. A relationship between the parallax amount and the defocus amount will be described with reference to FIGS. 5B, 5C, and 5D.

Figure 5B:
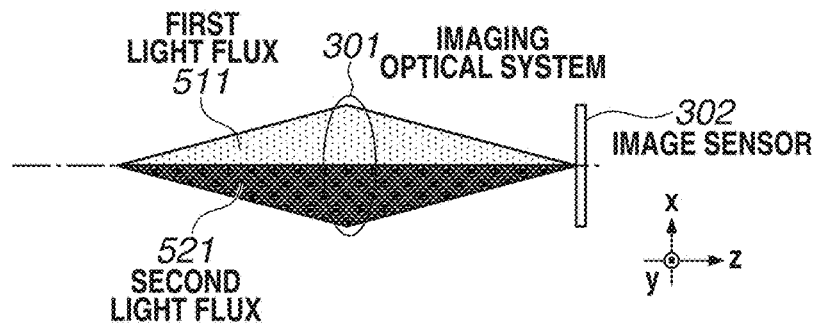
Figure 5C:
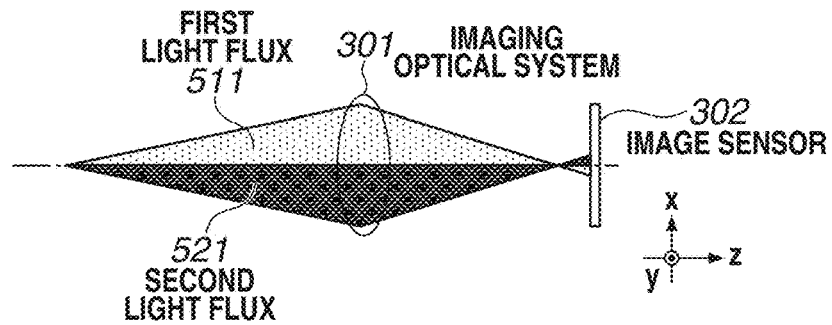
Figure 5D:
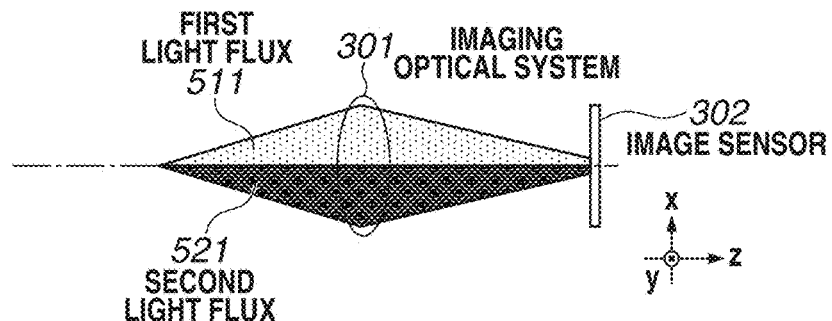

FIGS. 5B, 5C, and 5D are schematic diagrams illustrating the image sensor 302 and the imaging optical system 301. A first light flux 511 passes through the first pupil region 510 and a second light flux 521 passes through the second pupil region 520.

FIG. 5B illustrates an in-focus state in which the first light flux 511 and the second light flux 521 are converged on the image sensor 302. At this time, a parallax amount between a first image signal formed by the first light flux 511, and a second image signal formed by the second light flux 521 is 0.

FIG. 5C illustrates a defocused state in which the focal point is shifted in the negative direction of the z-axis on the image side. At this time, the parallax amount between the first image signal formed by the first light flux 511 and the second image signal formed by the second light flux 521 is not 0 but has a negative value.

FIG. 5D illustrates a defocused state in which the focal point is shifted in the positive direction of the z axis on the image side. At this time, the parallax amount between the first image signal formed by the first light flux 511 and the second image signal formed by the second light flux 521 is not 0 but has a positive value.

By comparison between FIGS. 5C and 5D, it can be seen that a direction in which parallax is generated is switched depending on whether the defocus amount has a positive value or a negative value. It can also be seen from a geometric relationship that the parallax amount corresponding to the defocus amount is generated. Thus, as described below, by detecting the parallax amount between the first image signal and the second image signal using a region-based matching method, the parallax amount can be converted into a defocus amount by using a predetermined conversion coefficient. Furthermore, a defocus amount on the image side can be converted into a distance to an object by using an image formation formula of the imaging optical system 301.

Alternatively, the image sensor 302 can output a synthesized signal of the first image signal and the second image signal and the first image signal to the image processing unit 310. In this case, the image processing unit 310 generates the second image signal based on a difference between the synthesized signal and the first image signal to acquire the first image signal and the second image signal.

Next, processing to be performed by the image processing unit 310 will be described.

FIGS. 6A and 6B are flowcharts illustrating processing to be executed by the image processing unit 310. FIG. 6A is a flowchart illustrating an operation of development processing in which the development unit 311 of the image processing unit 310 generates image data from an image signal. The development processing is executed upon reception of an image signal from the image sensor 302.

In step S601, the development unit 311 executes processing of generating a synthesized image signal by synthesizing a first image signal and a second image signal that have been input from the image sensor 302. By synthesizing the first image signal and the second image signal, an image signal can be obtained based on an image formed by light fluxes having passed through the entire region of the exit pupil 501. When a pixel coordinate in a horizontal direction of the image sensor 302 is denoted by x, and a pixel coordinate in a vertical direction of the image sensor 302 is denoted by y, a synthesized image signal Im(x, y) of a pixel (x, y) can be represented by the following equation (Equation 1) using a first image signal Im1(x, y) and a second image signal Im2(x, y).

$$Im(x,y)=Im1(x,y)+Im2(x,y) \quad \text{(Equation 1)}$$

In step S602, the development unit 311 executes correction processing of a defective pixel of the synthesized image signal. The defective pixel is a pixel that cannot normally output signals in the image sensor 302. The development unit 311 acquires information indicating a coordinate of a defective pixel of the image sensor 302. The development unit 311 generates a synthesized image signal of the defected pixel using a median filter for replacing the signal value of the defective pixel with a median value of synthesized image signals of pixels around the defective pixel. As a method of correcting a defective pixel of a synthesized image signal, a signal value of a defective pixel may be generated by using preliminarily-prepared coordinate information on the defective pixel and making interpolations based on signal values of pixels around the defective pixel.

In step S603, the development unit 311 applies light amount correction processing of correcting a light amount reduction around a field angle generated by the imaging optical system 301, to the synthesized image signal. As a method of correcting a light amount, a light amount can be corrected by multiplying the synthesized image signal by a preliminarily-prepared gain that makes a relative light amount ratio between field angles constant. For example, the development unit 311 performs light amount correction by multiplying a synthesized image signal of each pixel by a gain having a characteristic of increasing from a center pixel of the image sensor 302 toward peripheral pixels.

In step S604, the development unit 311 performs noise reduction processing on the synthesized image signal. As a method of reducing noise, a noise reduction method that uses a Gaussian filter can be employed.

In step S605, the development unit 311 performs demosaic processing on the synthesized image signal, and generates image data including luminance information on each color of red (R), green (G), and blue (B) for each pixel. As a demosaicing method, a method of generating color information on each pixel using linear interpolation for each color channel can be used.

In step S606, the development unit 311 performs gradation correction (gamma correction processing) using a predetermined gamma value. Image data Idc(x, y) of a pixel (x, y) having been subjected to gradation correction is represented by the following equation (Equation 2) using image data Id(x, y) of a pixel (x, y) not subjected to gradation correction, and a gamma value γ.

$$Idc(x,y)=Id(x,y)^\gamma \quad \text{(Equation 2)}$$

A preliminarily-prepared value can be used as the gamma value γ. The gamma value γ may be determined depending on the position of a pixel. For example, the gamma value γ may be varied for each region obtained by dividing an effective region of the image sensor 302 into a predetermined number of divisions.

In step S607, the development unit 311 executes color space conversion processing of converting a color space of image data from an RGB color space into a YUV color space. Using a predetermined coefficient and color space conversion equations (Equations 3), the development unit 311 converts a color space of image data from an RGB color space into a YUV color space by converting image data corresponding to a luminance of each color of red, green, and blue, into a luminance value and a color difference value.

IdcR(x, y) denotes a red image data value of a pixel (x, y) having been subjected to gradation correction. IdcG(x, y) denotes a green image data value of the pixel (x, y) having been subjected to gradation correction. IdcB(x, y) denotes a blue image data value of the pixel (x, y) having been subjected to gradation correction. Y(x, y) denotes a luminance value of the pixel (x, y) that is obtained by color space conversion. U(x, y) denotes a difference (color difference value) between the luminance value of the pixel (x, y) that is obtained by color space conversion, and a blue color component. V(x, y) denotes a difference (color difference value) between the luminance value of the pixel (x, y) that is obtained by color space conversion, and a red color component. Coefficients (ry, gy, gy) are coefficients for obtaining Y(x, y), and coefficients (ru, gu, gu) and (rv, gv, bv) are coefficients for calculating color difference values.

$$Y(x,y)=ry \times IdcR(x,y)+gy \times idcG(x,y)+by \times IdcB(x,y)$$

$$U(x,y)=ru \times IdcR(x,y)+gu \times idcG(x,y)+bu \times IdcB(x,y)$$

$$V(x,y)=rv \times IdcR(x,y)+gv \times idcG(x,y)+bv \times IdcB(x,y) \quad \text{(Equation 3)}$$

In step S608, the development unit 311 executes correction (distortion correction) for suppressing the influence of distorted aberration generated due to an optical characteristic of the imaging optical system 301, on the converted image data. The correction processing of distorted aberration is performed by geometrically deforming image data to correct a distortion ratio of the imaging optical system 301. The geometric deformation is performed using a polynomial equation for generating an uncorrected pixel position from a correct pixel position that does not include distorted aberration. In a case where the uncorrected pixel position has a fractional value, the nearest pixel may be used by rounding the fractional value, or linear interpolation may be used.

In step S609, the development unit 311 outputs image data to which the correction processing of distorted aberration has been applied, to the object information generation unit 320.

The development processing executed by the development unit 311 is then ended.

If the recognition processing unit 321 of the route generation ECU 130, which will be described below, can generate external information by performing externality recognition processing using image data, the development unit 311 needs not execute all pieces of processing illustrated in FIG. 6A. For example, in a case where the recognition processing unit 321 can detect an object within an imaging field angle based on image data to which the correction processing of distorted aberration in step S608 has not been applied, the processing in step S608 may be omitted from the development processing illustrated in FIG. 6A.

FIG. 6B is a flowchart illustrating an operation of distance image data generation processing of that is to be performed by the distance image generation unit 312. The distance image data is data in which distance information corresponding to a distance from the imaging apparatus 110 is associated with each pixel. The distance information may be a distance value D, or may be a defocus amount ΔL or a parallax amount d to be used for calculating a distance value.

In the first exemplary embodiment, the description will be given assuming that the distance image data is data in which a distance value D is associated with each pixel.

In step S611, the distance image generation unit 312 generates a luminance image signal from the input image signal. The distance image generation unit 312 generates a first luminance image signal using the first image signal, and generates a second luminance image signal using the second image signal. The distance image generation unit 312 generates a luminance image signal by synthesizing values of image signals of a red pixel, green pixels, and a blue pixel of each of the pixel groups 410 using a coefficient. The distance image generation unit 312 may generate a luminance image signal by performing demosaic processing using linear interpolation, and then synthesizing values of image signals by multiplying the values by a predetermined coefficient for each channel of red, green, and blue.

In step S612, the distance image generation unit 312 performs correction of a light amount balance between the first luminance image signal and the second luminance image signal. The correction of the light amount balance is executed by multiplying at least one of the first luminance image signal and the second luminance image signal by a correction coefficient. The correction coefficient is preliminarily calculated in such a manner that a luminance ratio between the first luminance image signal and the second luminance image signal obtained by uniformly emitting illumination light after position adjustment of the imaging optical system 301 and the image sensor 302 becomes constant, and is stored in the memory 340. The distance image generation unit 312 generates a first image signal and a second image signal to which light amount balance correction has been applied by multiplying at least one of the first luminance image signal and the second luminance image signal by the correction coefficient.

In step S613, the distance image generation unit 312 performs processing for reducing noise on the first luminance image signal and the second luminance image signal to which light amount balance correction has been applied. The distance image generation unit 312 executes noise reduction processing by applying a lowpass filter for reducing a high spatial frequency band to each luminance image signal. The distance image generation unit 312 may use a bandpass filter for allowing signals within a predetermined spatial frequency band to pass. In this case, it is possible to obtain an effect of reducing the influence of a correction error that can occur in the light amount balance correction performed in step S612.

In step S614, the distance image generation unit 312 calculates a parallax amount, i.e., a relative positional shift amount, between the first luminance image signal and the second luminance image signal. The distance image generation unit 312 sets a target point and a check region centered on the target point in a first luminance image corresponding to the first luminance image signal. Next, the distance image generation unit 312 sets a reference point and a reference region centered on the reference point in a second luminance image corresponding to the second luminance image signal.

The distance image generation unit 312 calculates a degree of correlation between the first luminance image included in the check region, and the second luminance image included in the reference region while sequentially moving the reference point, and sets the reference point with the highest degree of correlation as a corresponding point. The distance image generation unit 312 sets a relative positional shift amount between the target point and the corresponding point as a parallax amount at the target point.

By calculating a parallax amount while sequentially moving the target point, the distance image generation unit 312 can calculate parallax amounts at a plurality of pixel positions.

The distance image generation unit 312 generates parallax image data in which a value indicating a parallax value is identified for each pixel and which indicates a parallax distribution.

A known method can be used as a calculation method of the degree of correlation that is used by the distance image generation unit 312 for obtaining a parallax amount. For example, the distance image generation unit 312 can use a method called normalized cross-correlation (NCC) for evaluating normalized cross-correlation between luminance images. Alternatively, the distance image generation unit 312 may use a method of evaluating a difference degree as a degree of correlation. For example, the distance image generation unit 312 can use the sum of absolute differences (SAD) for evaluating the sum of absolute values of differences between luminance images, or the sum of squared differences (SSD) for evaluating the sum of squared values of differences between luminance images.

In step S615, the distance image generation unit 312 acquires a defocus amount of each pixel by converting a parallax amount of the pixel in the parallax image data into a defocus amount. The distance image generation unit 312 generates defocus image data indicating a defocus amount in each pixel, based on a parallax amount of each pixel in parallax image data. The distance image generation unit 312 calculates a defocus amount $\Delta L(x, y)$ of a pixel $(x, y)$ from the following equation (Equation 4) using a parallax amount $d(x, y)$ of the pixel $(x, y)$ in parallax image data and a conversion coefficient K. In the imaging optical system 301, the first light flux 511 and the second light flux 521 are partially blocked in a peripheral field angle due to vignetting. Thus, the conversion coefficient K becomes a value depending on a field angle (pixel position).

$$\Delta L(x,y)=K(x,y)\times d(x,y) \quad\quad \text{(Equation 4)}$$

In a case where the imaging optical system 301 has a characteristic having an image plane curve changing in focal position between a center field angle and the peripheral field angle, a parallax amount $d(x, y)$ can be converted into a defocus amount $\Delta L(x, y)$ using the following equation (Equation 5), where Cf is an image plane curve amount. By acquiring a relationship between a parallax amount and a value of a distance to an object by capturing an image of a chart after adjusting the positions of the imaging optical system 301 and the image sensor 302, the conversion coefficient K and the imaging plane curve amount Cf can be acquired. At this time, the imaging plane curve amount Cf depends on a field angle, and is given as a function of a pixel position.

$$\Delta L(x,y)=K(x,y)\times d(x,y)=Cf(x,y) \quad\quad \text{(Equation 5)}$$

In step S616, the distance image generation unit 312 converts a defocus amount $\Delta L(x, y)$ of the pixel $(x, y)$ into a distance value $D(x, y)$ to an object in the pixel $(x, y)$, and generates distance image data. By converting the defocus amount $\Delta L$ using a relationship with image formation by the imaging optical system 301, the distance value D to the object can be calculated. When a focal length of the imaging optical system 301 is denoted by f, and a distance from an image side principal point to the image sensor 302 is denoted by Ipp, the defocus amount $\Delta L(x, y)$ can be converted into the distance value $D(x, y)$ to the object using an image formation formula represented by the following equation (Equation 6).

$$D(x, y) = \frac{1}{\{1/f - 1/(Ipp + \Delta L(x, y))\}} \quad \text{(Equation 6)}$$

The focal length f and the distance Ipp from the image side principal point to the image sensor 302 are set to fixed values irrespective of a field angle, but the focal length f and the distance Ipp are not limited to fixed values. In a case where an image formation magnification of the imaging optical system 301 greatly varies for each field angle, at least one of the focal length f and the distance Ipp from the image side principal point to the image sensor 302 may be set to a value varying for each field angle.

In step S617, the distance image generation unit 312 outputs the distance image data to the object information generation unit 320. The distance image generation unit 312 ends the generation processing of distance image data.

The parallax amount d and the defocus amount ΔL of each pixel, and the distance value D from the principal point of the imaging optical system 301 are values that can be converted using the above-described coefficient and conversion equation. Thus, as distance image data to be generated by the distance image generation unit 312, each pixel may include information indicating the parallax amount d or the defocus amount ΔL. When it takes into account that the object information generation unit 320 calculates a representative value of distance values D included in an object region, it is desirable to generate distance image data based on a defocus amount at which a frequency distribution becomes symmetric.

In the processing of calculating a parallax amount in step S614, a corresponding point is searched for using correlation between the first luminance image and the second luminance image. In a case where an amount of noise (for example, noise attributed to light shot noise) included in the first image signal is large, or in a case where there is a small change in signal value among luminance image signals included in the check region, the degree of correlation sometimes cannot be correctly evaluated. In such a case, a parallax amount with a large error from a correct parallax amount is sometimes calculated. In a case where the error in a parallax amount is large, an error in the distance value D generated in step S616 also becomes large.

The generation processing of distance image data that is performed by the distance image generation unit 312 may include reliability degree calculation processing for calculating a reliability degree of a parallax amount (parallax reliability degree). The parallax reliability degree is an index indicating a degree of error included in a calculated parallax amount. For example, a ratio of a standard deviation with respect to an average value of signal values included in the check region can be evaluated as a parallax reliability degree. In a case where a change in signal value in the check region (i.e., contrast) is large, the standard deviation becomes large. In a case where an amount of light that has entered a pixel is large, the average value becomes large. In a case where the amount of light entering a pixel is large, an amount of light shot noise is large. In other words, the average value has a positive correlation with the noise amount.

A ratio (standard deviation/average value) of the average value with respect to the standard deviation corresponds a ratio between the magnitude of contrast and the noise amount. If the contrast is sufficiently large with respect to the noise amount, an error in the calculation of a parallax amount can be estimated to be small. In other words, as a parallax reliability degree is larger, an error in a calculated parallax amount is smaller, and the calculated parallax amount can be said to be a more accurate parallax amount.

In step S614, a parallax reliability degree can be calculated at each target point, and reliability degree data indicating certainty of a distance value of each pixel included in the distance image data can be generated. The distance image generation unit 312 can output the reliability degree data to the object information generation unit 320.

Next, processing in which the object information generation unit 320 generates external information and object distance information based on image data and distance image data will be described.

Figure 7A:
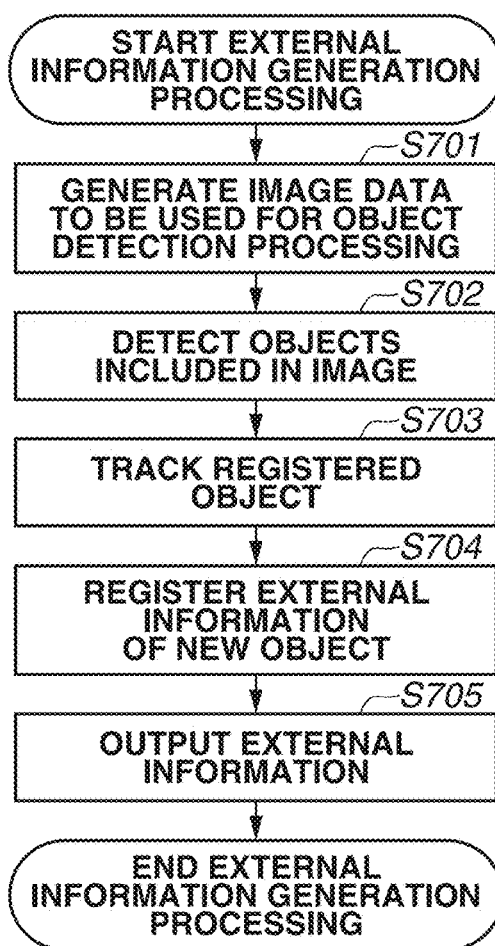
FIGS. 7A and 7B are flowcharts illustrating processing to be executed by a distance information generation unit.
Figure 7B:
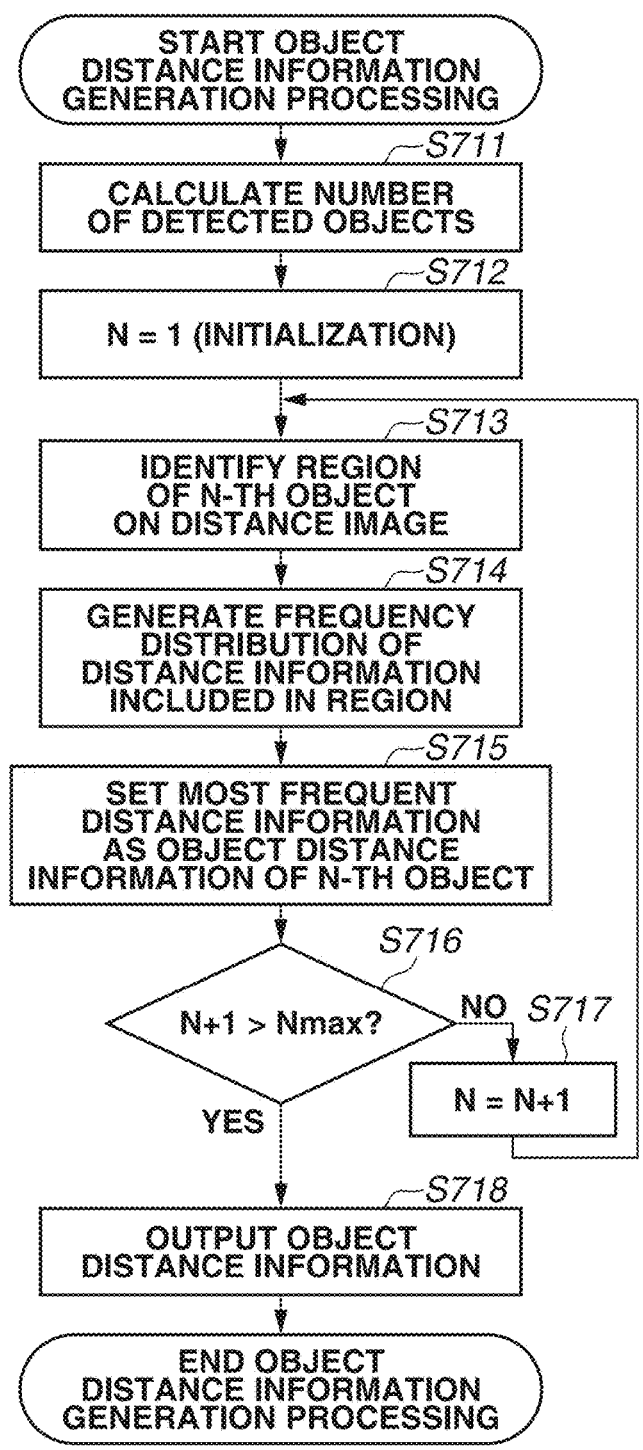

FIGS. 7A and 7B are flowcharts illustrating processing to be executed by the object information generation unit 320. FIGS. 8A to 8E schematic diagrams each illustrating images and information in the processing to be performed by the object information generation unit 320.

The recognition processing unit 321 generates external information indicating a position of the image in an image that is based on the image data and a size such as a width and a height of the object, region information indicating a region of the object, and a type (attribute) and an identification number (ID number) of the object. The identification number is identification information for identifying the detected object, and is not limited to a number. The recognition processing unit 321 detects the type of an object present within an imaging field angle of the imaging apparatus 110 and the position and the size of the object in the image, and at the same time determines whether the object is a registered object and allocates an identification number.

Figure 8A:
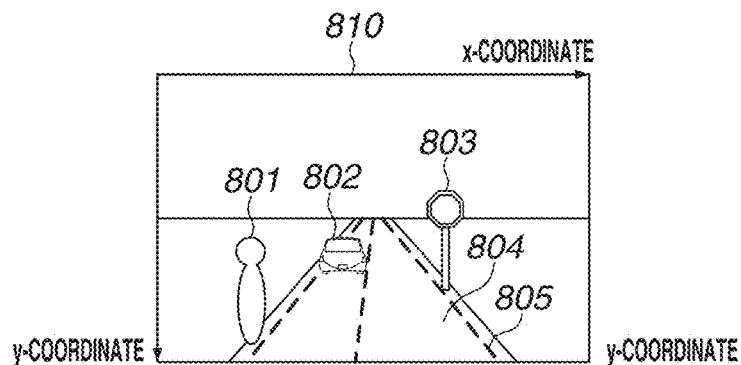
FIGS. 8A to 8E are schematic diagrams each illustrating an image and information in processing to be performed by the distance information generation unit.
Figure 8B:
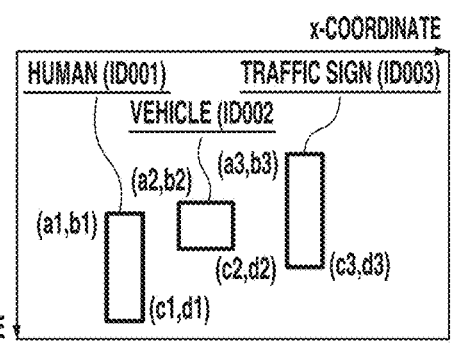

FIG. 8A illustrates an image 810 that is based on image data acquired by the imaging apparatus 110 and input to the object information generation unit 320. The image 810 includes a human 801, a vehicle 802, a traffic sign 803, a road 804, and a lane 805. The recognition processing unit 321 detects objects from the image 810, and generates external information indicating the type, an identification number, and region information on each object. FIG. 8B is a schematic diagram illustrating external information about the objects detected from the image 810, and the objects are indicated on an x-y coordinate plane at positions corresponding to those illustrated in the image 810. For example, the external information is generated as a table as represented by Table 1. In the external information, a region of an object is defined as a rectangular frame (object frame) surrounding the object. In the external information, region information about an object includes a top-left coordinate (x0, y0) and a bottom-right coordinate (x1, y1) that indicate the shape of a rectangular object frame.

TABLE 1

| Identification number | Type | Top-left coordinate (x0, y0) | Bottom-right coordinate (x1, y1) |
|---|---|---|---|
| ID001 | Human | (a1, b1) | (c1, d1) |
| ID002 | Vehicle | (a2, b2) | (c2, d2) |
| ID003 | Traffic sign | (a3, b3) | (c3, d3) |

FIG. 7A is a flowchart illustrating processing in which the recognition processing unit 321 generates external information. The recognition processing unit 321 starts processing of generating external information upon acquiring image data.

In step S701, the recognition processing unit 321 generates image data to be used for object detection processing, from image data. The recognition processing unit 321 performs processing of expanding or reducing the size of image data input from the image processing unit 310 to a size determined from detection performance and a processing time in the object detection processing.

In step S702, the recognition processing unit 321 executes processing of detecting an object included in an image that is based on the image data, and detects a region in the image that corresponds to the object and the type of the object. The recognition processing unit 321 may detect a plurality of objects from one image. In this case, the recognition processing unit 321 identifies the respective types and regions of the plurality of detected objects.

The recognition processing unit 321 generates, as external information, a position and a size (horizontal width, vertical height) of a region in an image from which an object is detected, and the type of the object. Examples of types of objects that can be detected by the recognition processing unit 321 include vehicle (passenger vehicle, bus, truck), human, two-wheeled vehicle, and traffic sign. By comparing an external form of an object in the image with a predetermined external form pattern preliminarily associated with a type of an object, the recognition processing unit 321 detects an object, and identifies the type of the detected object. The types of objects that can be detected by the recognition processing unit 321 are not limited to the above-described types. In terms of processing speed, however, it is desirable to narrow down the number of types of objects to be detected, depending on the driving environment of the vehicle 100.

In step S703, the recognition processing unit 321 tracks an object of which an identification number has been already registered. The recognition processing unit 321 identifies an object of which an identification number has been already registered from among the objects detected in step S702. The object of which an identification number has been registered is, for example, an object that has been detected in previous object detection processing, and has allocated an identification number. In a case where an object of which an identification number has been registered is detected, the recognition processing unit 321 associates external information corresponding to the identification number with information regarding the type and the region of the object that have been acquired in step S702 (i.e., updates external information).

In a case where it is determined that an object of which an identification number has been registered does not exist in the image, it is determined that the object associated with the identification number has moved to the outside of an imaging field angle of the imaging apparatus 110 (i.e., the object has been lost), and tracking is stopped.

In step S704, the recognition processing unit 321 determines whether each of the objects detected in step S702 is a new object of which an identification number has not been registered, allocates a new identification number to external information indicating the type and the region of an object determined as a new object, and then registers the external information.

In step S705, the recognition processing unit 321 outputs the generated external information to the route generation apparatus 150 together with information indicating a time.

The recognition processing unit 321 ends the generation processing of external information.

FIG. 7B is a flowchart illustrating generation processing of distance information on each object that is to be performed by the distance information generation unit 322. Based on external information and distance image data, the distance information generation unit 322 generates object distance information indicating a distance value of each of the detected objects.

Figure 8C:
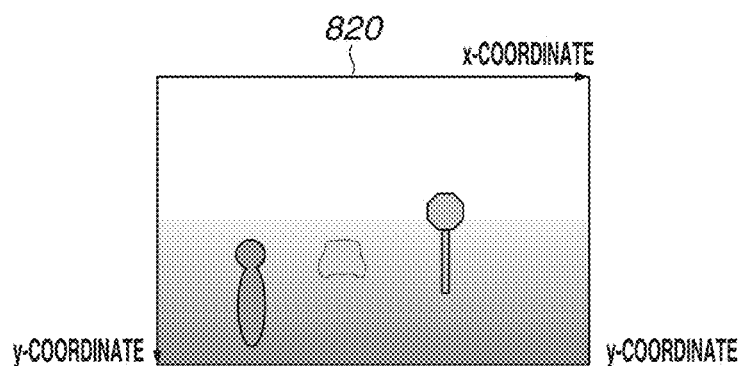

FIG. 8C illustrates a distance image 820 based on distance image data that corresponds to the image 810 based on the image data illustrated in FIG. 8A. In the distance image 820, distance information is indicated by a density of color. A darker color indicates a shorter distance, and a lighter color indicates a longer distance.

In step S711, the distance information generation unit 322 calculates the number of detected objects by counting the number Nmax of objects detected by the recognition processing unit 321.

In step S712, the distance information generation unit 322 sets N to 1 (initialization processing). The processing in step S713 and subsequent steps is sequentially executed on each of the objects indicated by the external information. The processing in steps S713 to S716 is executed on the object in order from an object with a smaller identification number in the external information.

Figure 8D:
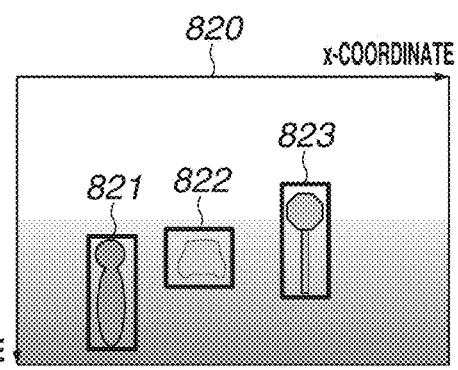

In step S713, the distance information generation unit 322 identifies a rectangular region on the distance image 820 that corresponds to a region (object frame) on the image 810 of an N-th object included in the external information. The distance information generation unit 322 sets a frame (object frame) indicating an external form of a corresponding region on the distance image 820. FIG. 8D is a schematic diagram illustrating frames indicating external forms of regions set in the distance image 820, which are superimposed on respective objects detected from the image 810. As illustrated in FIG. 8D, the distance information generation unit 322 sets an object frame 821 corresponding to the human 801, an object frame 822 corresponding to the vehicle 802, and an object frame 823 corresponding to the traffic sign 803, on the distance image 820.

In step S714, the distance information generation unit 322 generates a frequency distribution of distance information on pixels included in a rectangular region in the distance image 820 that corresponds to the N-th object. In a case where information associated with each pixel of distance image data is a distance value D, sections of the frequency distribution are set in such a manner that inverses of distances are set at equal intervals. In a case where a defocus amount or a parallax amount is associated with each pixel of distance image data, it is desirable to compartment the frequency distribution into sections at equal intervals.

In step S715, the distance information generation unit 322 sets most frequent distance information in the frequency distribution as object distance information indicating a distance of the N-th object.

Alternatively, an average value of distance values included in a region may be calculated and set as object distance information. When an average value is calculated, weighted averaging can be employed using reliability degree data. By setting a larger weight to each pixel as a reliability degree of a distance value is higher, it is possible to calculate a distance value of an object more accurately.

For facilitating route generation in route generation processing to be described below, it is desirable to set information indicating a distance to an object from a predetermined position of the vehicle 100 as object distance information. In a case where a distance value D, which indicates a distance from the image sensor 302 to an object, is used as distance information, information indicating a distance to an object from a predetermined position of the vehicle 100 can be obtained by offsetting a mode value by a predetermined amount. In a case where a defocus amount ΔL is used as distance information, information indicating a distance to an object from a predetermined position of the vehicle 100 can be obtained by converting the distance information into a distance from the image sensor 302 using Equation 6, and then offsetting the converted distance by a predetermined amount.

In step S716, the distance information generation unit 322 determines whether N is larger than the number of detected objects Nmax+1. In a case where N is larger than the number of detected objects Nmax+1 (YES in step S716), the processing proceeds to step S717. In step S717, the distance information generation unit 322 sets N+1 as N, and the processing returns to step S713. In other words, extraction of object distance information is performed for the next object ((N+1)th object). In a case where N is equal to or larger than the number of detected objects Nmax+1 (NO in step S716), the processing ends.

In step S718, the distance information generation unit 322 outputs pieces of object distance information corresponding to N objects, to the route generation unit 330 together with information regarding a time, and the processing ends.

Through the above-described object distance information generation processing, object distance information is generated for each of the objects included in external information. In particular, by statistically determining distance information about an object from among pieces of distance information included in a region of the distance image 820 that corresponds to the object detected in the image 810, it is possible to suppress a variation in distance information among pixels that is attributed to noise and calculation accuracy. It is accordingly possible to acquire information indicating a distance to an object more accurately. Various methods can be employed as a method of statistically determining distance information. For example, a method of extracting most frequent distance information, an average value, or a median value from the distribution of distance information.

Next, processing (route generation processing) of generating route information that is to be executed by the route generation unit 330 of the route generation ECU 130 will be described. The route information is information including a traveling direction and a speed of a vehicle. The route information can also be referred to as driving plan information. The route generation unit 330 outputs the route information to the vehicle control ECU 140. Based on the route information, the vehicle control ECU 140 controls the drive unit 170.

In the first exemplary embodiment, in a case where a vehicle (leading vehicle) exists in the traveling direction of the vehicle 100, the route generation unit 330 generates route information in such a manner that the vehicle 100 travels to follow the leading vehicle. In addition, the route generation unit 330 generates route information in such a manner that the vehicle 100 executes an avoidance behavior so as not to collide with an object.

Figure 9:
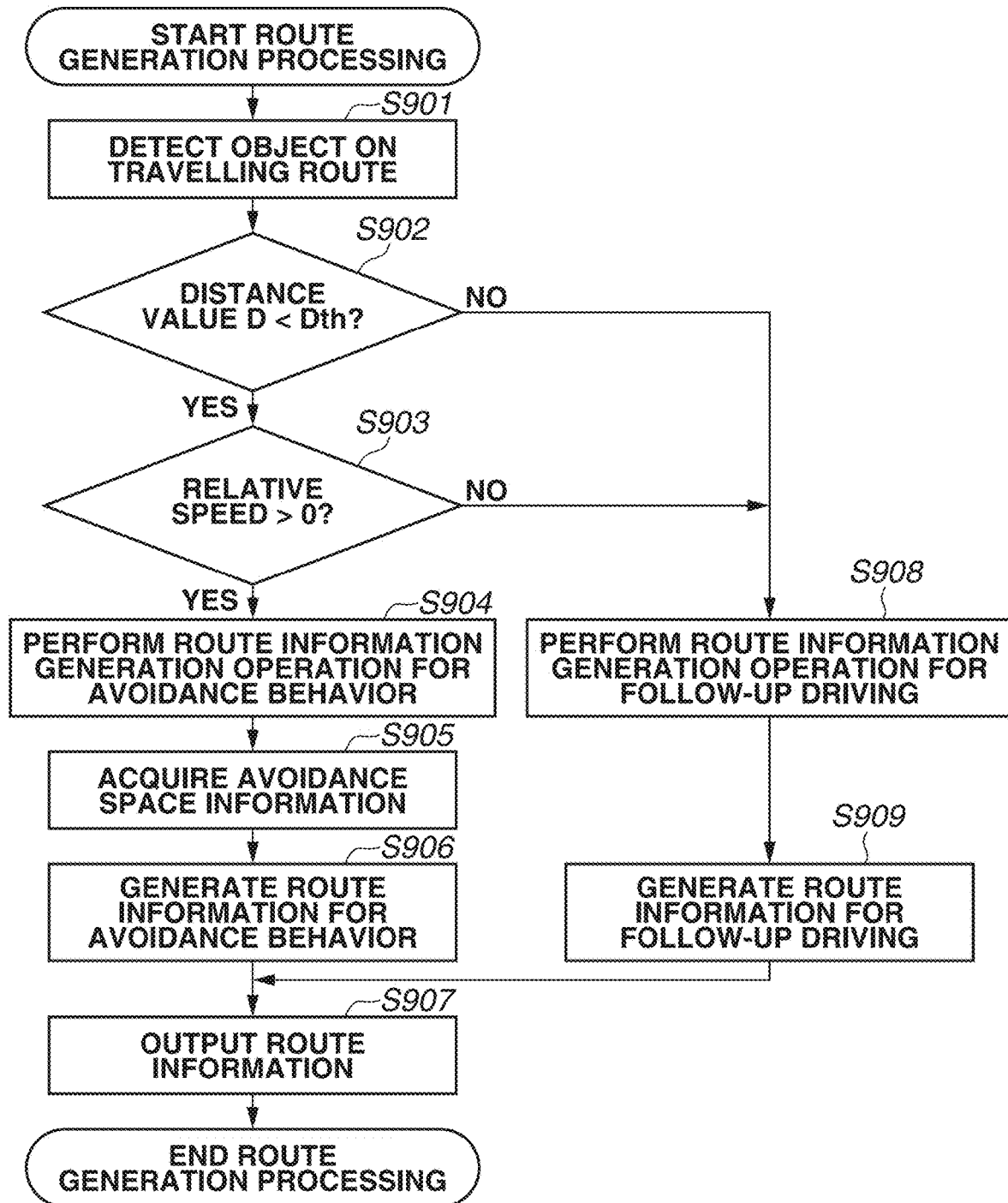
FIG. 9 is a flowchart illustrating route generation processing to be executed by a route generation unit.

FIG. 9 is a flowchart illustrating route generation processing to be executed by the route generation unit 330. The route generation unit 330 generates route information about the vehicle 100 based on the external information, the object distance information, and the distance information generated by the radar apparatus 120. The route generation ECU 130 reads the external information and the object distance information at each time and the distance information generated by the radar apparatus 120 from the memory 340 included in the route generation apparatus 150, and starts the route generation processing.

In step S901, the route generation unit 330 detects an object on a travelling route on which the vehicle 100 is planning to drive, based on the external information and the object distance information. The route generation unit 330 determines an object on the travelling route by comparing an azimuth direction of the traveling direction in which the vehicle 100 is planning to drive with positions and types of objects that are included in the external information. The traveling direction in which the vehicle 100 is planning to drive is identified based on information regarding the braking of the vehicle 100 (steering yaw angle amount, speed, etc.) that has been acquired from the vehicle control ECU 140. In a case where no object is detected on the travelling route, the route generation unit 330 determines that "no object has been detected".

It is assumed that the imaging apparatus 110 has acquired the image 810 illustrated in FIG. 8A. In a case where the route generation unit 330 determines that the vehicle 100 is travelling in a direction extending along the lane 805 based on the information regarding the braking of the vehicle 100 that has been acquired from the vehicle control ECU 140, the route generation unit 330 detects the vehicle 802 as an object on a travelling route.

In steps S902 and S903, based on a distance between the vehicle 100 and the object on the travelling route, and a traveling speed Vc of the vehicle 100, the route generation unit 330 determines whether to generate route information for performing follow-up driving or generate route information for performing an avoidance behavior.

In step S902, the route generation unit 330 determines whether a distance between the vehicle 100 and the object on the travelling route is shorter than a threshold value Dth. The threshold value Dth is represented by a function of the traveling speed Vc of the vehicle 100. As the traveling speed Vc becomes higher, the threshold value Dth becomes larger. In a case where the route generation unit 330 determines that a distance between the vehicle 100 and the object on the travelling route is shorter than the threshold value Dth (YES in step S902), the processing proceeds to step S903. In a case where the route generation unit 330 determines that a distance between the vehicle 100 and the object on the travelling route is equal to or larger than the threshold value Dth (NO in step S902), the processing proceeds to step S908.

In step S903, the route generation unit 330 determines whether a relative speed between the vehicle 100 and the object on the travelling route has a positive value. The route generation unit 330 acquires an identification number of the object on the travelling route from external information, and acquires object distance information about the object on the travelling route at each time from external information acquired during a time period between the present time and a predetermined earlier time. From the acquired object distance information about the object on the travelling route in the time period up to the predetermined earlier time, the route generation unit 330 calculates a relative speed between the vehicle 100 and the object on the travelling route. In a case where the relative speed is a positive value, the vehicle 100 and the object on the travelling route are getting closer.

In a case where the route generation unit 330 determines that a relative speed between the vehicle 100 and the object on the travelling route has a positive value (YES in step S903), the processing proceeds to step S904. In a case where the route generation unit 330 determines that a relative speed between the vehicle 100 and the object on the travelling route does not have a positive value (NO in step S903), the processing proceeds to step S908.

In a case where the processing proceeds to step S904, route information for executing an avoidance behavior is generated. In contrast, in a case where the processing proceeds to step S908, route information for executing follow-up driving is generated.

In other words, in a case where the route generation unit 330 determines that a distance between the vehicle 100 and the object on the travelling route is shorter than the threshold value Dth, and a relative speed between the vehicle 100 and the object on the travelling route is a positive value in steps S902 and S903, the route generation unit 330 determines to execute an avoidance behavior. In a case where a distance between the vehicle 100 and the object on the travelling route is equal to or larger than the threshold value Dth, the route generation unit 330 determines to perform follow-up driving. In a case where a distance between the vehicle 100 and the object on the travelling route is shorter than the threshold value Dth, and a relative speed between the vehicle 100 and the object on the travelling route has a negative value, the route generation unit 330 also determines to perform follow-up driving.

In a case where a distance between the vehicle 100 and the object on the travelling route is shorter than the threshold value Dth obtained from the speed of the vehicle 100, and a relative speed between the vehicle 100 and the object on the travelling route has a positive value, it is considered that the vehicle 100 is highly likely to collide with the object on the travelling route. Thus, the route generation unit 330 generates route information in such a manner that the vehicle 100 executes an avoidance behavior. If not, the route generation unit 330 performs follow-up driving.

Determination as to whether the type of the detected object on the travelling route is a movable body (vehicle such as a passenger vehicle) may be added to the above-described determination.

In step S904, the route generation unit 330 starts processing of generating route information for executing an avoidance behavior.

In step S905, the route generation unit 330 acquires information regarding an avoidance space. The route generation unit 330 acquires distance information indicating distances to objects existing on the sides or the rear side of the vehicle 100 from the radar apparatus 120. Based on the distance information acquired from the radar apparatus 120, the speed of the vehicle 100, and information indicating the size of the vehicle 100, the route generation unit 330 acquires information indicating a direction and a size of a space around the vehicle 100 to which the vehicle 100 can move.

In step S906, the route generation unit 330 sets route information for an avoidance behavior based on the information indicating a direction and a size of a space to which the vehicle 100 can move, external information, and object distance information. In a case where a space exists on the right side of the vehicle 100, for example, the route information for an avoidance behavior is information for driving the vehicle 100 rightward while decelerating.

In step S907, the route generation unit 330 outputs the route information to the vehicle control ECU 140. Based on the route information, the vehicle control ECU 140 determines a parameter for controlling the drive unit 170 in such a manner that the vehicle 100 drives along a route indicated by the acquired route information, and controls the drive unit 170. Specifically, based on the route information, the vehicle control ECU 140 determines a steering yaw angle amount, a control value of an accelerator, a control value of a brake, a control signal for connection of a gear, and a lighting control signal of a lamp.

In step S908, the route generation unit 330 starts processing of generating route information for executing follow-up driving.

In step S909, the route generation unit 330 generates route information for the vehicle 100 to follow the object on the travelling route (leading vehicle). Specifically, the route generation unit 330 generates route information in such a manner that a distance (inter-vehicle distance) between the vehicle 100 and a leading vehicle running in front of the vehicle 100 is kept within a predetermined range. For example, in a case where a relative speed between the vehicle 100 and the leading vehicle has a positive value, and an inter-vehicle distance is shorter than a predetermined range, the route generation unit 330 generates route information in such a manner that the vehicle 100 decelerates while maintaining the traveling direction in a straightforward direction.

The route generation unit 330 generates route information in such a manner that a traveling speed of the vehicle 100 does not exceed a predetermined value (for example, a legal speed of a road on which the vehicle 100 is driving, a set traveling speed that is based on an instruction from the driver 101). The processing proceeds to step S907, and the vehicle control ECU 140 controls the drive unit 170 based on the generated route information.

The route generation unit 330 ends the generation processing of route information. The generation processing of route information is repeatedly executed while the vehicle 100 is driving.

According to the above-described control, by integrating distance information within a frame that is based on the position and the size of an object in an image, it is possible to reduce the influence of sensor noise and the influence of a local distance error attributed to high-luminance reflection from a subject, and calculate a value of a distance to each object highly accurately. Because the route generation ECU 130 can accurately calculate a route of the vehicle 100 due to a more accurate distance value to each object, the vehicle 100 can drive more stably.

Modified Example 1

In the above-described processing, a rectangular region (object frame) encompassing an object is used as a region of the object, but a region defined by an outer periphery of an object in an image may be used as a region of the object. In step S702, the recognition processing unit 321 stores a region in the image 810 in which an object exists, in external information as a region of the object. For example, the recognition processing unit 321 can divide a region for each object by identifying an attribute for each pixel of image data.

Figure 8E:
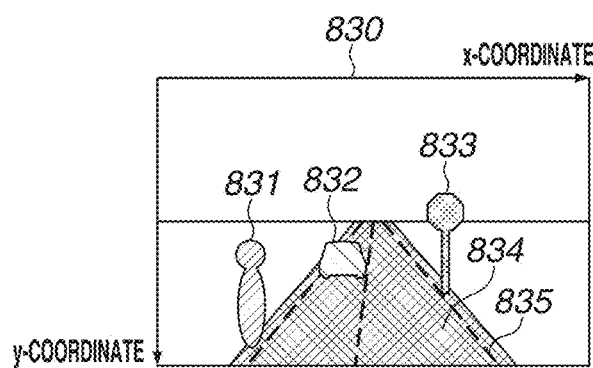

The image 830 in FIG. 8E is a schematic diagram illustrating regions divided by the recognition processing unit 321 for the respective objects, and superimposed on the image 810. A region 831 indicates a region of the human 801, a region 832 indicates a region of the vehicle 802, and a region 833 indicates a region of the traffic sign 803. Furthermore, a region 834 indicates a region of the road 804 and a region 835 indicates a region of the lane 805.

In this case, in steps S713 and S714, the distance information generation unit 322 calculates a frequency distribution of distance values included in a region of each object, for each of the regions illustrated in FIG. 8E.

By defining regions of objects in this manner, distance information on a region other than an object such as a background becomes less likely to be included in a region. In other words, it is possible to further reflect distance information about an object in a distribution of distance information included in a region. It is therefore possible to calculate a distance value of an object more accurately because the influence of a region other than an object such as a background or a foreground of an object can be reduced.

Modified Example 2

From the imaging apparatus 110 according to the first exemplary embodiment, image information and distance image information are sequentially output. Furthermore, the recognition processing unit 321 sequentially generates external information using the sequentially-received image information. The external information includes identification numbers of objects. In a case where objects having the same identification number have been detected at a certain time T0 and a time T1, a temporal change in distance information and a detected size of the object can be determined. In Modified Example 2, the distance information generation unit 322 calculates an average of distance values D of objects having the same identification number in a predetermined time range. A variation in distance in a temporal direction is thereby reduced.

Figure 10:
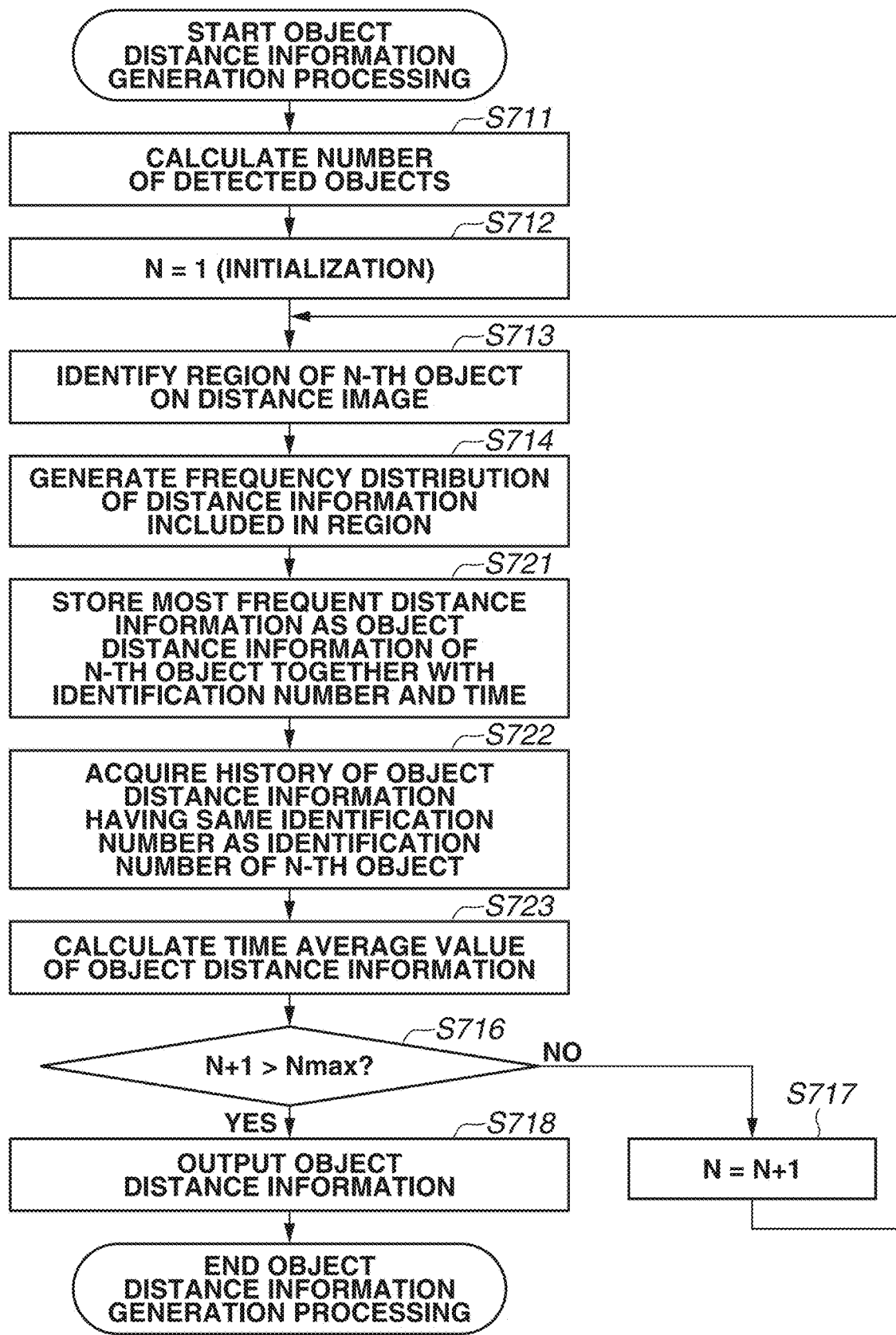
FIG. 10 is a flowchart illustrating object distance information generation processing to be performed by the distance information generation unit.

FIG. 10 is a flowchart illustrating object distance information generation processing to be performed by the distance information generation unit 322 according to Modified Example 2. Among processes in the flowchart illustrated in FIG. 10, processes assigned the same step numbers as those in the processing illustrated in FIG. 7B are the same as the processes in the above-described processing. Thus, the description of these processes will be omitted.

In step S721, the distance information generation unit 322 sets the most frequent distance information in the frequency distribution as object distance information indicating a distance of the N-th object. Then, the distance information generation unit 322 stores the object distance information into the memory 340 together with an identification number and a time.

Figure 11:
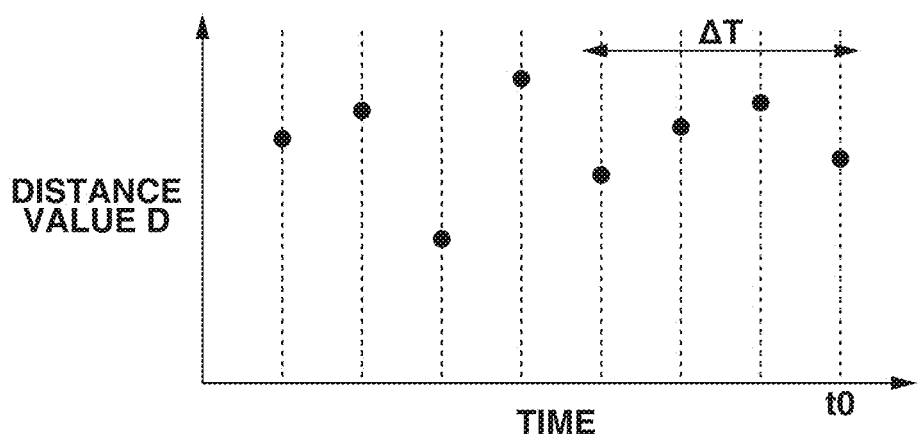
FIG. 11 is a schematic diagram illustrating a temporal change in object distance information on an object having the same identification number as an N-th object.

In step S722, the distance information generation unit 322 acquires a history of object distance information having the same identification number as the identification number of the N-th object, from among pieces of object distance information stored in the memory 340. The distance information generation unit 322 acquires object distance information having the same identification number that corresponds to a time earlier by a predetermined time period than a time corresponding to the latest object distance information. FIG. 11 is a schematic diagram illustrating a temporal change in object distance information about an object having the same identification number as the N-th object. A horizontal axis indicates a time and a vertical axis indicates object distance information (distance value D). The time t0 indicates a time at which the latest distance value D is acquired.

In step S723, the distance information generation unit 322 calculates an average value of object distance information included in a time range between a time at which the latest object distance information is acquired and a time earlier than the latest acquisition time by the predetermined time period, from the acquired history of object distance information about the object having the same identification number as the N-th object. For example, the distance information generation unit 322 calculates an average value of four distance values included in a predetermined time range ΔT in FIG. 11.

In the above-described manner, by acquiring a history of object distance information (distance value) on the same object using an identification number included in external information, and calculating a time average, it is possible to suppress a variation. Even in a case where a road on which the vehicle 100 drives changes (for example, curved road, sloping road, rough road with many unevenness), it is possible to calculate an average value in the time direction while tracking the same object. It is accordingly possible to calculate a distance value of an object more accurately by reducing a variation in distance value that is attributed to noise such as light shot noise included in an image signal, while reducing the influence of a driving environment change.

Modified Example 3

In Modified Example 2 described above, a variation is suppressed by calculating a time average of object distance information having the same identification number. When an average of a history of object distance information is calculated within a predetermined time range, the number of samples used in the averaging can be increased by using a longer time range. It is thus possible to further reduce a variation in a distance value from the vehicle 100 to an object. Nevertheless, in a case where a distance from the vehicle 100 to an object changes within the predetermined time range, because an average is calculated including the change in distance, there is a possibility that a distance value from the vehicle 100 to an object cannot be correctly estimated. In Modified Example 3, by calculating a weighted average of object distance information using a size of an object having the same identification number, it is possible to acquire a distance between the vehicle 100 and an object more accurately.

Figure 12:
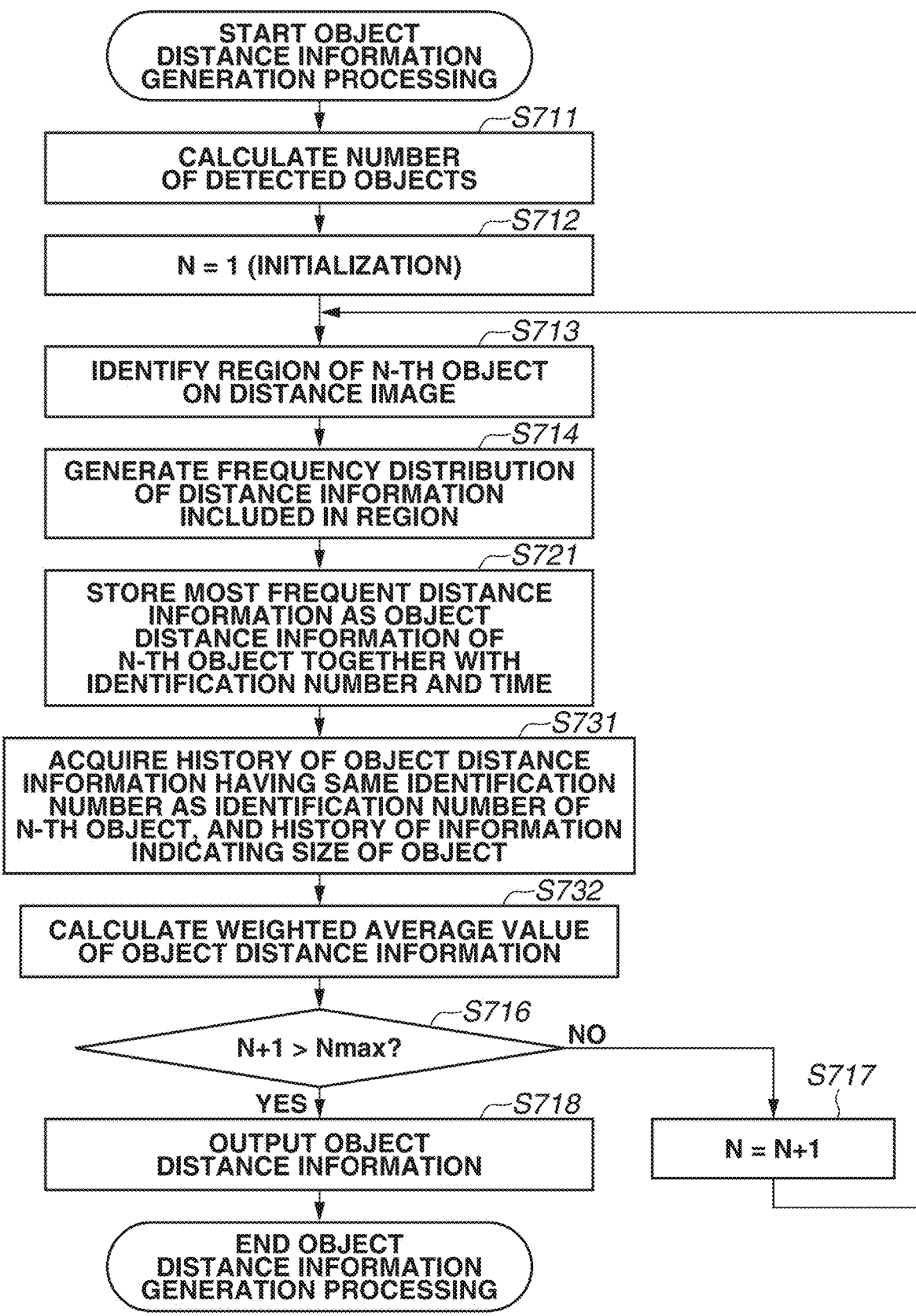
FIG. 12 is a flowchart illustrating object distance information generation processing to be performed by a distance information generation unit.

FIG. 12 is a flowchart illustrating object distance information generation processing to be performed by the distance information generation unit 322 according to Modified Example 3. Among processes in the flowchart illustrated in FIG. 12, processes assigned the same step numbers as those in the processing illustrated in FIG. 7B are the same as the processes in the above-described processing. Thus, the description of these processes will be omitted.

In step S721, the distance information generation unit 322 sets the most frequent distance information in the frequency distribution as object distance information indicating a distance of the N-th object. Then, the distance information generation unit 322 stores the object distance information into the memory 340 together with an identification number and a time.

In step S731, the distance information generation unit 322 acquires a history of object distance information on an object having the same identification number as the identification number of the N-th object, and a history of information indicating a size of the object, from the memory 340. The information indicating a size of the object is acquired from information indicating an object frame that is stored in external information. For example, based on a top-left coordinate (x0, y0) and a bottom-right coordinate (x1, y1), a width (x1-x0) is obtained as information indicating a size of the object.

In step S732, using information indicating a size of the object having the same identification number as the identification number of the N-th object, the distance information generation unit 322 performs weighted averaging processing on object distance information having the same identification number that corresponds to a time earlier by a predetermined time period than a time corresponding to the latest object distance information. A weight coefficient at each time is determined using an object size at a corresponding time.

Figure 13A:
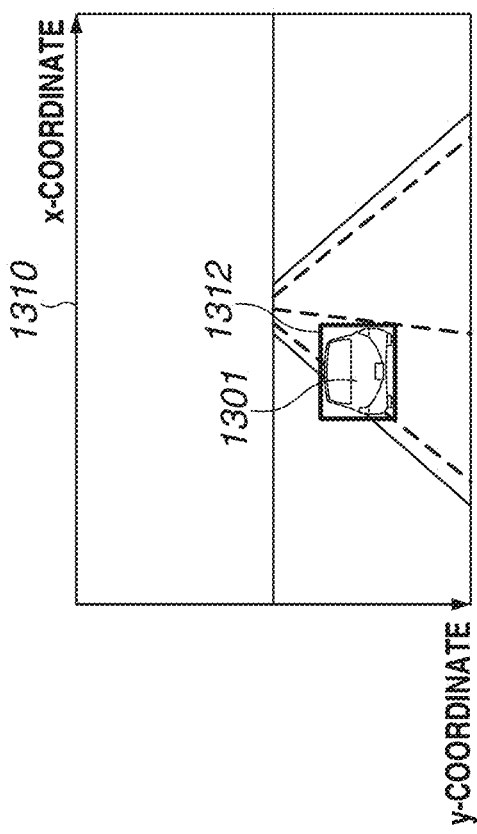
FIGS. 13A to 13D are schematic diagrams illustrating weighted averaging.

FIGS. 13A to 13D are schematic diagrams illustrating weighted averaging. FIG. 13A is a schematic diagram illustrating an image 1300 that is based on image data acquired by the imaging apparatus 110 at a time t1 earlier than the time t0 corresponding to the latest object distance information. The image 1300 includes a vehicle 1301. A frame 1302 indicates an object frame of the vehicle 1301 that is determined from the image 1300.

Figure 13B:
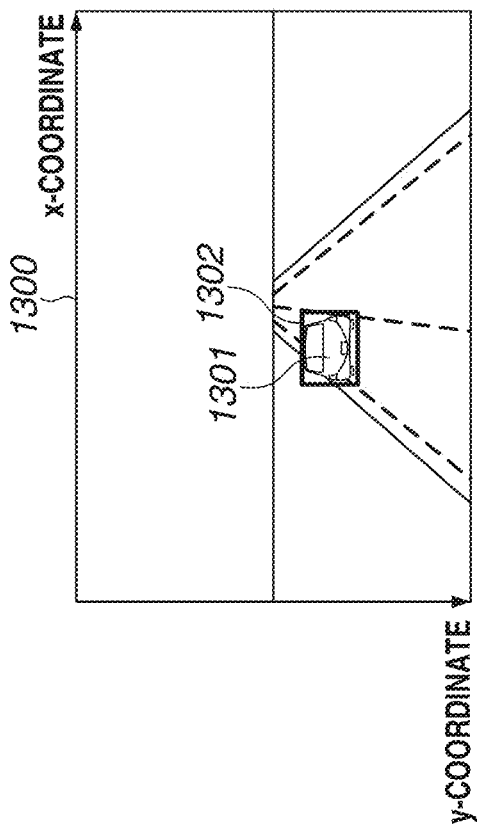

FIG. 13B is a schematic diagram illustrating an image 1310 that is based on image data acquired by the imaging apparatus 110 at the time t0. Similarly to the image 1300, the image 1310 includes the vehicle 1301. A frame 1312 indicates an object frame corresponding to the vehicle 1301 in the image 1310. At the time t0, a size of the vehicle 1301 in the image 1310 is larger than a size of the vehicle 1301 in the image 1300 acquired at the time t1. The object frame 1312 is accordingly larger than the object frame 1302.

Because a size of an object in an image is proportional to a lateral magnification of the imaging optical system 301, a distance between an object and the vehicle 100 and an inverse of an object size on image information are in a proportional relation. Based on comparison between object sizes at different times on image information, for example, in a case where the size becomes larger, it can be determined that a distance between an object and the vehicle 100 has become shorter. In contrast, in a case where the size becomes smaller, it can be determined that a distance between an object and the vehicle 100 has become longer. In a case where there is a small change in size, it can be determined that a change in distance between an object and the vehicle 100 is small.

Hereinafter, the description will be given of an example in which distance information is acquired assuming that the vehicle 1301 is an N-th object.

Figure 13C:
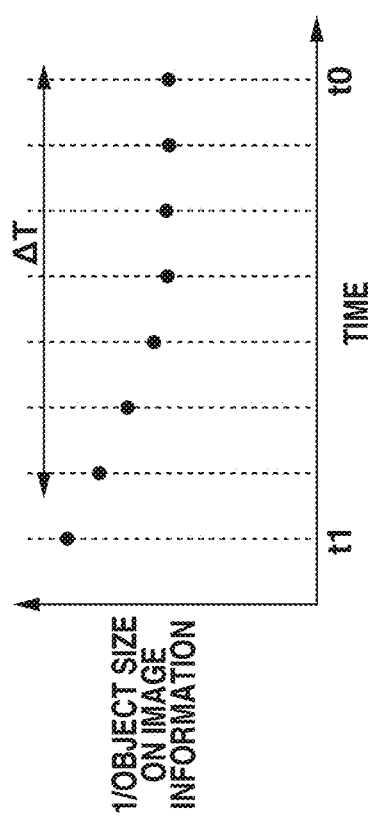
Figure 13D:
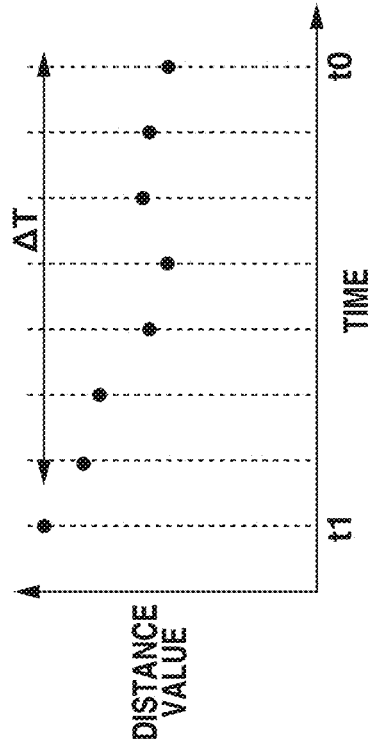

FIG. 13C is a schematic diagram illustrating a temporal change in object distance information on an object having the same identification number as the vehicle 1301 (N-th object). FIG. 13D is a schematic diagram illustrating a temporal change in an inverse of information (width) indicating a size of an object having the same identification number as the vehicle 1301 (N-th object).

In step S732, the distance information generation unit 322 compares an inverse of a size (width) of the object at each time in a time range from the time t0 to a time earlier than the time t0 by the predetermined time period, with an inverse of a size (width) of the object at the time t0. The distance information generation unit 322 determines a weight coefficient in such a manner as to be smaller as an absolute value of a difference in inverse of the size (width) of the object is larger. The relationship between the inverse of the size (width) of the object and a weighting coefficient is not limited to that in the above-described example. For example, a weighting coefficient may be determined in accordance with a ratio of an inverse of the size (width) of the object at each time to an inverse of the size (width) of the object at the time t0.

In step S732, the distance information generation unit 322 calculates a weighted average of object distance information using a weighting coefficient, and sets the weighted average as object distance information about the vehicle 1301 at the time t0.

According to the processing in Modified Example 3, by calculating a weighted average of object distance information using a weight coefficient determined using a size of an object on an image, an estimation error of a distance value that is attributed to a relative distance change from the vehicle 100 to an object can be reduced.

Hereinafter, a second exemplary embodiment will be described. In the first exemplary embodiment, a distance (object distance information) to an object included in an image is acquired highly accurately by statistically processing distance data on the object that has been acquired using the imaging plane phase difference system. In the second exemplary embodiment, by combining a distance calculation method that uses the imaging plane phase difference system and a distance calculation method that uses image recognition, a distance to an object can be acquired more accurately. Hereinafter, a distance calculation method and distance calculation processing that is based on the method will be referred to as "ranging".

Hereinafter, the second exemplary embodiment will be described in detail with reference to the drawings. The following processing can be executed by any of processors included in the image processing unit 310 and the object information generation unit 320 of the imaging apparatus 110, and the route generation ECU 130, or a combination of these. In the following description, the distance information generation unit 322 of the object information generation unit 320 executes the following processing. The second exemplary embodiment is not limited to this configuration.

In the description to be given with reference to the drawings, the same components illustrated in different drawings are assigned the same reference numerals in principle, and the redundant description will be omitted.

In the second exemplary embodiment, the route generation apparatus 150 corrects a measured distance value by combination of imaging plane phase difference ranging and ranging that uses image recognition.

The imaging plane phase difference ranging is ranging that uses the imaging plane phase difference system described in the first exemplary embodiment.

The ranging that uses image recognition is ranging (object width ranging) for calculating a distance from a width of an object detected based on object recognition, or ranging (grounding position ranging) for calculating a distance from a position where an object is in contact with the ground surface, which is hereinafter referred to as a grounding position of an object.

In the object width ranging, a distance to an object is calculated using characteristics that a distance to an object is longer as the number of pixels in a width of the object on an image becomes smaller, and shorter as the number of pixels in a width of the object on an image becomes larger. Other parameters indicating a size of an object on an image in a height direction and an oblique direction can be similarly used for the calculation of a distance.

In the grounding position ranging, assuming that an object is in contact with a road surface, for example, a distance from the vehicle 100 to the object is calculated based on a distance between a grounding line (lower end in an image in which the road surface exists on the lower side) on an image of the object, and a vanishing point on the image. As the grounding line is closer to the vanishing point, the object is farther from the vehicle 100, and as the grounding line is farther from the vanishing point, the object is closer to the vehicle 100.

The characteristics of errors in the imaging plane phase difference ranging, the object width ranging, and the grounding position ranging will be described. As a common way of thinking about errors, a relative error and an absolute error are defined as follows. The relative error is defined as an amount corresponding to a standard deviation among sufficient samples in a case where there is no relative distance change. The absolute error is defined as an amount corresponding to a difference between an average value and a true value among sufficient samples in a case where there is no relative distance change.

A main cause of a relative error in the imaging plane phase difference ranging is a parallax error caused by block matching due to a variation in pixel value that is attributed to sensor noise. Because the relative error does not change depending on a parallax value, in a case where the relative error is converted into a distance, a relative error basically worsens proportionally to a square of the distance. An absolute error occurs due to aberration of an optical system, an assembly error, and a fluctuation component affected by heat or vibration. Correction processing can be performed on each cause. In a case where the correction processing is not performed in consideration of a calculation amount, the error sometimes remains greatly.

A relative error in the object width ranging depends on the resolution of an object on an image and recognition accuracy. In the object width ranging, if an actual object width (a width of an actual object on an object side, a physical amount represented in units of meters, for example) is unknown, a width of a detected object on an image cannot be converted into a distance. Thus, an actual object width is to be somehow determined, and both of the absolute error and the relative error depend on the actual object width. Because the relative error is proportional to a distance, in a case where a distance is larger, a relative error can be smaller than that in the imaging plane phase difference ranging.

A relative error in the grounding position ranging depends on recognition accuracy of a grounding line of an object on an image and the resolution of an image. Because the resolution of an image is resolution for measuring a distance between a vanishing point and a grounding line, it is possible to measure a distance more highly accurately in a high-resolution image even in a case where the distance is great. In a case where the road surface extends on the lower side, an estimation error of a pitch angle in an optical axis direction causes a ranging error.

In a case where an imaging apparatus that acquires an image is attached to a movable body, a pitch angle varies for each image capturing frame depending on acceleration of movement and the road surface condition. In this case, an error of a pitch angle causes a relative error. An error of a pitch angle that always occurs at a constant value depending on an installation state or a gradient of a movable body causes an absolute error. As described below, a pitch angle can be estimated using information regarding a vanishing point and movement information, and an error can be reduced. The relative error is proportional to a distance equivalently to a width of an object, but an error amount is larger than that of a width of an object because the relative error is affected by the influence of pitch angle estimation. The object grounding position ranging can be performed on the basis that an object is to be in contact with the ground surface. In a case where a lower end is not in contact with the ground surface like a traffic light or a traffic sign, this raises an issue that the ranging cannot be performed.

Figure 14:
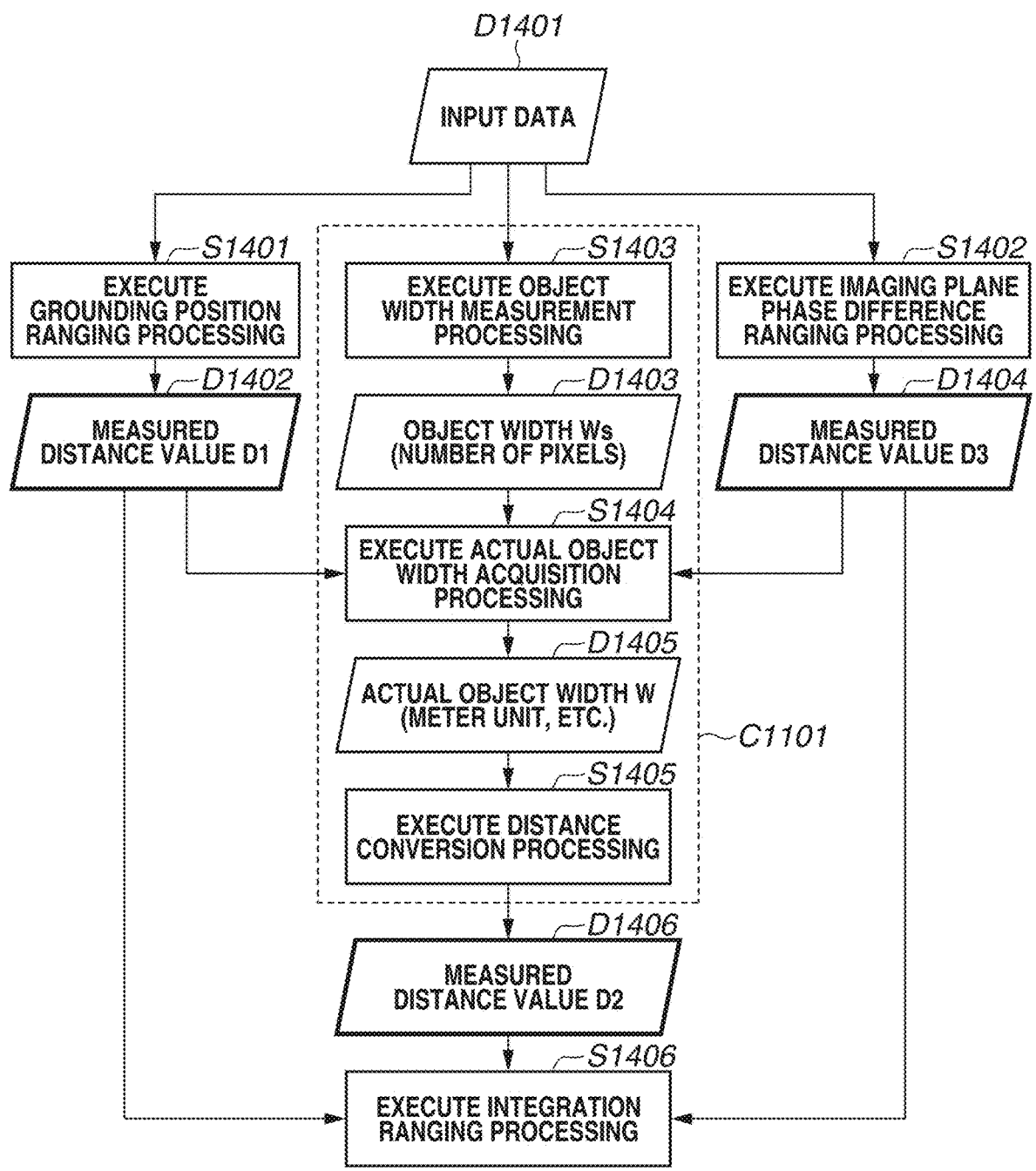
FIG. 14 is a flowchart illustrating processing for acquiring a measured distance value (object distance information).

FIG. 14 is a flowchart illustrating processing for acquiring a measured distance value (object distance information) according to the second exemplary embodiment.

Input data D1401 is data input to the distance information generation unit 322. As described in the first exemplary embodiment, external information regarding an object (identification number of an object, a type (attribute) of an object, a size of a region corresponding to an object) obtained by performing image recognition on an image captured by the image sensor 302 is input to the distance information generation unit 322. The input data D1401 may also include other results obtained by another type of image recognition processing. The input data D1401 may include any image recognition result information as long as a pixel position at which the object is in contact with the ground surface in an image can be identified, for example, an image coordinate indicating an image range of a recognized image, or information regarding the same object region obtained by a semantic region segmentation technique.

Distance image data indicating a result (distance information on each pixel) obtained by performing calculating using the imaging plane phase difference system is input to the distance information generation unit 322 as the input data D1401. In the second exemplary embodiment, in addition to these pieces of data, the focal length f of the imaging optical system 301, information regarding a moving speed of the vehicle 100, and information regarding an installation position of the imaging apparatus 110 are also input to the distance information generation unit 322 as the input data D1401. The input data D1401 is a data set obtained by integrating these pieces of information.

In the following steps, recognition processing may be simultaneously performed on a number of objects, but processing to be performed while saving and referring to time-series data information is performed on objects recognized as the same object. In other words, the same identification number is included as input data.

In step S1401, the distance information generation unit 322 acquires a measured distance value D1 by the grounding position ranging, and outputs the measured distance value D1 as data D1402. The measured distance value D1 indicates a distance between the vehicle 100 (the imaging apparatus 110) and a target object that has been calculated by the grounding position ranging. The data D1402 is information indicating the measured distance value D1 calculated in step S1401 by the grounding position ranging.

Using an image coordinate indicating an image range of a recognized image that is included in the input data D1401, the distance information generation unit 322 acquires a pixel position at which the object is in contact with the ground surface in the image. A description will be given of the overview of ranging processing to be performed in a case where an optical axis is set at a height H and parallel to the road surface, and a distance between a vanishing point and a grounding line on an image is Hs pixels (may be a number in a subpixel unit). If a pixel size in an image acquired at the focal length f using a central projection system (may be an image corrected to the central projection system) is denoted by Ps, the measured distance value (distance) D1 can be represented as follows using the following equation (Equation 7).

$$D1 = \frac{H}{(Hs \times Ps)} \times f \qquad \text{(Equation 7)}$$

Also in a case of not a road surface, a case where the grounding surface and the optical axis are not parallel, a case where the central projection system is not employed, or a case where large distorted aberration is included, if a vanishing point and a grounding line can be estimated, ranging calculation itself can be performed.

In Equation 7, it is assumed that the optical axis is parallel to the road surface is supposed, but in a case where a pitch angle of a movable body includes an error, a vanishing point position becomes a position different from a supposed position as described above. Thus, a value of Hs includes an error, and this consequently causes a distance error. In a case where the recognition accuracy is low, a similar distance error is generated because Hs is recognized as a position different from an actual grounding line.

In step S1402, the distance information generation unit 322 acquires a measured distance value D3 by the imaging plane phase difference ranging, and outputs the measured distance value D3 as data D1404. The data D1404 is information indicating the measured distance value D3 calculated in step S1402 by the imaging plane phase difference ranging.

As described in the first exemplary embodiment, the distance information generation unit 322 can acquire distance information (distance value) on a target object based on distance image data and external information. For example, it is assumed that distance image data in which distance information on each pixel is indicated by a defocus amount, and external information in which a region of an object is indicated by a frame is input as the input data D1401. At this time, the distance information generation unit 322 can acquire a distance (object distance information) between the vehicle 100 and a target object from an image formation formula using a mode value of defocus amounts included in the object frame of the target object, and the focal length f. The obtained distance is acquired as the measured distance value D3. A distance value itself may be input as the input data D1401, or other types of data obtained in a calculation process may be input as the input data D1401.

In step S1403, the distance information generation unit 322 acquires a width (object width) Ws of the target object in an image. The object width Ws is represented by the number of pixels. Alternatively, the object width Ws can be represented by the number of subpixels. The distance information generation unit 322 performs measurement of the object width Ws based on an image recognition result. For example, in a case where information indicating an object frame of each object in an image is included as external information included in the input data D1401, a width of an object frame corresponding to the target object may be acquired as the object width Ws. Instead of acquiring a width of an object, the distance information generation unit 322 can acquire a height of an object, or can select either width or height that includes a larger number of pixels may be selected or both width and height to enhance robustness. The distance information generation unit 322 acquires information indicating the object width Ws as data D1403.

In step S1404, the distance information generation unit 322 calculates an actual object width W using the object width Ws indicated by the data D1403, and either or both of the measured distance value D1 obtained by the grounding position ranging and indicated by the data D1402 and the measured distance value D3 obtained by the imaging plane phase difference ranging and indicated by the data D1404. The actual object width W is information indicating a width of a target object in a unit system (e.g., meter) indicating a length. Although the actual object width W can be obtained using either or both of the measured distance value D1 and the measured distance value D3, it is desirable to select a measured distance value with a smaller absolute error. In a case where the measured distance value D1 is used, the actual object width W can be represented as follows using the following equation (Equation 8).

$$W = \frac{(Ws \times Ps)}{f} \times D1 \qquad \text{(Equation 8)}$$

The actual object width W may be determined based on information indicating the type of an object that is included in external information input as the input data D1401. For example, if the type of a target object is a passenger vehicle, the actual object width W can be set to a predefined value of 1.7 m. Nevertheless, in a case where the actual object width W is determined in accordance with the type of an object, the actual object width W differs depending on each object in a precise sense, and thus the difference causes an absolute error. The distance information generation unit 322 outputs information indicating the actual object width W as data D1405.

In step S1405, the distance information generation unit 322 acquires a distance value D2 using the actual object width W and the object width Ws. Data D1406 is information indicating the measured distance value D2 that is based on the object width and calculated in step S1405. The processing executed in step S1405 is inverse processing of processing executed in step S1404. The distance value D2 can be represented as follows using the following equation (Equation 9).

$$D2 = \frac{f}{(Ws \times Ps)} \times W \qquad \text{(Equation 9)}$$

In this case, D1=D2 is obtained because the actual object width W is the same. By using time-series information to be described below, because processing is added to step S1404, different distance values are obtained as the distance values D1 and D2.

A step group C1101 including steps S1403, S1404, and S1405 corresponds to the object width ranging.

In step S1406, the distance information generation unit 322 integrates the measured distance value D1 indicated by the data D1402, the measured distance value D2 indicated by the data D1406 and the measured distance value D3 indicated by the data D1404, and sets the integrated value as a distance value D to a recognized object.

Integration processing is processing of selecting any of the measured distance value D1, the measured distance value D2, and the measured distance value D3 as a measured distance value D, for example. The measured distance value D1, the measured distance value D2, and the measured distance value D3 include relative errors or absolute errors that vary depending on the types of ranging by which the respective values are acquired. By selecting a measured distance value considered to include a small relative error or absolute error, the distance information generation unit 322 can employ a measured distance value with a small error in accordance with a scene from among measured distance values acquired by a plurality of ranging methods. For example, measured distance values acquired by the grounding position ranging and the imaging plane phase difference ranging include smaller errors as the distance values are greater. Thus, in a case where an acquired measured distance value is larger than a predetermined distance, the distance information generation unit 322 selects either of the measured distance value D1 and the measured distance value D2. In a case where the acquired measured distance value is equal to or smaller than the predetermined distance, the distance information generation unit 322 selects the measured distance value D3.

As another integration processing method, in consideration of absolute errors or relative errors, an existence probability distribution is calculated with respect to a distance, and a measured distance value can also be selected from the sum of probability distributions in such a manner that an existence probability becomes the highest. Furthermore, based on the moving speed of the vehicle 100 included in the input data D1401, and information regarding an accelerator, a brake, and a steering, an existence probability of a relative distance value with respect to the current relative distance value can be determined. For example, the existence probability can be determined in such a manner as to become smaller as an acceleration change becomes larger, by setting the same acceleration as acceleration in the previous time as the largest probability in such a manner that an acceleration change does not become larger. An existence probability of a relative distance can be accordingly calculated. In a case where accelerator information is included, the largest probability can be determined in a direction in which an acceleration increases. In a case where brake information is included, the largest probability can be determined in a direction in which an acceleration decreases. Furthermore, an existence probability can be determined depending on the type of a target object. If the type of a target object is a passenger vehicle or a two-wheeled vehicle, because a recognized object may accelerate or decelerate greatly, a relative distance change may become larger. In a case where the type of a target object is a pedestrian that does not do rapid acceleration and deceleration, a relative distance change is highly likely to depend on its operation, and an existence probability can be determined more accurately.

Heretofore, a basic flow performed in a case where one piece of input data at a certain time is input has been described. Subsequently, a case where pieces of consecutive input data are chronologically input will be described.

FIG. 15 is a flowchart illustrating processing to be performed in a case where a plurality of pieces of consecutive input data is chronologically input. The same processing and data as the processing and data described above with reference to FIG. 14 are assigned the same reference numerals, and the description will be omitted.

In a case where pieces of consecutive input data are chronologically input, the measured distance value D1 indicated by the data D1402, the object width Ws indicated by the D1403, and the measured distance value D3 indicated by the D1404 can be acquired in chronological order for an object to which the same identification number is allocated (i.e., object recognized as the same object).

In a case where pieces of consecutive input data are chronologically input, due to a temporal change in a relative distance from a target object, each measured distance value temporally changes. Nevertheless, the actual object width W can be said to be always constant if it is assumed that an object is a rigid object. Thus, in step S1504, the distance information generation unit 322 acquires an average actual object width W' by smoothing actual object widths W in the time-series direction even if a relative distance value changes chronologically. It is thereby possible to reduce a relative error.

In a case where the object width W in Equation 8 is assumed, by sufficiently smoothing object widths W in the time-series direction, an absolute error remains only by an amount corresponding to a grounding position measured distance value, but relative errors of a grounding position measured distance value and an object width (the number of pixels) can be sufficiently reduced. A case where the actual object width W' is calculated using the imaging plane phase difference measured distance value can also be similarly considered. Data D1505 indicates an object width W' with a small relative error. By distance conversion processing in step S1405, an object width measured distance value D2 indicated by data D1406 is obtained as a distance value including only a relative error of the object width Ws and an absolute error corresponding to a grounding position measured distance value.

In step S1507, the distance information generation unit 322 calculates a correction amount of an absolute error of the imaging plane phase difference measured distance value D3. The main component of the absolute error of the imaging plane phase difference measured distance value is an error that becomes a constant value irrespective of distance when converted into a defocus amount. Thus, the distance information generation unit 322 converts the imaging plane phase difference measured distance value D3 into a defocus amount based on the focal length and an image formation formula. Similarly, the distance information generation unit 322 converts the object width measured distance value D2 into a defocus amount using an equivalent focal length and image formation formula. The object width measured distance value D2 may be converted into a defocus amount using the grounding position measured distance value D1 and the relative measured distance value D. The distance information generation unit 322 calculates a difference between the defocus amount converted from the imaging plane phase difference measured distance value D3, and the defocus amount converted from the object width measured distance value D2 using the same time data, and calculates an average value of time-series difference data. In a case where an average value has been calculated using a sufficient amount of data, the obtained average value indicates a difference between absolute value errors of the imaging plane phase difference measured distance value D3 and the object width measured distance value D2. The average value is used as an absolute error correction value indicated by data D1508.

In a case where the grounding position measured distance value D1 is used, an absolute value error of the grounding position measured distance value D1 is corrected, and consequently becomes the same absolute value error obtained in a case where the grounding position measured distance value D1 is used in step S1504. In this case, by selecting a measured distance value with a smaller relative error, an influence of a relative error is smaller. In step S1509, the distance information generation unit 322 executes absolute error correction value selection processing of determining which of the results obtained in steps S1507 and S1508 is to be selected as an absolute error correction value. The details will be described below.

In step S1402, the distance information generation unit 322 calculates the measured distance value D3 by the imaging plane phase difference ranging. The distance information generation unit 322 corrects a defocus amount using the absolute error correction value indicated by the data D1508. Because the absolute error correction value indicates an offset of defocus, a difference is calculated from defocus amounts calculated from the input data, and the measured distance value D3 indicated by the data D1404 includes a corrected absolute error. A distance value may be directly corrected. Actually, the absolute error is synchronized with an absolute error of data used as a difference in step S1507. As described above, in a case where a defocus amount converted from the object width measured distance value D2 is used, the absolute error becomes an absolute error of the object width measured distance value D2. Because the object width measured distance value D2 depends on a measured distance value used in step S1504, in a case where the actual object width W is calculated using the grounding position measured distance value D1 in step S1504, all of the grounding position measured distance value D1, the imaging plane phase difference measured distance value D3, and the object width measured distance value D2 include an absolute error of the grounding position measured distance value D1. Since absolute errors become uniform among three measured distance values, in integration ranging processing in step S1406, only relative errors can be considered to determine a probability distribution. With this configuration, the relative measured distance value D indicated by the data D1507 can be calculated more simply and stably.

By inputting time-series data on an object as described above, the relative measured distance value D can be chronologically calculated from the grounding position measured distance value D1, the imaging plane phase difference measured distance value D3, and the object width measured distance value D2. From time-series data of the relative measured distance value D, a relative speed, a relative acceleration, and a relative jerk with respect to a target object can be calculated. Using these values, the above-described probability distribution of relative distance values can be calculated. For example, a probability distribution can be determined in such a manner that a change in relative acceleration becomes smaller.

Although acquisition of time-series data has been described above, data needs not be always acquired consecutively. In a case where correct input data cannot be obtained in a certain frame due to a failure in object recognition, processing needs not be performed, and recalculation can be started from the frame when object recognition succeeds. In this case, an average value W' of actual object widths and an absolute error correction value can be used directly without any change, and a stable relative measured distance value D can be obtained from these values. Nevertheless, in this case, because a probability distribution of relative measured distance values cannot be correctly obtained using a relative speed, a relative acceleration, and a relative jerk calculated from the relative measured distance value D, it is desirable to set 0.

A case where any one or any two of the grounding position measured distance value D1, the imaging plane phase difference measured distance value D3, and the object width measured distance value D2 cannot be correctly calculated can also be considered. Examples of such a case include a case where a recognized object floats up, and a case where an object width cannot be correctly measured due to another object getting in between the vehicle 100 and a recognized object. In such a case, there is a high possibility that a correct value cannot be obtained because a change varies greatly from the previous value, or a distance value varies greatly from other distance values. In such a case, by setting 0 or a very small value as an existence probability distribution of the distance value, influence on calculation of the relative measured distance value D can be avoided or reduced.

In a case where the relative distance value D with a target object varies sufficiently as a time-series change, in step S1508, the distance information generation unit 322 executes correction processing of performing highly-accurate absolute error correction using the variation in relative distance and a change in the actual object width W.

Figure 16A:
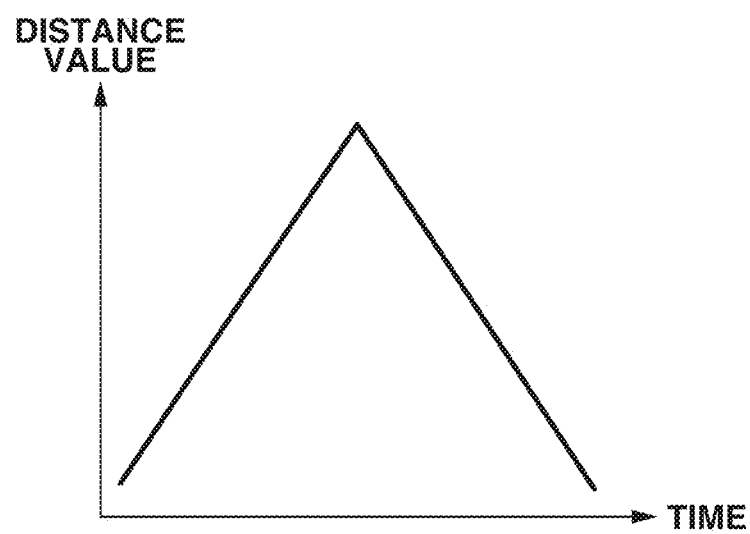
FIGS. 16A and 16B are schematic diagrams illustrating correction processing of an absolute error.
Figure 16B:
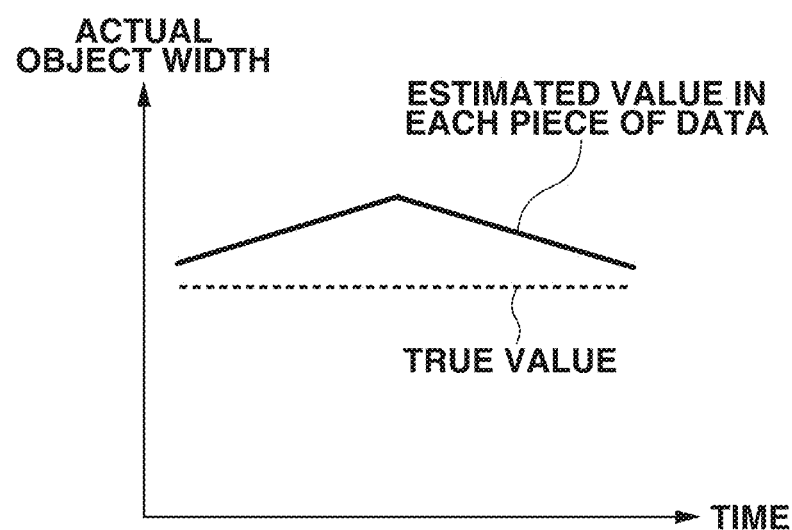

FIGS. 16A and 16B schematic diagrams illustrating correction processing of an absolute error. In FIG. 16A, a horizontal axis is a time axis, and distance values D are plotted along a vertical axis. In FIG. 16B, a horizontal axis is a time axis, and actual object widths W are plotted along a vertical axis. FIG. 16B illustrates not an averaged actual object width W' but an actual object width W calculated using an object width at each time. For the sake of explanatory convenience, relative errors are removed.

Even in a case where the relative distance value D changes as illustrated in FIG. 16A, an actual object width W is to be constant as indicated by a dotted line in FIG. 16B. Nevertheless, if an absolute error is included, the actual object width W changes dependently on the distance as indicated by a solid line. Using a true distance value Dt, a true actual object width Wt, and an estimated average actual object width We', an estimated distance value De including an error can be represented by the following equation (Equation 10).

$$De = \frac{We'}{Wt} \times Dt \qquad \text{(Equation 10)}$$

On the assumption that a relative error is not included, if the average actual object width We' and the true actual object width Wt are equal, the true distance value Dt and the estimated distance value De become equal. Thus, a relative distance can be correctly estimated. In a case where the average actual object width We' and the true actual object width Wt are not equal (i.e., an absolute error remains), an error is observed also in a relative distance at a ratio between the average actual object width We' and the true actual object width Wt. The estimated actual object width We consequently changes in accordance with the distance as illustrated in FIG. 16B.

Thus, in a case where a fixed relative distance variation occurs, an absolute distance correction component is determined in such a manner that an actual object width does not change at each time. Because the true distance value Dt is unknown, in consideration of one or two or more values of the grounding position measured distance value D1, the imaging plane phase difference measured distance value D3, and the relative measured distance value D, the true distance value Dt can be estimated from the variation component and a change in actual object width W. Specifically, for example, the actual object width W is calculated using a method equivalent to that in step S1404 using the imaging plane phase difference measured distance value D3, and a time-series change thereof is calculated. It is only required that an absolute error correction value is corrected in such a manner that the change in the actual object width W becomes smaller. As a calculation method, a correction value by which the change in the actual object width W becomes the smallest can be found using a general optimization method.

An absolute error correction value and an actual object width correction value are thereby estimated at the same time.

Absolute errors of the corrected imaging plane phase difference measured distance value D3, object width measured distance value D2, and grounding position measured distance value D1 are to be equal, and a difference between absolute errors can also be calculated as an absolute error correction amount. In the grounding position ranging processing in step S1401, main causes of an absolute error component include the above-described pitch angle variation of the imaging apparatus. In other words, a vanishing point is shifted to a position different from an estimated position, and the component becomes an absolute error of a grounding position measured distance value. Based on estimation of an absolute error component in step S1508, a pitch angle variation can be estimated. The correction amount can be used as an absolute error correction amount indicated by the data D1510. If a relative distance variation occurs in this manner, an absolute error component of each measured distance value can be corrected highly accurately using the information. If the variation including a time-series variation in the absolute error component falls within an ignorable range, average value calculation of an actual object width in actual object width acquisition processing in step S1504, and absolute error correction processing in step S1507 are basically unnecessary after overall absolute error correction processing in step S1508. Thus, the processing may be simplified, or the processing may be continuously executed for confirmation.

In step S1509, the distance information generation unit 322 selects which of absolute error correction values calculated in step S1507 and S1508 is to be output as the data D1508. As described above, the processing in step S1508 is performed in a case where a fixed relative distance variation occurs. Thus, in step S1509, the distance information generation unit 322 basically selects the absolute error correction value calculated in step S1507, and selects the absolute error correction value calculated in step S1508 in a case where the processing in step S1508 is performed. In a case where an absolute error varies again, the absolute error correction value calculated in step S1507 may be selected again. For example, in a case where the absolute error correction value calculated in step S1507 varies after the absolute error correction value calculated in step S1508 is selected, the absolute error correction value calculated in step S1507 can be selected again. After that, in a case where a fixed relative distance variation occurs again, by performing the processing in step S1508 and selecting the absolute error correction value calculated in step S1508, it is possible to continuously select a better absolute error correction value.

As described above, a flow of chronologically correcting relative errors and absolute errors using the grounding position ranging, the object width ranging, and the imaging plane phase difference ranging has been described with reference to FIGS. 15, and 16A and 16B. The imaging plane phase difference ranging has been described in the above-described processing, but the above-described processing can be similarly considered as for stereo ranging. A relative error can be considered to be equivalent to sensor noise influence, and an absolute error can be considered to be installation position influence of each stereo imaging apparatus. Although an absolute error is not converted into a defocus value, a correction amount can be estimated as an installation position.

A similar way of thinking can also be applied to another modality such as light detection and ranging (LiDAR). For example, in the case of LiDAR, because a relative error is similarly generated in distance resolution, and an absolute error is also generated as an offset of distance, a similar way of thinking to that in the second exemplary embodiment can be applied. While an integration flow using three types of methods has been described in the second exemplary embodiment, two types may be extracted. Alternatively, even if four types of methods are used by adding the imaging plane phase difference ranging, stereo, or LiDAR (another modality), errors can be similarly corrected. By using such a method, a stable measured distance value can be obtained for the purpose of tracking a recognized object for a certain period of time. By installing this imaging apparatus on a vehicle, for example, the imaging apparatus can be applied to auto cruise control (ACC) or automated driving.

Hereinafter, a third exemplary embodiment will be described. A route generation apparatus 150 according to the third exemplary embodiment realizes highly-accurate ranging from a short distance to a far distance by combining parallax ranging that uses a plurality of images, and distance estimation that is based on a single image.

Figure 17:
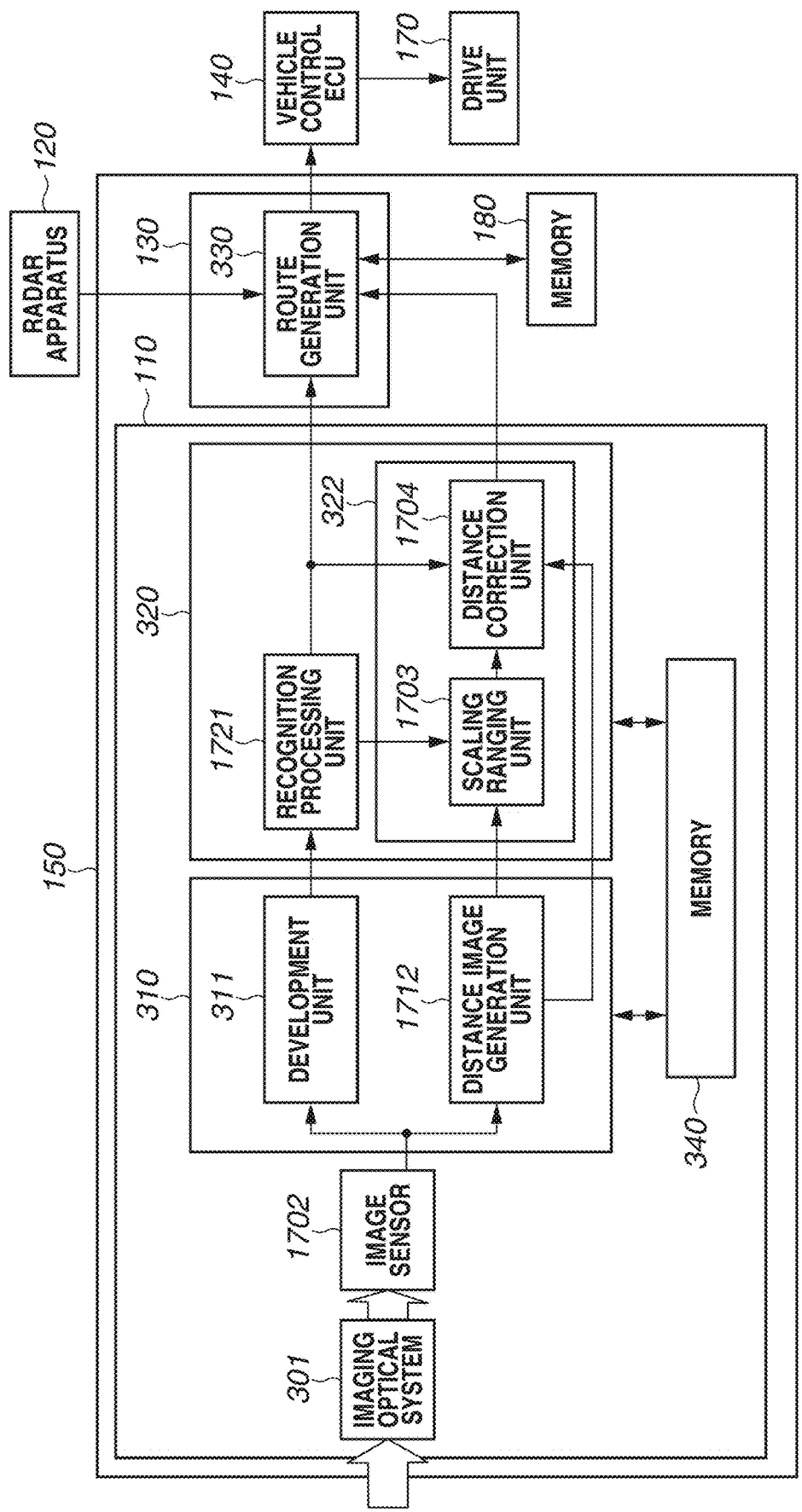
FIG. 17 is a block diagram illustrating a configuration example of a ranging system.

FIG. 17 is a block diagram illustrating a configuration example of a ranging system. The ranging system is included in the imaging apparatus 110. The ranging system includes an image sensor 1702, a recognition processing unit 1721, a distance image generation unit 1712, a scaling ranging unit 1703, and a distance correction unit 1704. The image sensor 1702 corresponds to the image sensor 302 according to the first exemplary embodiment. The recognition processing unit 1721 corresponds to the recognition processing unit 321. The distance image generation unit 1712 corresponds to the distance image generation unit 312. The scaling ranging unit 1703 and the distance correction unit 1704 correspond to the distance information generation unit 322.

The image sensor 1702 acquires an image signal from the imaging optical system 301. The image sensor 1702 acquires an image signal including image signals acquired by the first photoelectric conversion unit 411, and an image signal including image signals acquired by the second photoelectric conversion unit 412. These image signals correspond to images at different viewpoints, which are called parallax images. The image sensor 1702 acquires a synthesized image signal obtained by synthesizing image signals of two parallax images, as a captured image. The image sensor 1702 may acquire one of two parallax images as a captured image.

As a camera configuration for obtaining parallax images, stereo cameras arranged side by side on the right and left sides may be used. Furthermore, a monocular camera configuration may be used, and parallax images may be obtained by regarding a relative movement amount of an object in consecutive frame images as parallax in consideration of the own speed of the vehicle.

The recognition processing unit 1721 detects an object included in a captured image captured by the image sensor 1702 by applying image recognition processing on the captured image. For implementing automated driving control or collision reduction brake control of the vehicle 100, a lane on which the vehicle 100 drives, a vehicle (leading vehicle) driving in front of the vehicle 100, and an object such as a human on a side walk are to be recognized. As methods of object detection, methods such as a method that uses template matching for detecting an object that does not substantially change in appearance (traffic light or traffic sign, etc.), and general object (vehicle, human, etc.) detection that uses machine learning.

Figure 18:
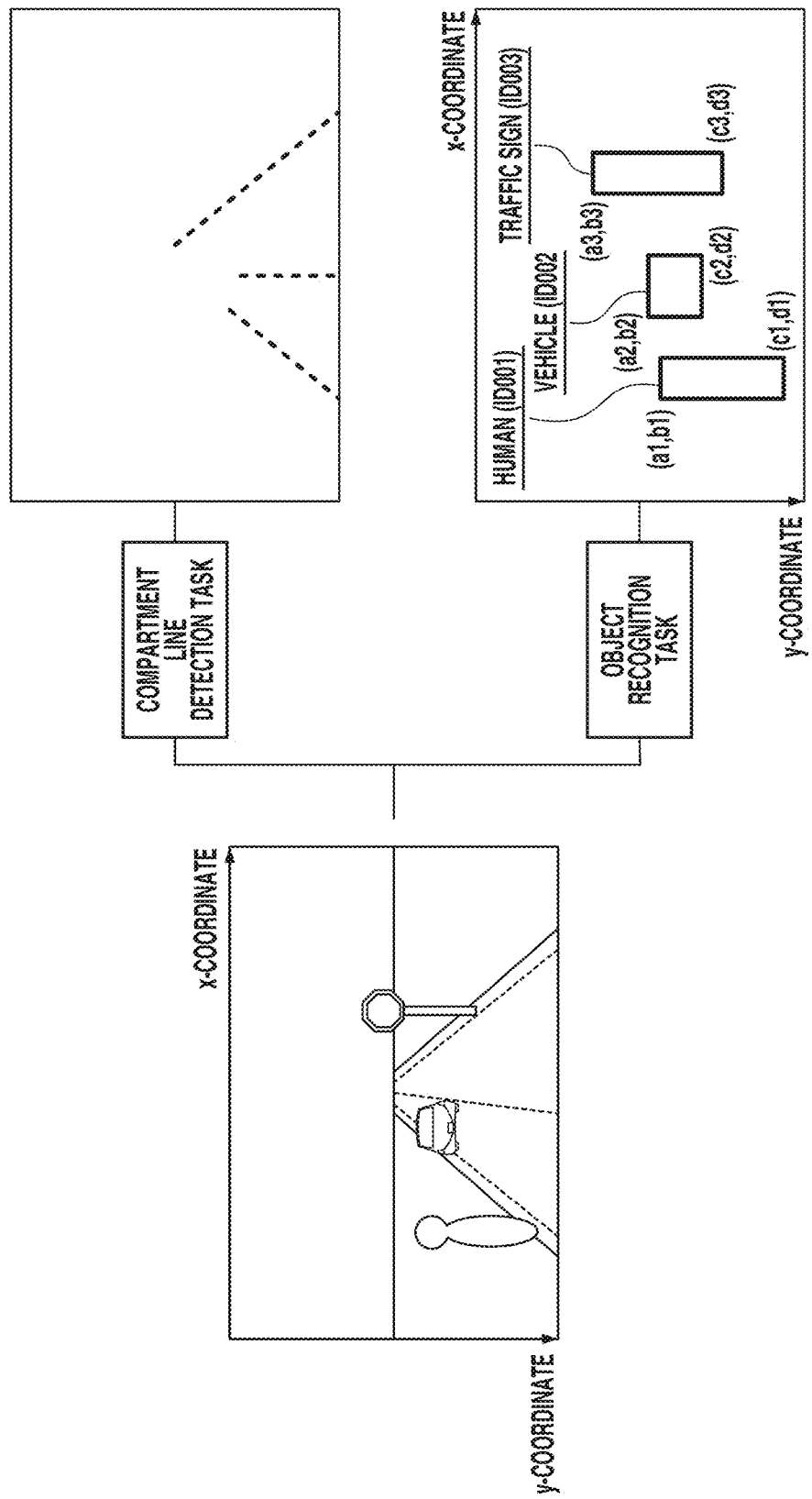
FIG. 18 is a schematic diagram illustrating output results of a compartment line detection task and an object recognition task that are to be executed by an object detection unit.

In the third exemplary embodiment, the recognition processing unit 1721 executes a compartment line detection task and an object recognition task. FIG. 18 is a schematic diagram illustrating output results of the compartment line detection task and the object recognition task that are to be executed by the recognition processing unit 1721. The compartment line detection task acquires a compartment line region map in which pixels are each labeled with information indicating whether the pixel represents a compartment line (in FIG. 18, detected compartment lines are indicated by black broken lines) using a machine learning model for detecting whether each pixel in an input captured image represents a compartment line (or white line) on a road. The object recognition task acquires a coordinate of a detection frame being in contact with a detected object by obtaining the type (human, vehicle, traffic sign) of the detected object, a coordinate (x0, y0) of a top-left point of the detection frame, and a coordinate (x1, y1) of a bottom-right point of the detection frame using a machine learning model for detecting an object on a road in an input captured image. The output of the object recognition task is equivalent to external information described in the first exemplary embodiment.

The distance image generation unit 1712 acquires distance data from the parallax images acquired by the image sensor 1702. In the ranging from parallax images, a parallax value is calculated by detecting corresponding points in images captured at different viewpoints, and a distance can be calculated from the parallax value and camera conditions (focal length, base-line length) under which the parallax images are captured. As described above, even if a camera that has captured parallax images is a monocular camera including a dual pixel CMOS sensor, camera conditions for distance calculation can be identified. In the ranging that uses parallax images, it is known that, if a ranging target moves farther, ranging estimation accuracy generally worsens because parallax becomes practically undetectable.

The scaling ranging unit 1703 calculates a distance value of a second region by scaling a distance value of a first region that has been calculated by the distance image generation unit 1712, at a size ratio between an object existing in the first region and an object existing in the second region. In the third exemplary embodiment, the description will be given of an example of extending a road surface on a short distance side to a far distance side by scaling a distance value on the short distance side that has been calculated by the distance image generation unit 1712, based on road information on the short distance side and the far distance side.

Figure 19:
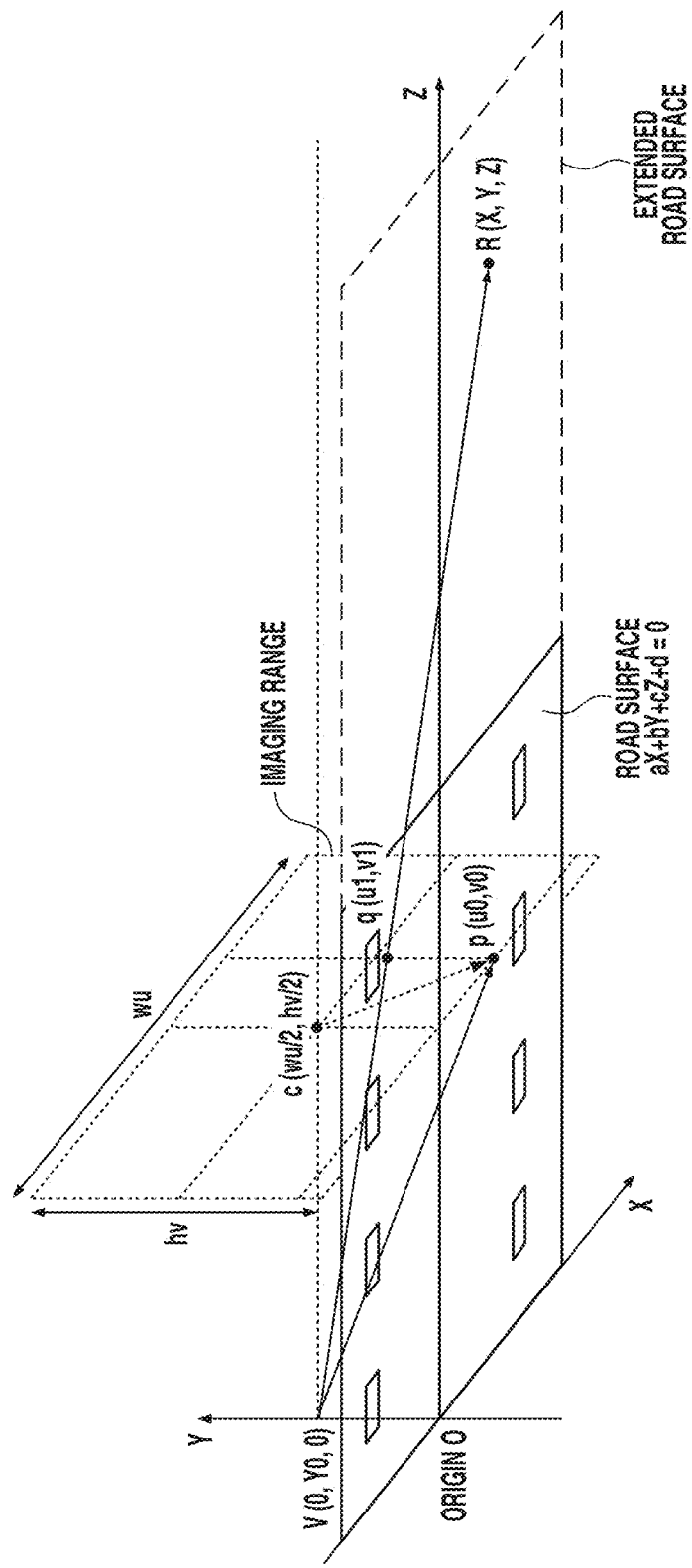
FIG. 19 is a diagram illustrating a positional relationship between a camera mounting position and a road surface.

FIG. 19 is a diagram illustrating a positional relationship between a camera mounting position and a road surface. A global coordinate (X, Y, Z) in which an origin O is defined at a point on a road surface extending in a vertical direction of a camera mounting position V (0, Y0, 0) is set. An imaging camera including the image sensor 1702 is arranged in such a manner that an optical axis direction extends horizontally. An imaging range is indicated by a view angle of the imaging camera. When an image width and an image height of an imaging range (i.e., captured image and distance map calculated by the distance image generation unit 1712) are denoted by wu and hv, respectively, a center pixel of the distance map is represented as c (wu/2, hv/2).

First of all, a road surface on the short distance side is estimated. A lower region of the distance map can be estimated as a road surface on the short distance side on the distance map. Alternatively, a road surface on the short distance side can be directly estimated by performing recognition processing on the captured image. In the lower region of the distance map, a region around pixels determined to represent a compartment line on a compartment line region map detected by the recognition processing unit 1721 may be set as a road surface. Only a distance map region determined to be closer than threshold values defined by camera installation conditions (view angle, resolution, angle of viewpoint), an imaging environment (weather, time), and information regarding a road on which the vehicle drives (lane width, the number of lanes, branching point/junction, road type) may be set as a road surface.

When a distance value of a pixel p(u0, v0) on the distance map is denoted by D, a road surface p(u0, v0) on the short distance side can be converted as X=u0−wu/2, Y=v0−hv/2, Z=D in the global coordinate.

When it is assumed that the road surface is horizontal, an equation of the surface is represented as aX+bY+cZ+d=0 (a, b, c, and d are constants). By defining constants of the above-described equation using four or more points indicating the road surface on the short distance side, the road surface can be estimated.

It becomes possible to estimate a road surface on the far distance side by the equation of the estimated road surface. Furthermore, a distance is scaled from the extended road surface on the far distance side. Specifically, a depth Z of a point R(X, Y, Z) positioned at an intersection of the road surface represented by the equation, and a straight line passing through a viewpoint V(0, Y0, 0) and a pixel q(u1, v1) indicating a region on the far distance side on the distance map can be estimated as a distance value.

Even if the scaling ranging unit 1703 cannot acquire a distance of a road corresponding to the pixel q(u1, v1) from distance data, it is possible to acquire the distance value Z of the road corresponding to the pixel q(u1, v1) by calculating in the above-described manner.

If the processing is considered on a distance map, a distance of a second region is calculated by scaling a distance of a first region at a ratio (depth ratio on a three-dimensional space) between a road surface existing in a short-distance region (first region) and a road surface existing in a far-distance region.

Because a distance value calculated in this manner does not use a distance value of a parallax ranging unit that worsens at a far distance, estimated distance accuracy at a far distance is improved.

Figure 20:
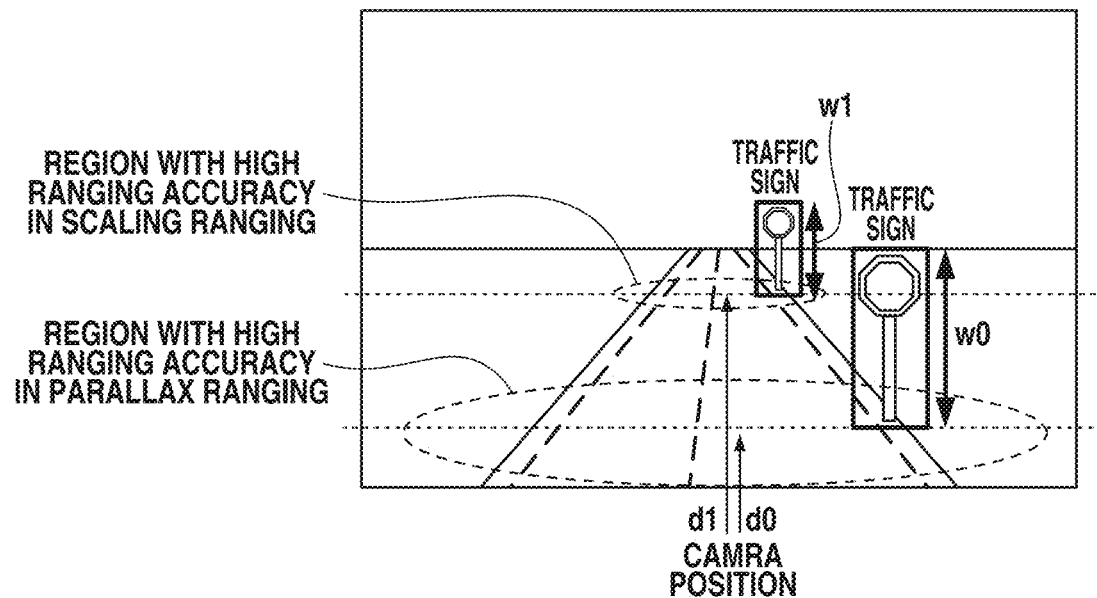
FIG. 20 is a schematic diagram illustrating a scene in which two traffic signs having a known object size are detected on a road.

Furthermore, ranging accuracy can be improved by using a detection frame detected by the recognition processing unit 1721. FIG. 20 is a schematic diagram illustrating a scene in which two traffic signs having a known object size are detected on a road. In an acquired image, two traffic signs having a preliminarily-known size are arranged on the short distance side and the far distance side. In such a state, a distance to the traffic sign on the short distance side can be accurately calculated by the distance image generation unit 1712. If the size of an object is known, the scaling ranging unit 1703 can calculate a distance to the traffic sign on the far distance side based on a ratio between the numbers of pixels on the image.

A height (the number of pixels) of the traffic sign on the short distance side is denoted by w0, a distance to the traffic sign on the short distance side from a camera position is denoted by d0, a height (the number of pixels) of the traffic sign on the far distance side is denoted by w1, and a distance to the traffic sign on the far distance side from the camera position is denoted by d1. The scaling ranging unit 1703 can calculate a distance by d1=d0*(w0/w1). As described above, if objects (traffic sign, traffic light, etc.) having a known size, or objects (guardrail, width, length, interval of compartment lines) of which the size can be assumed to be the same on the short distance side and the far distance side can be detected, highly-accurate scaling ranging can be executed. In a case where scaling ranging is executed using objects having a known size, it is difficult to enhance the accuracy in the entire distance range from the short distance region to the far distance region. Nevertheless, by combining the above-described scaling ranging for extending a road surface, and scaling ranging that uses an object size ratio, it becomes possible to perform accurate scaling ranging.

The distance correction unit 1704 acquires a corrected distance value Dc by correcting a distance value measured by the distance image generation unit 1712, based on a distance value calculated by the scaling ranging unit 1703. Hereinafter, a distance value measured by the distance image generation unit 1712 will be referred to as a distance value D, and a distance value calculated by the scaling ranging unit 1703 will be referred to as a scaling measured distance value Ds. The corrected distance value Dc is calculated in accordance with the following equation (Equation 11) using a coefficient $\alpha$.

$$Dc = \alpha \times D + (1-\alpha) \times Ds \quad \text{(Equation 11)}$$

The coefficient $\alpha$ is determined by any of the following three methods.

(1) Coefficient $\alpha$ Determination Method that is Based on Magnitude of a Distance Value In the ranging performed by a parallax ranging unit, a value of a distance to a ranging target affects ranging accuracy. If a distance to a ranging target is long, accuracy of a distance value calculated by the parallax ranging unit declines. Thus, the coefficient $\alpha$ is determined in such a manner that a percentage of a scaling measured distance value becomes higher in accordance with a distance value. An accurate ranging result can be thereby obtained. In other words, the coefficient $\alpha$ is determined in such a manner as to be smaller as the distance value D is larger.

(2) Coefficient $\alpha$ Determination Method that is Based on Contrast of a Ranging Target In the ranging performed by a parallax ranging unit, as a factor other than a value of a distance to a ranging target that affects ranging accuracy, there is contrast of the ranging target. In calculating corresponding points in parallax images (parallax), even if regions with low contrast are subjected to matching processing, parallax cannot be accurately obtained because discrimination from surrounding regions is unclear. Thus, in a case where a ranging target is not illuminated sufficiently during nighttime and the contrast of the ranging target is low, it is determined that ranging accuracy of a distance value is low, and the coefficient $\alpha$ is set in such a manner that a percentage of a scaling measured distance value becomes high. In other words, in a case where the contrast of the ranging target is low, the coefficient $\alpha$ is determined in such a manner as to become larger. Because a scaling measured distance value is generated based on a highly-accurate distance value in a range where it is illuminated by a light of a vehicle, for example, an accurate ranging result can be obtained also in a case where the contrast of the ranging target is low.

(3) Coefficient Determination Method that is Based on a Category Type of a Detection Frame Depending on the type (category) of a ranging target, ranging accuracy tends to vary between parallax ranging and scaling ranging. For example, as for a ranging object existing at a distance from a scaling reference such as a light emission part of a traffic light, parallax ranging can be performed similarly to the ranging of other objects, but ranging accuracy of scaling ranging tends to decline. For this reason, in a case where the category of a detection frame is a specific type, an accurate ranging result can be obtained by setting a coefficient in such a manner that a percentage of a distance value becomes higher. As illustrated in FIG. 20, in a case where the method of scaling ranging improves the distance accuracy of scaling ranging in a peripheral region around the object detected region, a coefficient may be determined in such a manner that a percentage of scaling ranging around a detection frame becomes higher in accordance with the category.

The above-described coefficient determination methods need not be limited to one. A final coefficient may be determined based on coefficients generated for the respective causes. With the above-described configuration, an accurate ranging result can be obtained.

Modified Example of Scaling Ranging Unit

Figure 21:
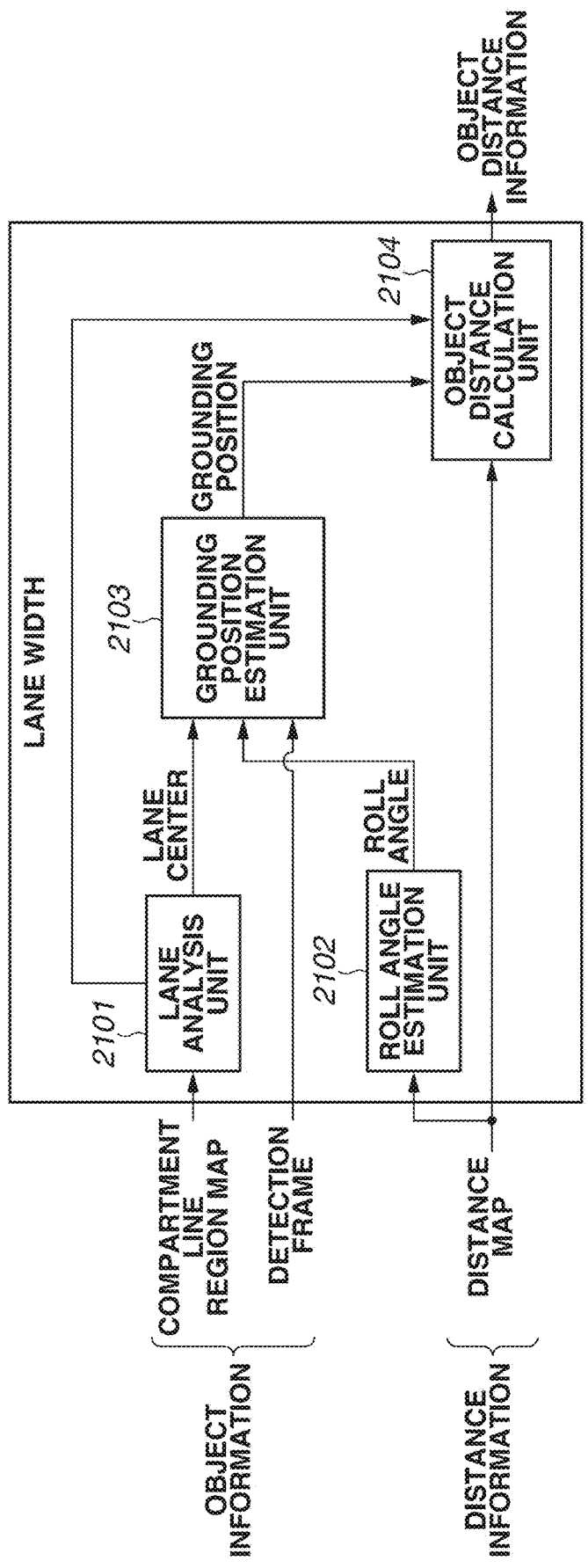
FIG. 21 is a block diagram illustrating a configuration example of a scaling ranging unit.

As a modified example of the scaling ranging unit 1703, the description will be given of an example of estimating a distance to a target object by scaling neighborhood distance data based on a size ratio between road widths on the short distance side and the far distance side on an image. FIG. 21 is a block diagram illustrating a configuration example of the scaling ranging unit 1703.

The scaling ranging unit 1703 includes a lane analysis unit 2101, a roll angle estimation unit 2102, a grounding position estimation unit 2103, and an object distance calculation unit 2104.

The lane analysis unit 2101 detects the number of pixels arranged between compartment lines as a lane width from a compartment line region map, and detects a center coordinate between the compartment lines as a lane center (coordinate).

Figure 22A:
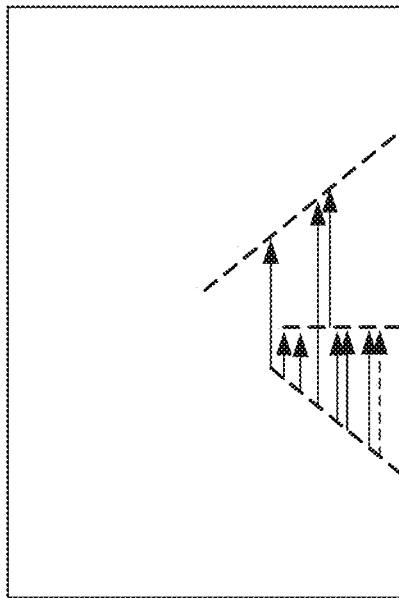
FIGS. 22A to 22D are schematic diagrams illustrating lane width detection processing and lane center detection processing to be executed by a lane analysis unit.

FIGS. 22A to 22D are schematic diagrams schematically illustrating lane width detection processing and lane center detection processing that are to be executed by the lane analysis unit 2101. FIG. 22A is a diagram schematically illustrating a compartment line region map indicating compartment lines in an image. The lane analysis unit 2101 allocates a compartment line flag (indicated by a black dotted line in FIG. 22A) to pixels detected as compartment lines in the image. Because a compartment line on a road is indicated by a broken line in a boundary portion between a driving lane and a passing lane, or a compartment line is hidden by a vehicle or an obstacle on the road, a compartment line region map appears intermittently.

Figure 22B:
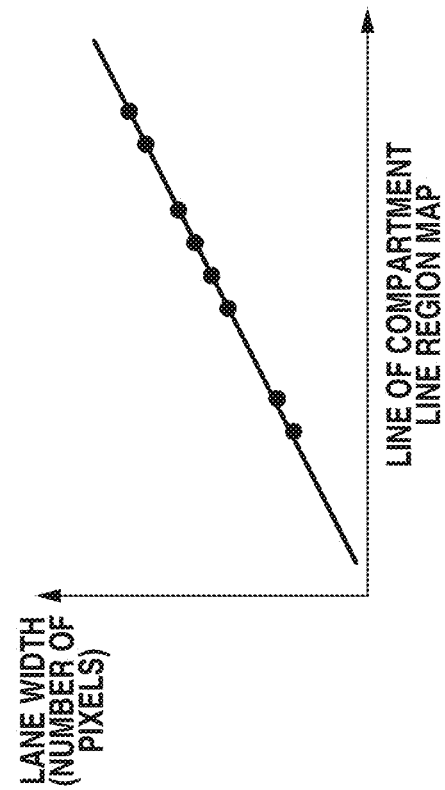

FIG. 22B is a schematic diagram illustrating a method of calculating a lane width and a lane center position. The lane analysis unit 2101 inspects whether a compartment line flag is allocated to each pixel, in order from the left side to the right side of the compartment line region map. In a case where a compartment line flag is not allocated to a pixel being inspected, and a compartment line flag is allocated to a neighboring pixel on the left of the pixel being inspected, the pixel being inspected is set as a starting point of a road width. In a case where a compartment line flag is allocated to a pixel being inspected, and a compartment line flag is not allocated to a neighboring pixel on the left of the pixel being inspected, the pixel being inspected is set as an end point of a road width. With this configuration, as indicated by arrows illustrated in FIG. 22B, a lane width (length of arrow) and a lane position (center position of arrow) can be detected for each line of the compartment line region map.

Figure 22C:
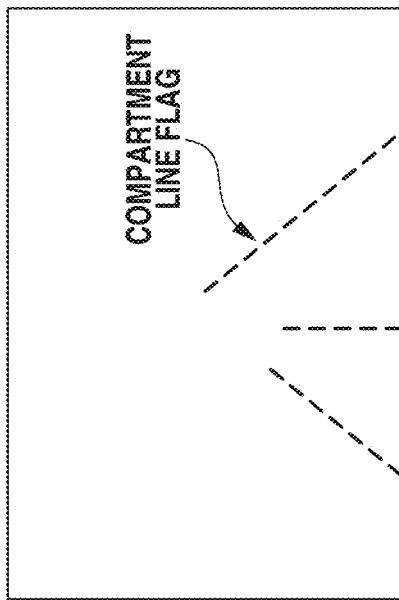

FIG. 22C is a schematic diagram illustrating detected lane width data. A lane width is observed based on the number of pixels that is proportional to an inverse of a distance from a camera, unless an actual size of a lane changes. In FIG. 22C, a horizontal axis indicates a line of a compartment line region map, and a vertical axis indicates a detected lane width (the number of pixels). When being indicated in this manner, a lane width has a highly linear relationship with the line. Depending on the degree of discontinuity of a compartment line, a lane width corresponding to one lane and a lane width corresponding to two lanes are mixedly observed in some cases. Because there is a difference of about a double between the lane widths, it is easy to separate them from each other.

Figure 22D:
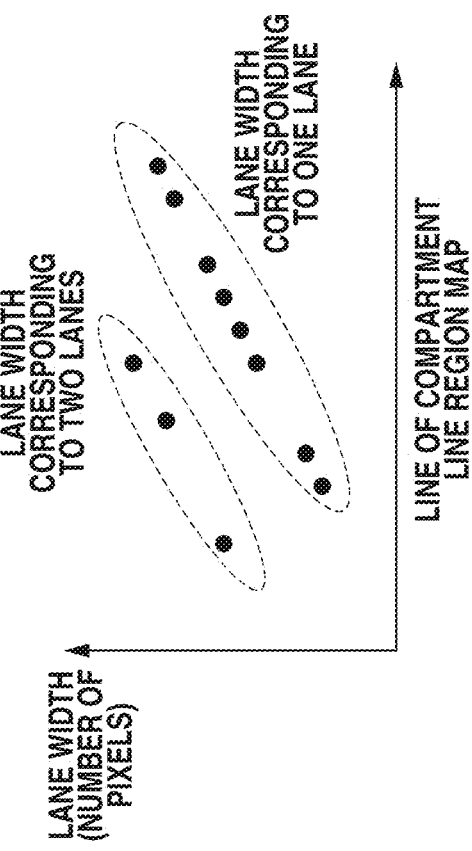

FIG. 22D is a schematic diagram interpolating separated observed data corresponding to one lane on the left side, and data on a line of which lane width cannot be obtained from observed data. In separating neighboring lanes (left and right lanes), it is easy to exclude observed data on a neighboring lane by comparing positions (center positions of arrows) of lanes. From these pieces of information, only a lane width corresponding to one lane on the left side illustrated in FIG. 22B can be acquired by robust estimation such as a random sample consensus (RANSAC) method, for example. For interpolating a lane width, an equation of an approximate straight line may be calculated by the above-described RANSAC method, and the approximate straight line equation may be used, or interpolation may be performed in such a manner as to interpolate observed road width data. As for the position of the lane, data of each line can be obtained by a method similar to the above-described method.

Using lane information (lane width and lane center) obtained as described above, scaling ranging is performed.

The roll angle estimation unit 2102 estimates a roll angle of a camera from a distance map. There is a plurality of causes for generating a roll angle of an in-vehicle camera. For example, in some cases, the unevenness of a road surface generates a difference in height between grounding surfaces of left and right tires, and a roll angle is generated because a camera mounting position cannot be kept horizontality. In other cases, a vehicle body deforms due to centrifugal force exerted when a vehicle goes along a curve, and a roll angle is accordingly generated. The generation of such a roll angle greatly affects distance estimation.

The scaling ranging to be described here is processing of scaling a neighboring distance value obtained by accurately measuring a distance to an object on a road surface, using a ratio between the number of pixels indicating a width of a lane assumed to exist at the same distance as the object and the number of pixels indicating a width of a neighboring lane. In a case where a roll angle of a camera is generated, it is difficult to identify a width of a lane assumed to exist at the same distance as the object.

Figure 23:
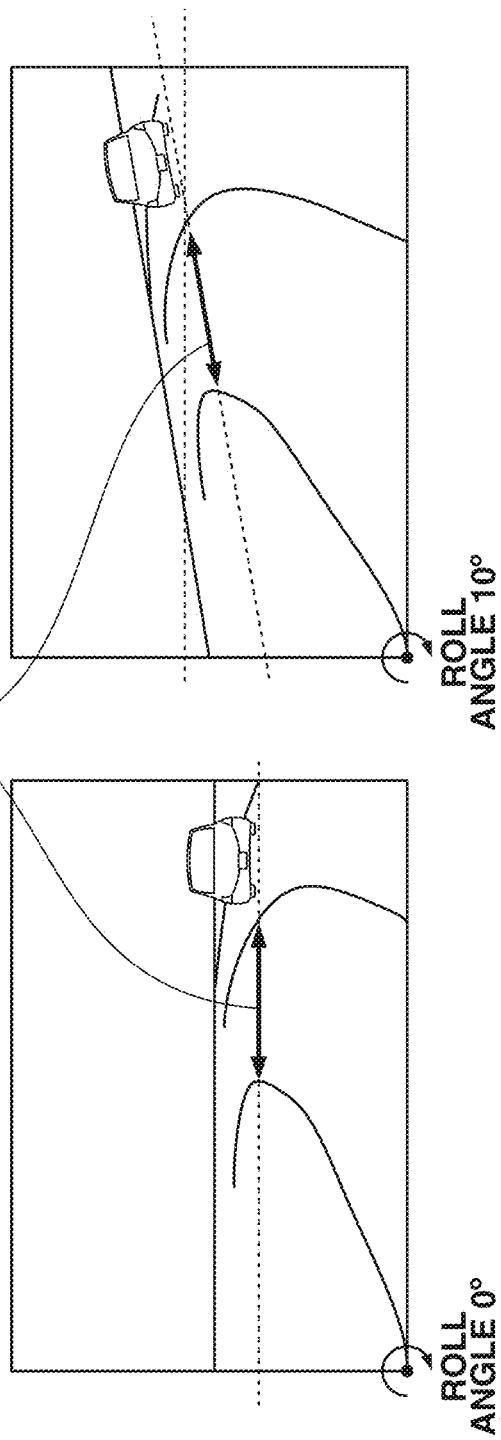
FIG. 23 is a schematic diagram comparing positions indicating lane widths in captured images with and without a roll angle.

FIG. 23 is a schematic diagram comparing positions indicating lane widths in captured images with or without a roll angle. The captured image on the left side illustrates a case where a roll angle is not generated, and the captured image on the right side illustrates a case where a roll angle of 10° is generated from the bottom left of the image in the same scene. In the case of the captured image on the left side, because a grounding position of a ranging target vehicle and a lane assumed to exist at the same distance are arranged on the same straight line, the grounding position and the lane can be easily associated. On the other hand, in the case of the captured image on the right side in which a roll angle is generated, no lane exists on the same line as a grounding position of a ranging target vehicle. Even if a lane exists, a width of a lane existing at the same distance cannot be calculated. For calculating a width of a lane existing at the same distance as a ranging target vehicle, a roll angle is to be accurately estimated.

The roll angle estimation unit 2102 estimates a roll angle based on a distance map acquired by parallax ranging. In a case where a roll angle is generated, it is known that a position of the ranging target vehicle existing at the same distance as a distance to a road surface that can be assumed to be horizontal tilts as illustrated in FIG. 23. Because a roll angle is an angle of rotation about an axis extending in the viewpoint direction, a distance between a camera and a target object does not change, and an image captured by the camera tilts at the roll angle. Thus, a distance map also tilts in accordance with the tilt of the road surface in the image.

Figure 24:
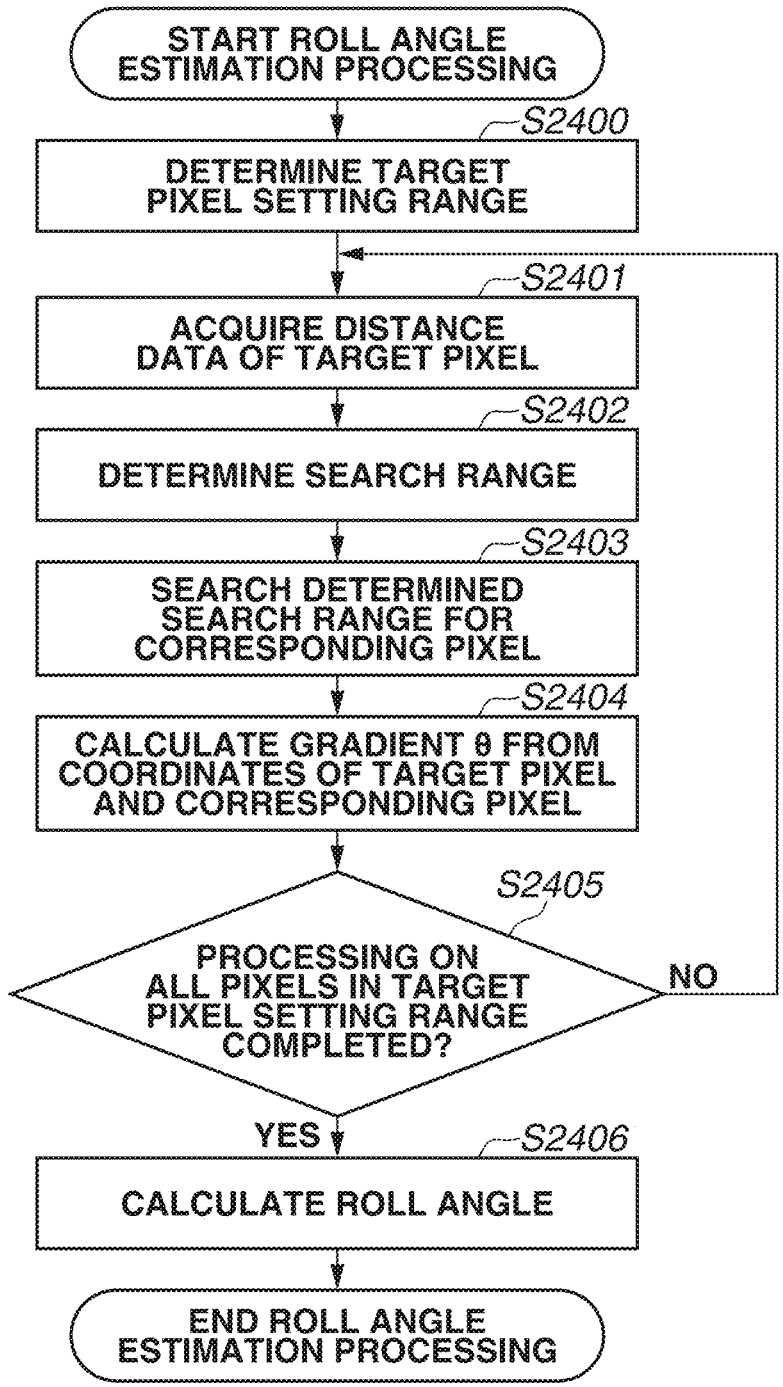
FIG. 24 is a flowchart illustrating roll angle estimation processing to be executed by a roll angle estimation unit.
Figure 25A:
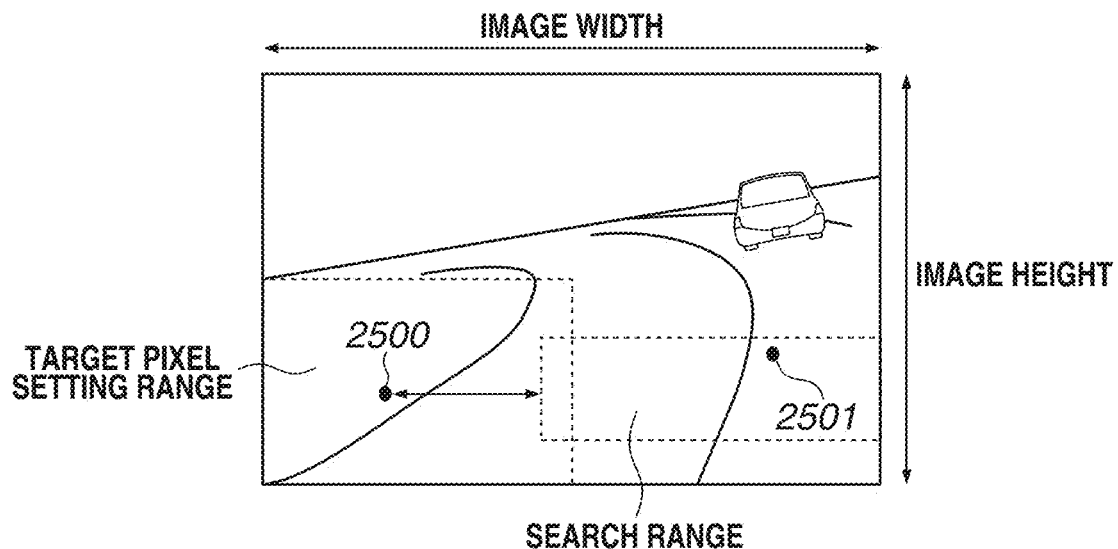
FIGS. 25A to 25C are schematic diagrams illustrating each process executed in the roll angle estimation processing.
Figure 25B:
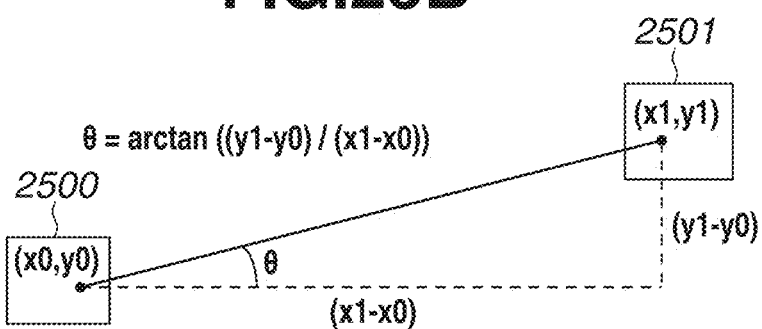
Figure 25C:
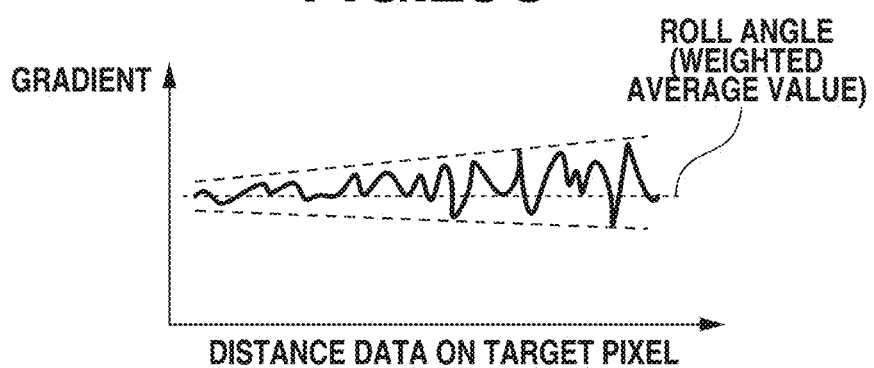

FIG. 24 is a flowchart illustrating roll angle estimation processing to be executed by the roll angle estimation unit 2102. FIGS. 25A to 25C are schematic diagrams illustrating each process in the roll angle estimation processing.

In step S2400, the roll angle estimation unit 2102 determines a target pixel setting range from a distance map. FIG. 25A is a schematic diagram illustrating a target pixel setting range in a distance map.

As illustrated in FIG. 25A, a target pixel setting range is positioned in a bottom left region of a distance map. The height of the target pixel setting range is assumed to be the height of a region corresponding to the road surface. For example, a length from a horizontal line to a distance map lower end is set as the height. A width of the target pixel setting range is set in consideration of an interval between a target pixel and a search range. The search range is set at a position distant in the horizontal direction from the target pixel by a predetermined number of pixels (predetermined interval). In a case where an interval between the target pixel and the search region is large, the search range cannot be set even if a large width of the target pixel setting range is set. In the third exemplary embodiment, the predetermined interval is set to about ¼ of an image width of the distance map, and the size of the target pixel setting range is set to about an half of the image width of the distance map. A calculation amount can be suppressed by appropriately setting the target pixel setting range.

In step S2401, the roll angle estimation unit 2102 acquires distance data on a target pixel 2500 from the distance map. In the third exemplary embodiment, the roll angle estimation unit 2102 acquires distance data on the target pixel 2500 among pixels in the target pixel setting range.

In step S2402, the roll angle estimation unit 2102 determines a search range. Irrespective of the generation of a roll angle, a distance value of a pixel near the target pixel tends to be close to a distance value of the target pixel. For detecting a roll angle with high resolution based on the coordinates of the target pixel 2500 and a corresponding pixel 2501, the roll angle estimation unit 2102 accordingly sets a region separated in the horizontal direction from the target pixel 2500 by the predetermined interval, as a search range.

The roll angle estimation unit 2102 can limit the height of the search range based on a roll angle range expected to be generated. For example, in the case of an in-vehicle camera installed in a vehicle and the vehicle drives on a general road, a roll angle to be generated is limited to an angle of ±several degrees. In the third exemplary embodiment, the height of the search range is set to about ⅛ of the image height of the distance map. As a width of the search range, a length from a position separated in the horizontal direction from the target pixel 2500 by the predetermined interval to a distance map right end is set. The right end of the search range is not limited to the right end of the distance map. Nevertheless, distance data on the road surface that corresponds to the target pixel 2500 cannot to be found in a case where a width of the search range is too small], so that it is desirable to set as large width of a search range as possible.

In step S2403, the roll angle estimation unit 2102 searches the determined search range for the corresponding pixel 2501 corresponding to the target pixel 2500. Because a pixel in the search range that has a similar distance value to that of the target pixel 2500 is regarded as the corresponding pixel 2501, a difference from a distance value of the target pixel 2500 is detected for each of the pixels in the search range, and a pixel with the smallest difference is regarded as the corresponding pixel 2501. A search method of the corresponding pixel 2501 is not limited to the comparison of differences between a pixel and a pixel. The comparison of differences in distance value may be performed between a target pixel and a neighborhood pixel group including pixels in the search range, and a center pixel of a pixel group having the highest degree of similarity may be regarded as the corresponding pixel 2501.

In step S2404, the roll angle estimation unit 2102 calculates a gradient θ based on coordinates of the target pixel and the corresponding pixel. As illustrated in FIG. 25B, when the coordinate of the target pixel 2500 is represented as (x0, y0), and the coordinate of the corresponding pixel 2501 is represented as (x1, y1), the gradient θ is calculated by θ=arctan((y1−y0)/(x1−x0)).

In step S2405, the roll angle estimation unit 2102 determines whether the processing on all pixels in the target pixel setting range has been completed. In a case where the processing on all pixels in the target pixel setting range has been completed as target pixels (YES in step S2405), the processing proceeds to step S2406. In a case where the processing on all pixels in the target pixel setting range has not been completed as target pixels (NO in step S2405), the processing returns to step S2401, and the processing is performed on a new target pixel.

In step S2406, the roll angle estimation unit 2102 calculates a roll angle. FIG. 25C is a schematic diagram illustrating a graph in which a horizontal axis indicates a distance value of a target pixel, and a vertical axis indicates a gradient calculated for the target pixel. Because a gradient calculated from one target pixel includes a noise component, the most likely roll angle is detected by averaging a plurality of gradients. A distance map to be referred to for performing roll angle estimation is generated from parallax images, and it is known that detection accuracy in the ranging from parallax images gets worse as a distance to an object is longer. Thus, if a gradient of each target pixel is calculated using a distance map, a variation in a calculated gradient becomes large in accordance with the magnitude of a distance value of the target pixel. Thus, in the calculation of a roll angle, a roll angle is estimated by performing weighted averaging in such a manner that a percentage of a gradient of a target pixel with a small distance value becomes larger, and a percentage of a gradient of a target pixel with a large distance value becomes smaller. As a factor for determining a percentage of weighted averaging, a degree of similarity used in searching for a corresponding pixel may be used.

By the above-described processing, a roll angle can be estimated using a distance map of a road surface.

Furthermore, a method of setting an interval between a target pixel and a search range in a case where resolution of a roll angle to be estimated is predetermined will be described.

An interval between a target pixel and a search range is defined based on the resolution of a roll angle. A roll angle is calculated as a gradient from a target pixel to a corresponding pixel, and is represented by a ratio between a horizontal difference between the target pixel and the corresponding pixel, and a vertical difference between the target pixel and the corresponding pixel. Because the vertical difference is one pixel at the minimum, the resolution of a roll angle is determined based on the magnitude of the horizontal difference. An interval d between the target pixel and the search range is obtained by the following equation (Equation 12) using a resolution r of a roll angle.

$$d = \frac{1}{\tan r} \quad \text{(Equation 12)}$$

In Equation 12, r denotes the minimum detection angle, and the interval d between the target pixel and the search range is derived from the relationship of the angle r obtained in a case where a difference in a y-axis direction is one pixel.

The resolution is higher as the calculated interval d is larger, but when the interval d is larger, the search range becomes narrower as described above. It is thus desirable to set the minimum resolution. For example, in a case where a required resolution r is 0.1°, the interval d is 573 pixels or more.

In a case where detection resolution of a roll angle is given by the above-described calculation method, it makes it possible to set an appropriate interval.

Figure 26:
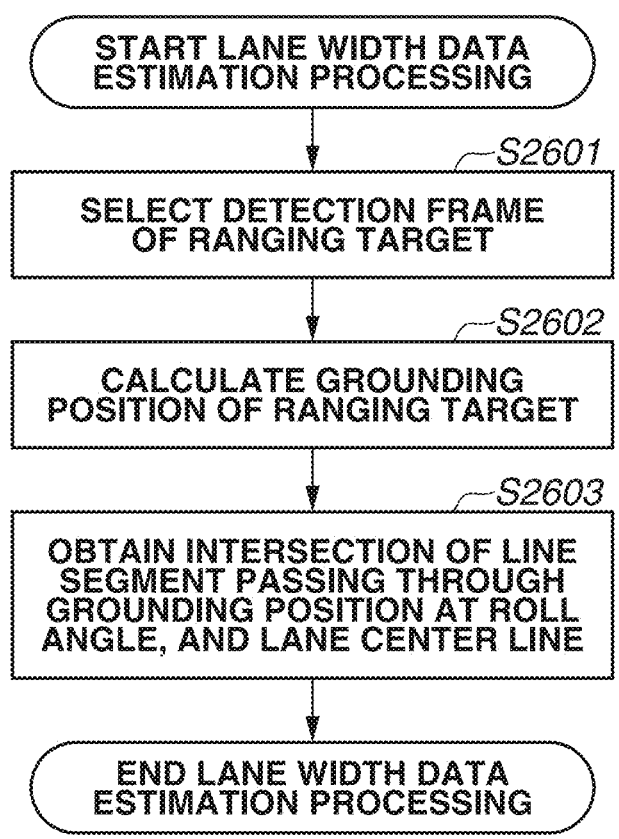
FIG. 26 is a flowchart illustrating coordinate estimation processing to be executed on lane width data by a grounding position estimation unit.

The grounding position estimation unit 2103 estimates a coordinate of lane width data positioned at the same distance as a grounding position of a ranging target, using a detection frame acquired by the object detection task, the lane center obtained by the lane analysis unit 2101, and the roll angle estimated by the roll angle estimation unit 2102. FIG. 26 is a flowchart illustrating coordinate estimation processing of lane width data that is to be executed by the grounding position estimation unit 2103.

In step S2601, the grounding position estimation unit 2103 selects a detection frame of a ranging target from among detection frames acquired by the object recognition task.

Figure 27:
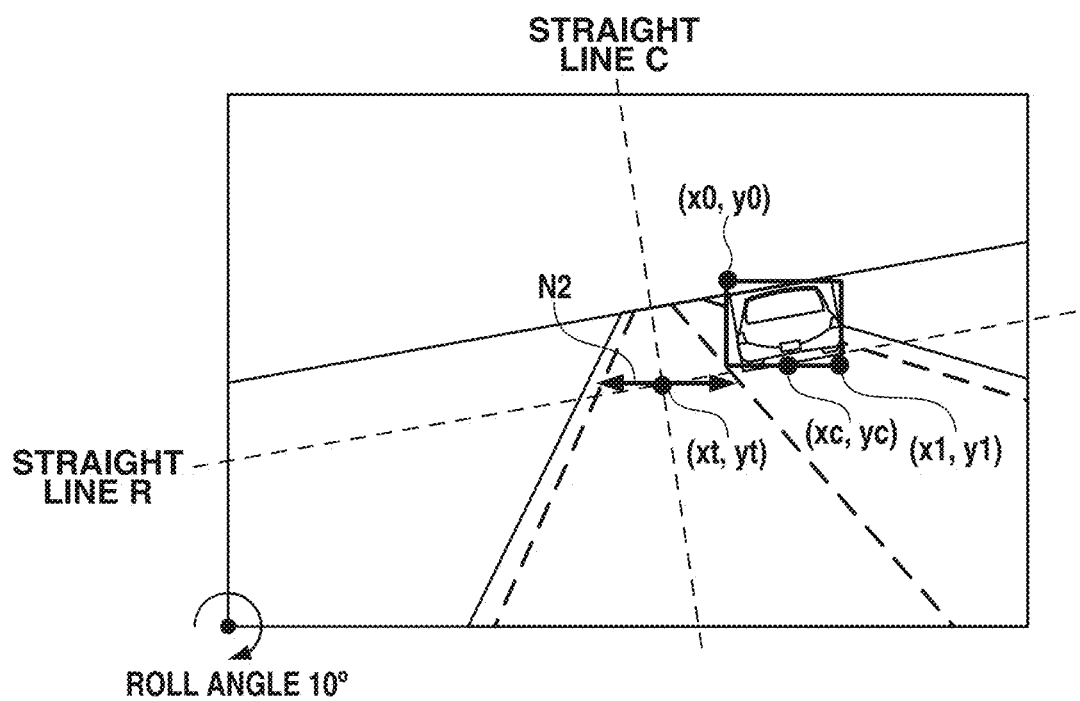
FIG. 27 is a schematic diagram illustrating a coordinate of a grounding position of a ranging target that is set by the grounding position estimation unit.

In step S2602, the grounding position estimation unit 2103 sets a center position of a detection frame lower part as a coordinate (xc, yc) of a grounding position of the ranging target. FIG. 27 is a schematic diagram illustrating the coordinate (xc, yc) of the grounding position of the ranging target that is set by the grounding position estimation unit 2103. The coordinate (xc, yc) of the grounding position of the ranging target is represented by the following equation (Equation 13) using a top-left coordinate (x0, y0) and a bottom-right coordinate (x1, y1) of the detection frame.

$$(xc, yc) = \left(\frac{x0 + x1}{2}, y1\right) \quad \text{(Equation 13)}$$

As a method of acquiring a coordinate of a grounding position of a ranging target, a method different from the above-described method may be used. In the case of an object with a wide width like a vehicle, since the object may appear tilted at a roll angle, a difference between a center coordinate of a detection frame lower end and a coordinate at which a tire is actually in contact with the ground surface can become large. In such a case, for example, an outline of an object in a detection frame may be detected using a captured image and a distance map, and a position at which a straight line R having a gradient of a roll angle is in contact with the lower end of the outline of the object may be set as a coordinate of a grounding surface. With such a configuration, a coordinate at which a ranging target is actually in contact with the ground surface can be set.

Because processing of recognizing the outline of an object involves large calculation load, as a configuration that considers calculation cost, an appropriate coordinate may be selected from among corner coordinates of the detection frame in accordance with a positional relationship between the lane center and the ranging target. Specifically, a selection method of selecting a bottom-left coordinate of the detection frame in a case where the ranging target exists on the left side of the lane center, and selecting a bottom-right coordinate of the detection frame in a case where the ranging target exists on the right side of the lane center. With this configuration, a coordinate at which the ranging target is actually in contact with the straight line R, which will be obtained in the next step, can be sometimes set to a coordinate closer to the actual coordinate than that obtained in a case where the center of the detection frame lower end is set.

In step S2603, the grounding position estimation unit 2103 obtains a coordinate (xt, yt) at which the straight line R passing through the grounding position coordinate (xc, yc) of the ranging target and having a gradient of a roll angle and a straight line C at the lane center that has been acquired by the compartment line detection task intersect with each other.

By performing the processing as described above, even if a distance map tilts at a roll angle, a coordinate of lane width data existing at the same distance as a grounding position of a ranging target can be obtained.

Figure 28:
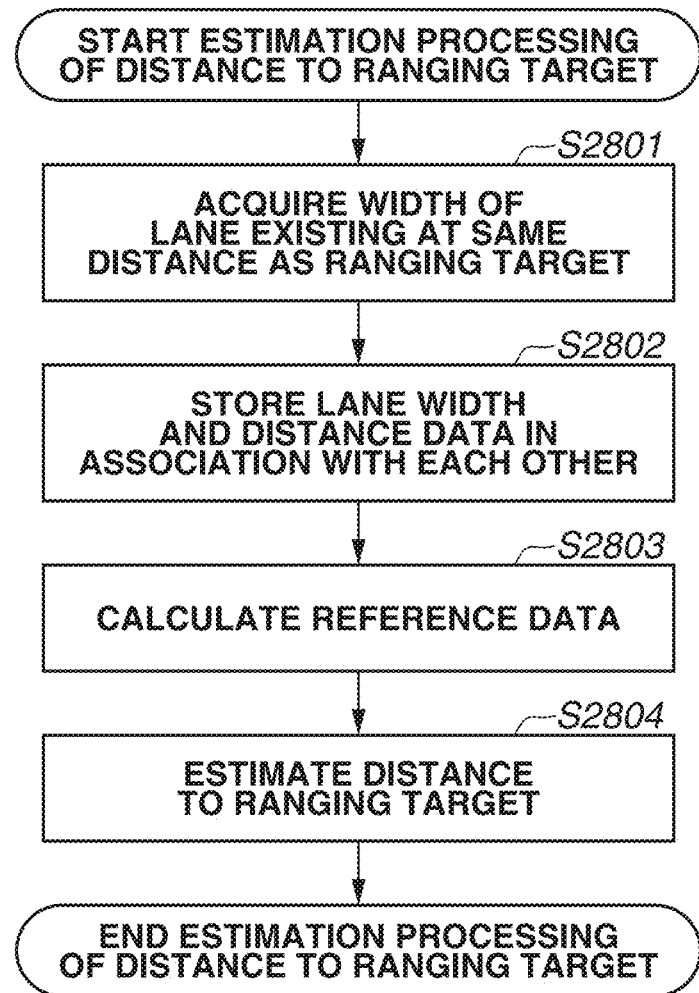
FIG. 28 is a flowchart illustrating estimation processing of a distance to a ranging target that is to be executed by an object distance calculation unit.

The object distance calculation unit 2104 calculates a distance to a ranging target using a coordinate on lane width data that corresponds to a grounding position and has been acquired by the grounding position estimation unit 2103, lane width data calculated by the lane analysis unit 2101, and data on the distance map. FIG. 28 is a flowchart illustrating estimation processing of a distance to a ranging target that is to be executed by the object distance calculation unit 2104.

In step S2801, the object distance calculation unit 2104 calculates a lane width N2 using lane width data and a coordinate (xt, yt). The object distance calculation unit 2104 may acquire a lane width at a coordinate (xt, yt) as the lane width N2, or may acquire a lane width by acquiring a plurality of lane widths near the coordinate (xt, yt), weighting the lane widths in accordance with distances from the coordinate (xt, yt), and performing weighted averaging. In a case where a lane width is obtained from a lane detected by image recognition, there is a possibility that a difference is generated between a detected lane width and an actual lane width due to an error of image recognition. By calculating the lane width N2 using a plurality of lane widths as described above, a variation in detected lane widths can be reduced. The number of pieces of lane width data to be used in smoothing may be set to one depending on the processing load.

In step S2802, the object distance calculation unit 2104 stores lane width data and distance data that have been obtained in a frame at the present time in association with each other. First of all, the object distance calculation unit 2104 acquires lane width data and a coordinate thereof, and acquires distance data corresponding to a coordinate of lane width data from a distance map. At this time, corresponding distance data may be obtained by acquiring distance data corresponding to each coordinate within a lane width data range (xn−N1/2, yn) to (xn+N1/2, yn) that is centered on a coordinate (xn, yn) corresponding to a lane width N1 of the lane center line C, and smoothing the distance data. The object distance calculation unit 2104 performs such association of lane width data and distance data, for each piece of lane width data obtained at a frame T0 at the present time. FIG. 29 is a schematic diagram illustrating lane width data. The object distance calculation unit 2104 may narrow the range of the number of pieces of data to be associated, depending on the processing load and recording capacity. For example, the object distance calculation unit 2104 may be configured to store only data in which distance data with a high degree of certainty is associated.

In step S2803, the object distance calculation unit 2104 calculates reference data B to be used for the calculation of a distance to a ranging target. When the number of pieces of associated data in the previous step is denoted by k, the reference data B is represented by the following equation (Equation 14) using a distance D1 to a lane and the lane width N1.

$$B = \sum_{n=0}^{k-1} \frac{(D1[n] \times N1[n])}{k} \qquad \text{(Equation 14)}$$

At this time, because an error of distance data is likely to become larger as a distance becomes longer, the reference data B may be calculated by performing weighted averaging in such a manner as to set a large weight to a point with a small distance value, and set a small weight to a point with a large distance value. The data corresponding to several frames that has been obtained in step S2802 may be stored as data on past frames T1 and T2, and the reference data B may be calculated including the data.

In Equation 13, D1[n]×N1[n] becomes a value equivalent to a reference lane width for distance calculation. When a distance to a lane is denoted by D, the number of pixels corresponding to a lane width on an image is set to N pixels, a horizontal field angle of an imaging camera is denoted by F°, and a horizontal image width is set to H pixels, an actual lane width W can be calculated by W=(D×N)×2× tan(F/2)/W. When the specification of the imaging camera is determined, the part "2× tan(F/2)/W" can be treated as a fixed value. Thus, an actual lane width becomes a variable of (D× N). In Equation 13, because a lane width can be regarded as the same during vehicle driving based on the foregoing relationship, observation noise can be reduced by executing smoothing on D1[n]×N1 [n]. Even in the case of a plurality of consecutive frames, because a vehicle is assumed to drive on the same lane, an actual lane width can be regarded as the same. Thus, observation noise can be also reduced by executing smoothing on D1[n]×N1[n].

On the other hand, in some frames, there is a possibility that lane width data cannot be correctly acquired due to image unsteadiness caused by a vehicle body driving over small stones. Thus, by reducing a weight of a frame with a large discrepancy in D1[n]×N1[n] (i.e., large unsteadiness), reference data may be calculated in such a manner as to reduce an error. Alternatively, by increasing a weight to a frame with a smaller time difference from the frame at the present time, and decreasing a weight to a frame with a larger time difference, reference data may be calculated in such a manner as to achieve a balance between a response to the frame at the present time and smoothing of unsteadiness caused between frames.

In step S2804, the object distance calculation unit 2104 obtains distance data D2 on a ranging target using the reference data B obtained in the previous steps, and the lane width N2 of the ranging target. The distance data D2 is obtained by the following equation (Equation 15).

$$D2=B/N2 \quad \text{(Equation 15)}$$

By performing the processing as described above, a distance to a ranging target can be estimated. The object distance calculation unit 2104 outputs object distance information indicating the distance to the ranging target that has been obtained in this manner.

In the third exemplary embodiment, the description has been given of an example of a ranging system that can perform ranging highly accurately in all distance ranges from a short distance region to a far distance region by combining stereo ranging that uses parallax images and distance estimation that uses a single image. When the ranging that uses parallax images is performed alone, distance accuracy can be maintained by using a size ratio of a scaling object such as a road surface even if a ranging target exists in a far region in which ranging accuracy worsens. In a case where a scaling target object is an object of which an actual size rarely changes, such as a road, distance accuracy can be enhanced by performing smoothing at the time of scaling and reducing observation noise in size measurement. By changing a synthesis ratio in accordance with a distance range between the ranging that uses parallax images and the ranging that is based on distance estimation of a single image, it makes it possible to perform more robust distance estimation. Furthermore, by performing detection and correction of a roll angle, it makes it possible to perform robust distance estimation with reduced influence of deformation of a vehicle and the unevenness of a driving road.

Hereinafter, a fourth exemplary embodiment will be described. In the above-described exemplary embodiments, the description has been given using an example of an imaging apparatus that acquires left and right parallax images via the same optical system using the imaging plane phase difference system to acquire distance image data, but an acquisition method of parallax images is not limited to this. Left and right parallax images can also be acquired by a stereo camera that acquires a left parallax image and a right parallax image by two imaging apparatuses provided on the left and right sides and separated by a predetermined distance.

It is also possible to perform the above-described ranging by acquiring distance information using a ranging device such as a LiDAR, and using external information obtained by performing image recognition on a captured image acquired from an imaging apparatus.

Hereinafter, a fifth exemplary embodiment will be described. Various functions, various types of processing, and various methods described in the above-described exemplary embodiments can also be implemented by a computer of a device or an apparatus executing programs. In this case, the programs are supplied to the computer of the device or the apparatus via a computer-readable storage medium. Examples of the computer-readable storage medium according to the fifth exemplary embodiment include a hard disc device, a magnetic storage device, an optical storage device, a magneto-optical storage device, a memory card, a volatile memory, and a nonvolatile memory. The computer-readable storage medium according to the fifth exemplary embodiment is a non-transitory storage medium, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-055880, filed Mar. 29, 2021, which is hereby incorporated by reference herein in its entirety.

What is claimed is:

1. An information processing device comprising:
one or more memories storing instructions; and
one or more processors executing the instructions to:
sequentially set a region occupied by an object as an object region in a captured image, and sequentially set an identification number of the object region detected in the captured image;
sequentially acquire a distance map including distance information corresponding to a pixel included in the object region;
sequentially determine object distance information indicating a distance to an object included in the object region, based on the distance information corresponding to the pixel included in the object region;
generate, from a history of the object distance information with a same identification number as the identification number, the object distance information using a history of the distance information in a predetermined time range; and
determine the object distance information by calculating a weighted average of object distance information based on a size of the object region having the same identification number.

2. The information processing device according to claim 1, wherein the one or more processors further executes the instructions to:
acquire a first image signal and a second image signal that have predetermined parallax; and
acquire the distance map by determining the distance information corresponding to the pixel, based on the first image signal and the second image signal.

3. The information processing device according to claim 1, wherein the one or more processors further executes the instructions to:
determine the object distance information based on any of a mode value, an average value, or a median value of the distance information corresponding to the pixel included in the object region.

4. The information processing device according to claim 1, wherein the one or more processors further executes the instructions to:
set the object region as a frame encompassing the object in the image, and generate external information indicating a shape and a position of the frame; and
determine the object distance information based on the external information.

5. The information processing device according to claim 1, wherein the one or more processors further executes the instructions to:
generate external information indicating the region that is occupied by the object in the image, as the object region; and
determine the object distance information based on the external information.

6. The information processing device according to claim 1, wherein the information processing device is included in a movable body.

7. The information processing device according to claim 1, wherein the information processing device is included in an imaging apparatus.

8. A method comprising:
- sequentially setting a region occupied by an object as an object region in a captured image and sequentially setting an identification number of the object region detected in the captured image;
- sequentially acquiring a distance map including distance information corresponding to a pixel included in the object region;
- sequentially determining object distance information indicating a distance to an object included in the object region, based on the distance information corresponding to the pixel included in the object region;
- generating, from a history of the object distance information with a same identification number as the identification number, the object distance information using a history of the distance information in a predetermined time range; and
- determining the object distance information by calculating a weighted average of object distance information based on a size of the object region having the same identification number.

9. The method according to claim 8, further comprising:
- acquiring a first image signal and a second image signal that have predetermined parallax; and
- acquiring the distance map by determining the distance information corresponding to the pixel, based on the first image signal and the second image signal.

10. The method according to claim 8, further comprising:
- determining the object distance information based on any of a mode value, an average value, or a median value of the distance information corresponding to the pixel included in the object region.

11. The method according to claim 8, further comprising:
- setting the object region as a frame encompassing the object in the image, and generating external information indicating a shape and a position of the frame; and
- determining the object distance information based on the external information.

12. The method according to claim 8, further comprising:
- generating external information indicating the region that is occupied by the object in the image, as the object region; and
- determining the object distance information based on the external information.

13. A non-transitory storage medium that stores a program causing a computer to execute a method, the method comprising:
- sequentially setting a region occupied by an object as an object region in a captured image and sequentially setting an identification number of the object region detected in the captured image;
- sequentially acquiring a distance map including distance information corresponding to a pixel included in the object region;
- sequentially determining object distance information indicating a distance to an object included in the object region, based on the distance information corresponding to the pixel included in the object region;
- generating, from a history of the object distance information with a same identification number as the identification number, the object distance information using a history of the distance information in a predetermined time range; and
- determining the object distance information by calculating a weighted average of object distance information based on a size of the object region having the same identification number.

14. The non-transitory storage medium according to claim 13, further comprising:
- acquiring a first image signal and a second image signal that have predetermined parallax; and
- acquiring the distance map by determining the distance information corresponding to the pixel, based on the first image signal and the second image signal.

15. The non-transitory storage medium according to claim 13, further comprising:
- determining the object distance information based on any of a mode value, an average value, or a median value of the distance information corresponding to the pixel included in the object region.

16. The non-transitory storage medium according to claim 13, further comprising:
- setting the object region as a frame encompassing the object in the image, and generating external information indicating a shape and a position of the frame; and
- determining the object distance information based on the external information.

17. The non-transitory storage medium according to claim 13, further comprising:
- generating external information indicating the region that is occupied by the object in the image, as the object region; and
- determining the object distance information based on the external information.

* * * * *